US011883360B2

(12) United States Patent
Hooven et al.

(10) Patent No.: US 11,883,360 B2
(45) Date of Patent: Jan. 30, 2024

(54) PROTECTIVE LOCKING SYSTEMS FOR USE WITH VIALS

(71) Applicant: Enable Injections, Inc., Cincinnati, OH (US)

(72) Inventors: Michael D. Hooven, Cincinnati, OH (US); Richard P. Nuchols, Williamsburg, OH (US); David Stefanchik, Morrow, OH (US)

(73) Assignee: Enable Injections, Inc., Cincinnati, OH (US)

( * ) Notice: Subject to any disclaimer, the term of this patent is extended or adjusted under 35 U.S.C. 154(b) by 462 days.

(21) Appl. No.: 17/287,001

(22) PCT Filed: Oct. 22, 2019

(86) PCT No.: PCT/US2019/057439

§ 371 (c)(1),
(2) Date: Apr. 20, 2021

(87) PCT Pub. No.: WO2020/086581

PCT Pub. Date: Apr. 30, 2020

(65) Prior Publication Data

US 2021/0386621 A1 Dec. 16, 2021

Related U.S. Application Data

(60) Provisional application No. 62/748,681, filed on Oct. 22, 2018.

(51) Int. Cl.
*A61J 1/14* (2023.01)

(52) U.S. Cl.
CPC ........... *A61J 1/1437* (2013.01); *A61J 1/1412* (2013.01)

(58) Field of Classification Search
CPC .............................. A61J 1/1437; A61J 1/1412
USPC .......................................................... 206/1.5
See application file for complete search history.

(56) References Cited

U.S. PATENT DOCUMENTS

| | | | | |
|---|---|---|---|---|
| 3,313,441 | A | 4/1967 | Fadden | |
| 6,382,416 | B1 * | 5/2002 | Gainey | A61J 1/1437 206/317 |
| 10,180,018 | B1 * | 1/2019 | Simpson | A61J 7/0481 |
| 10,842,713 | B1 * | 11/2020 | Cohen | B65D 55/145 |
| 11,679,063 | B1 * | 6/2023 | Butaud | A61J 7/0481 221/1 |
| 2012/0046635 | A1 | 2/2012 | Hedgepeth et al. | |

(Continued)

FOREIGN PATENT DOCUMENTS

WO WO2017/151248 A1 9/2017

OTHER PUBLICATIONS

International Search Report and Written Opinion, counterpart International Appl. No. PCT/US2019/057439, (dated Feb. 10, 2020) (7 pages).

(Continued)

*Primary Examiner* — Jacob K Ackun
(74) *Attorney, Agent, or Firm* — Cook Alex Ltd.

(57) ABSTRACT

Protective locking systems for source vials which helps prevent mishandling of liquid medication to be removed from source vials and used in an injection device, such as a wearable injection device or a syringe. The protective locking systems include at least a key, a locking cap and a slide guard, each of which includes an opening sized at least large enough to receive a needle therethrough.

26 Claims, 48 Drawing Sheets

(56) References Cited

U.S. PATENT DOCUMENTS

| | | | | |
|---|---|---|---|---|
| 2012/0123382 | A1 | 5/2012 | Kubo | |
| 2017/0369228 | A1 | 12/2017 | Lenear | |
| 2018/0116908 | A1 | 5/2018 | Spallek et al. | |
| 2020/0337945 | A1 * | 10/2020 | Flygare | A61J 7/0076 |
| 2021/0007937 | A1 * | 1/2021 | Amoyal | A61J 7/0418 |
| 2021/0009320 | A1 * | 1/2021 | Clavel | B65D 1/023 |

OTHER PUBLICATIONS

Supplementary European Search Report, counterpart EP App. No. 19876327.8 (dated Jul. 26, 2022) (1 page).

Extended European Search Report, counterpart EP App. No. 19876327.8 (dated Jul. 7, 2022) (7 pages).

* cited by examiner

PROTECTIVE LOCKING SYSTEMS FOR USE WITH VIALS

CROSS-REFERENCE TO RELATED APPLICATION

This application is the U.S. National Stage of PCT International Patent Application No. PCT/US2019/057439, filed Oct. 22, 2019, which claims the benefit of U.S. Provisional Patent Application No. 62/748,681, filed Oct. 22, 2018, the disclosure of each of which is hereby incorporated by reference in its entirety.

FIELD OF THE DISCLOSURE

The present subject matter relates generally to devices for transferring a fluid from a vial to a medical device and, in particular, to protective locking systems for source vials which help prevent mishandling of liquid medication to be removed from source vials and used in an injection device, such as a wearable injection device or a syringe.

BACKGROUND

Injection devices that are worn by a patient temporarily or for extended periods are well known in the medical field. The subject matter of this application relates to systems used to safely secure liquid medication within a source vial until it is presented to a corresponding transfer device that may be constructed for use particularly but not exclusively with the injection device described in commonly assigned U.S. Provisional Patent Application No. 62/572,911, filed Oct. 16, 2017, and which is hereby incorporated by reference in its entirety. That injection device includes an internal resilient bladder that may be filled with any suitable injectable medicament, whether drug, antibiotic, biologic or other injectable, for subcutaneous injection, typically a bolus injection, into a patient while the device is being worn by the patient. Other injection devices may be used, for example, including but not limited to a syringe.

That injection device must be filled (wholly or partially) with the desired injectable before injection into the patient. The above U.S. provisional patent application also discloses information regarding transfer systems for transferring an injectable from a source vial, including but not limited to transferring such injectable into the injection device from a source vial or vials. These may include and be embodied in, but are not limited to, a pressurized gas powered transfer device. The present application discloses additional novel designs and improvements that enhance safe use of medications in source vials, and can serve to prevent misuse, such as attempts to use medications in ways not intended by a prescribing physician. The transfer devices described herein may be variously referred to as transfer units, stations, modules, accessories, add-ons or by other suitable terminology, without intending any limitation on the structure or function of the device not set forth herein.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a protective locking system for a vial includes a vial cap lock fitted to cover a septum on a vial containing a medical fluid. The vial cap lock further includes a key, a locking cap and a slide guard. The key has a needle opening sized to receive a needle therethrough, the locking cap has a needle opening sized to receive a needle therethrough, and the slide guard has a needle opening sized to receive a needle therethrough. The key is received by and movable relative to the locking cap from a first position, wherein the needle opening through the slide guard is not aligned with the respective needle openings through the key and locking cap, to a second position, wherein the key has moved the slide guard relative to the locking cap and the respective needle openings through the slide guard, the key and the locking cap are aligned to receive a needle therethrough.

BRIEF DESCRIPTION OF DRAWINGS

FIG. 40 is a cross-sectional view of the vial cap lock shown in FIGS. 4A-4B removed from the vial for explanation purposes, and further showing the slide guard blocking entry of a needle that is otherwise permitted to pass through the respective needle openings through the key and the locking cap, after the key is brought to the locking cap and is in a fully raised first position.

DESCRIPTION

The present disclosure provides several examples of protective locking systems for vials. The examples are illustrated in FIGS. 1A-1G, 2A-2K, 3A-3J, 4A-4J, 5A-5K, 6A-6K, 7A-7J and 8A-8K. The protective locking systems for vials generally are used to prevent mishandling of liquid medications that may be transferred to a medical device, such as a wearable injection device, or other injection devices, for example but not limited to a syringe. The protective locking system for a vial may be constructed for use particularly but not exclusively with the injection device described in commonly assigned U.S. Provisional Patent Application No. 62/572,911, filed Oct. 16, 2017, and which is hereby incorporated by reference in its entirety.

Each example herein provides a protective locking system for a vial with the system including a vial cap lock configured to be fitted to cover a septum on a vial containing medical fluid, such as medication. The vial cap lock includes a key, a locking cap and a slide guard. The key has a needle opening sized to receive a needle therethrough. The locking cap has a needle opening sized to receive a needle therethrough. The slide guard also has a needle opening sized to receive a needle therethrough. The key is configured to be received by and movable relative to the locking cap from a first position, wherein the needle opening through the slide guard is not aligned with the respective needle openings through the key and locking cap, to a second position wherein the key moves the slide guard relative to the locking cap and the respective needle openings through the slide guard, the key and the locking cap are aligned to receive a needle therethrough. In the examples, the slide guard includes a biasing portion that tends to bias the slide guard toward a position wherein the needle opening through the slide guard is not aligned with the respective needle openings through the key and the locking cap. It will be appreciated that the term "needle opening" is used herein to refer to openings through components which may permit a needle to pass through the opening, and is not used to refer to an openings in a needle. It further will be appreciated that the term "sized to receive a needle therethrough" is used herein to mean that the opening is at least large enough for a needle to pass through, so there is not an upper limit on the size of the opening and it may be significantly larger than would otherwise be necessary for passage of a needle therethrough.

Figure 1A:
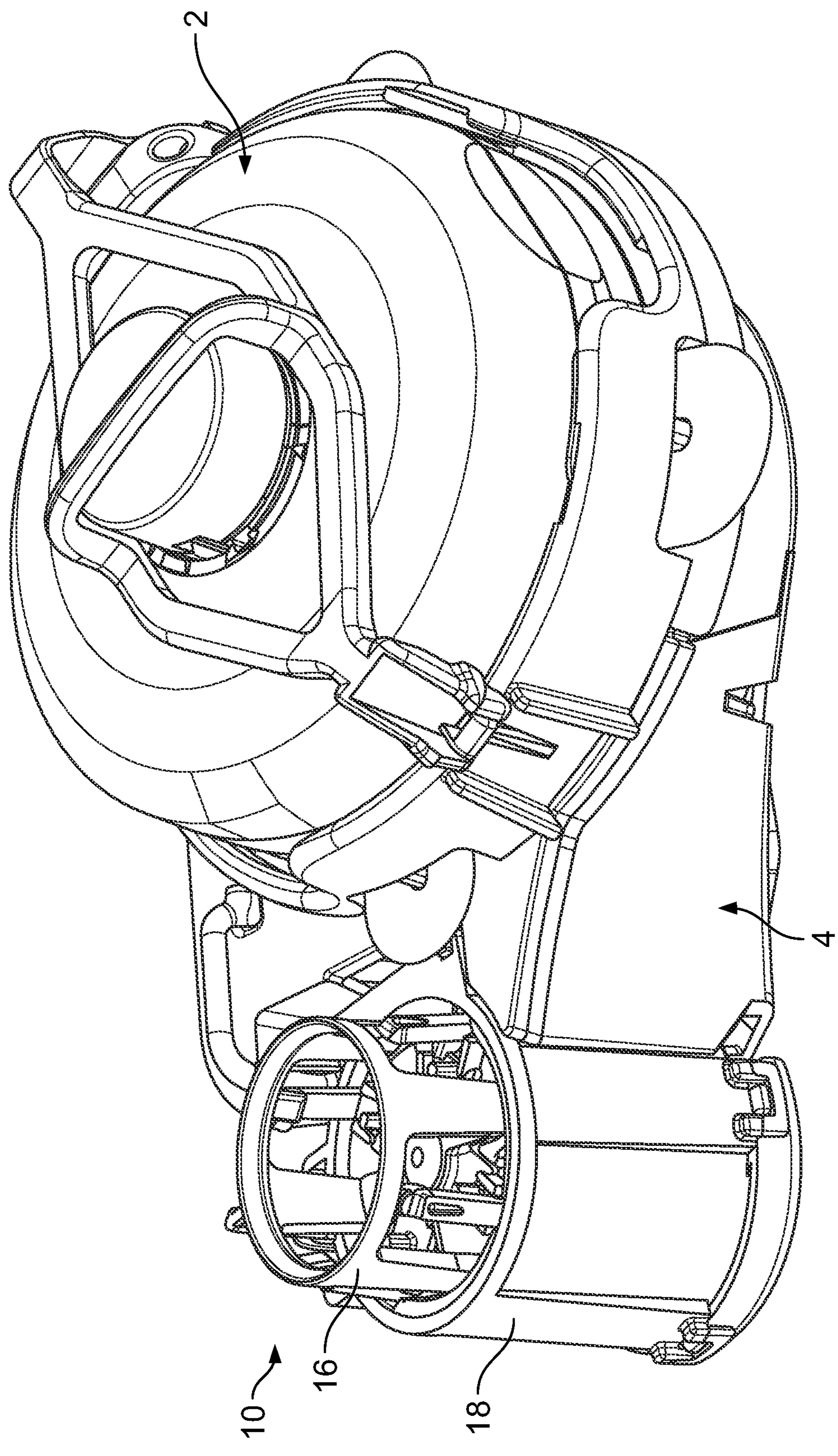
FIG. 1A is an upper perspective view of a single vial pressurized gas powered transfer device and an injection device, with the transfer device including a vial holder having a vial elevator in a raised or extended position.

FIG. 1A shows an injection device 2, such as a wearable injection device, and a single vial pressurized gas powered transfer device 4 connected to the injection device 2. FIGS. 1B-1G illustrate a first example protective locking system 6 for a vial 8, which is configured for use with the transfer device 4 shown in FIG. 1A.

Figure 1C:
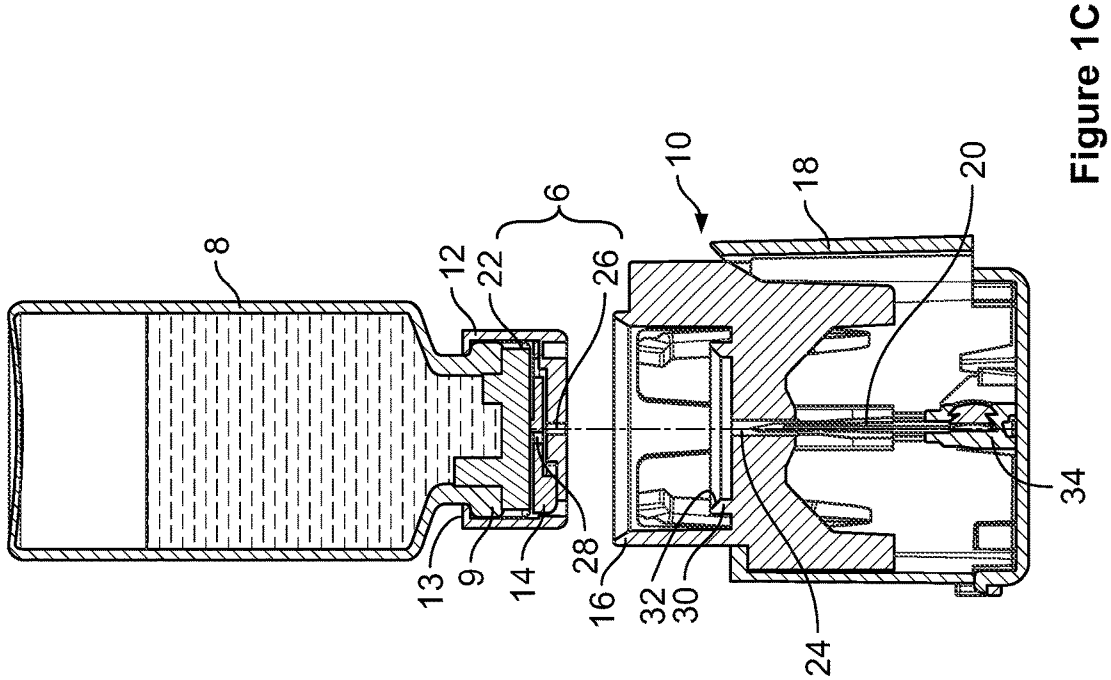
FIG. 1C is cross-sectional view of the vial having a protective locking system including a locking cap and a slide guard, and a key in the form of a vial elevator in the vial holder portion of the transfer device shown in FIG. 1B, and wherein the slide guard is biased to a position wherein the slide guard blocks a needle from passing through the locking cap and entering a vial septum.
Figure 1B:
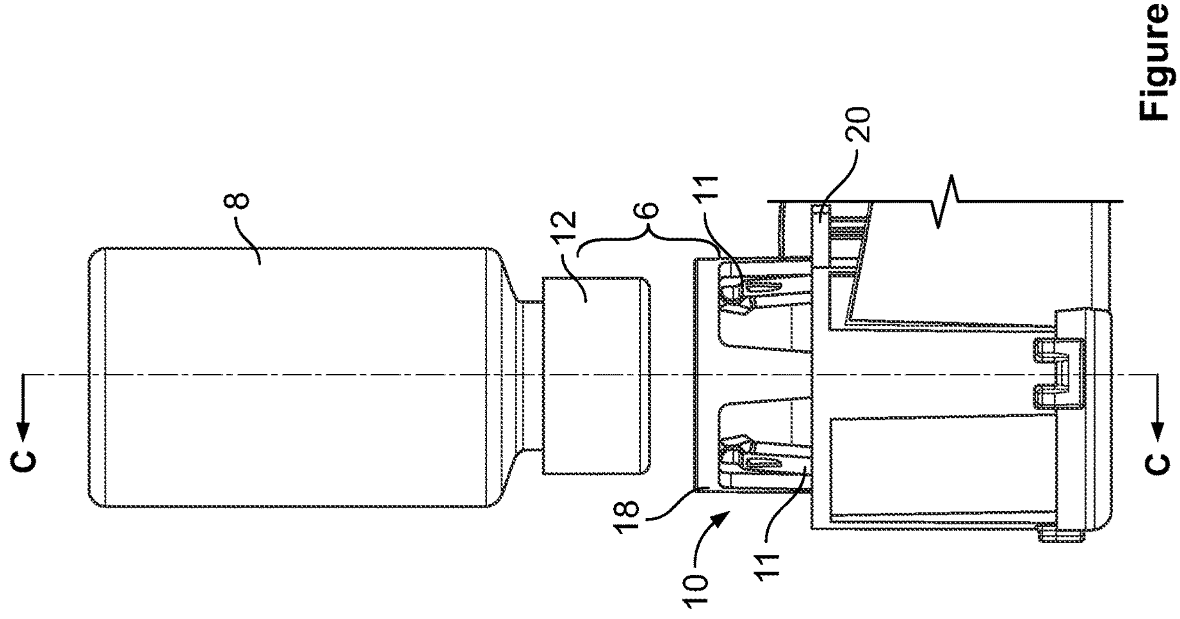
FIG. 1B is a front view of a vial having a first example protective locking system configured as a vial cap lock for one time use and being in an inverted position above a vial holder portion of the transfer device shown in FIG. 1A, but with other parts of the transfer device and injection device removed.
Figure 1E:
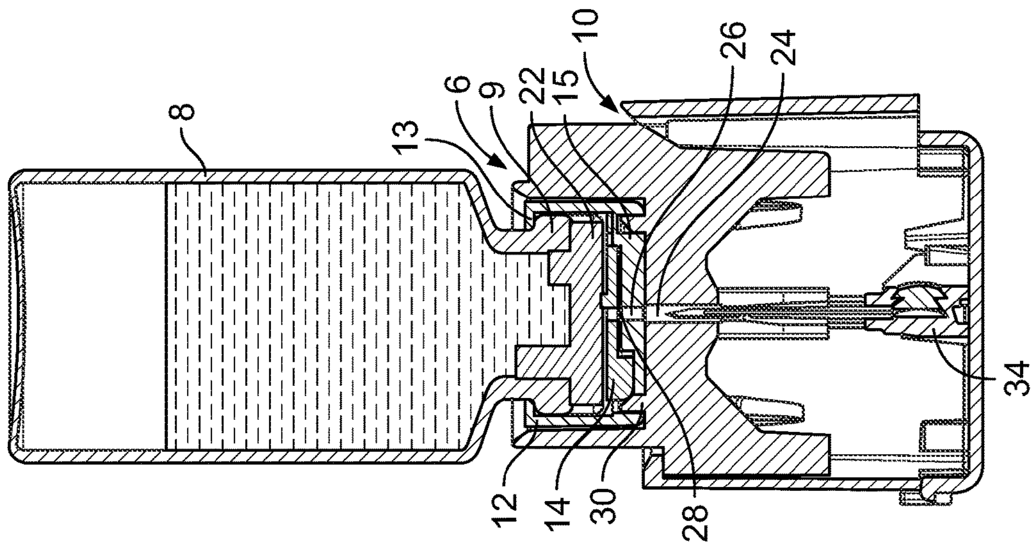
FIG. 1E is a cross-sectional view of the vial having a protective locking system connected to the vial elevator as shown in FIG. 1D.

FIG. 1B shows the vial 8 having the first example protective locking system 6 configured as a vial cap lock for one time use and being in an inverted position above a vial holder portion 10 of the transfer device 4 shown in FIG. 1A, but with other parts of the transfer device 4 and injection device 2 removed. As seen in FIG. 1C, this first example system includes a locking cap 12 and a slide guard 14, and a key 16 in a configuration of a vial elevator that is received by a vial elevator shaft 18 of the holder portion 10 of the transfer device 4. The locking cap 12 is connected to the vial 8 via an inward extending shoulder 13 on the locking cap 12 that captures a rim 9 of the vial 8. In FIG. 10, the slide guard 14 is biased by a biasing portion 15 to a position wherein the slide guard 14 blocks a needle 20 from passing through the locking cap 12 and entering the vial 8 through a vial septum 22.

Figure 1D:
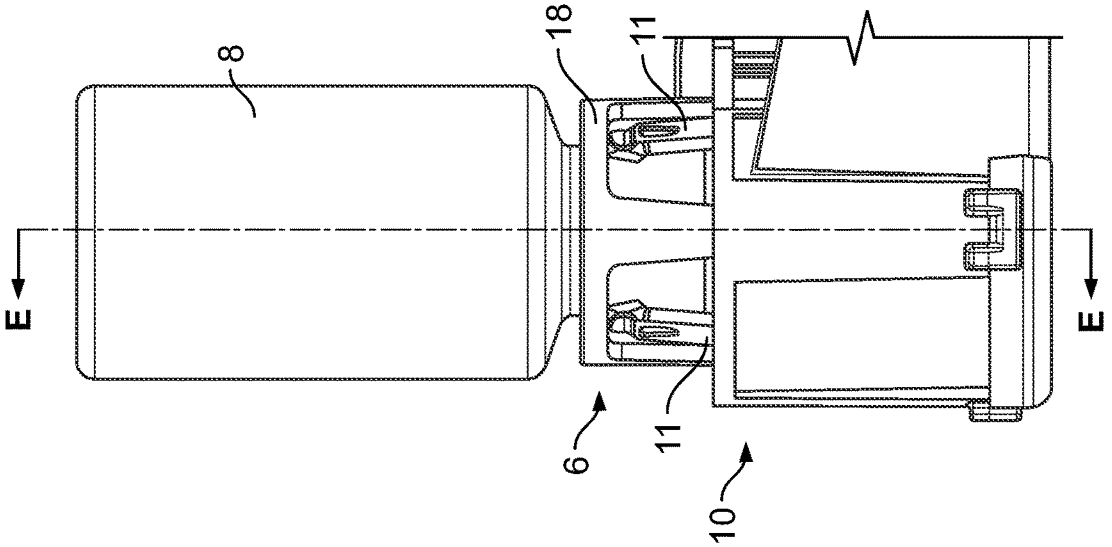
FIG. 1D is a front view of the key, in the form of a vial elevator, receiving a vial having a protective locking system, wherein the vial has been pushed or forced to a first position into and thereby connected to the key that is shown in FIGS. 1A-1C, and having moved the slide guard to a position wherein the needle opening through the slide guard is aligned with the respective needle openings on the key and the locking cap, so as to no longer block a needle from passing through the locking cap and entering a vial septum.

In FIG. 1D, the vial 8 received the key 16 in the form of the vial elevator when the locking cap 12 was pushed or forced to a first position into and thereby connected to the key 16. The vial elevator 16 includes arms 11 that extend inward and capture a neck portion of the vial 8 and stop against the locking cap 12. The engagement with the key 16 also moved the slide guard 14 to a position wherein a needle opening 28 through the slide guard 14 is aligned with a needle opening 26 through the locking cap 12 and a needle opening 24 through the key 16, so as to no longer block the needle 20 from passing through the locking cap 12 and entering a vial septum 22. The key 16, in the form of the vial elevator, further includes a rib 30 having a cam surface 32 that engages and moves the slide guard 14 from the first position blocking needle entry to a second position permitting needle entry when the key 16 is received by the locking cap 12.

Figure 1G:
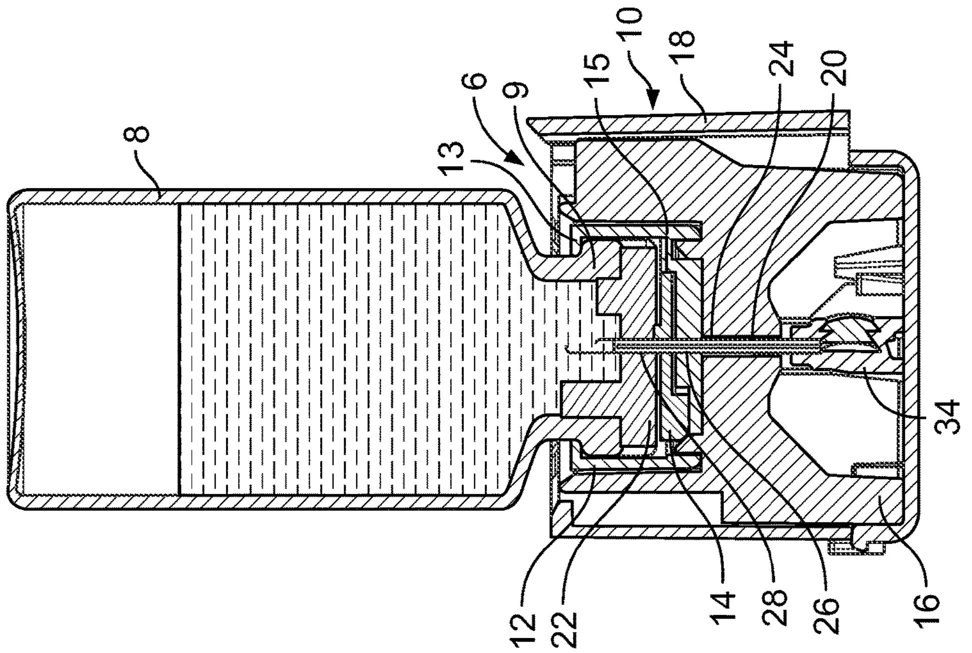
FIG. 1G is a cross-sectional view of the vial having a protective locking system as shown in FIG. 1F, wherein a needle or vial spike in the vial elevator shaft has passed through the locking cap, slide guard and vial septum to enter the vial as the vial elevator was pushed to the retracted or lowered position within the vial elevator shaft.
Figure 1F:
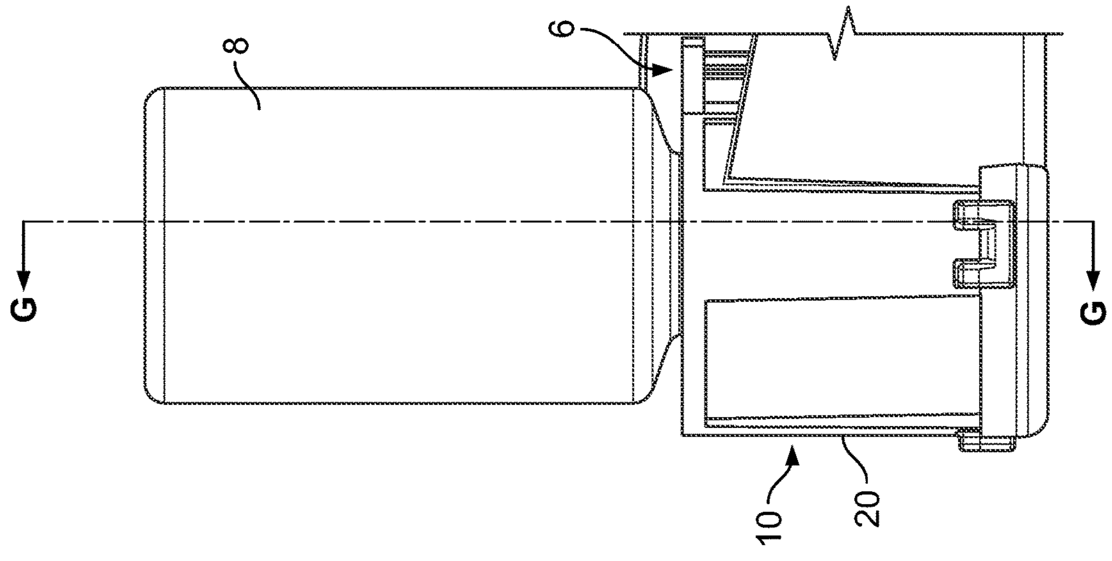
FIG. 1F is a front view of the vial having a protective locking system that has been pushed or forced to a second position further into the vial holder such that the vial elevator has moved downward relative to a vial elevator shaft of the vial holder shown in FIGS. 1D-1E to a retracted or lowered position within the transfer device.

In FIG. 1F, the vial 8 and protective locking system 6 have been pushed or forced to a second position further into the vial holder 10 such that the key 16 in the form of the vial elevator has moved downward relative to a vial elevator shaft 18 of the vial holder 10, to a retracted or lowered position within the transfer device 4. The vial holder 10 includes the needle 20 at its base 34, such as in the form of a vial spike. As shown in FIG. 1G, when the vial 8 and the protective locking system 6 are moved further downward relative to the vial elevator shaft 18, the aligned respective needle openings 24, 26, 28 through the key, the locking cap and the slide guard have permitted a needle or vial spike 20 at the bottom of the vial elevator shaft 18 to engage the vial septum 22 and enter the vial 8 as the vial elevator 16 was pushed to the second position.

Figure 2A:
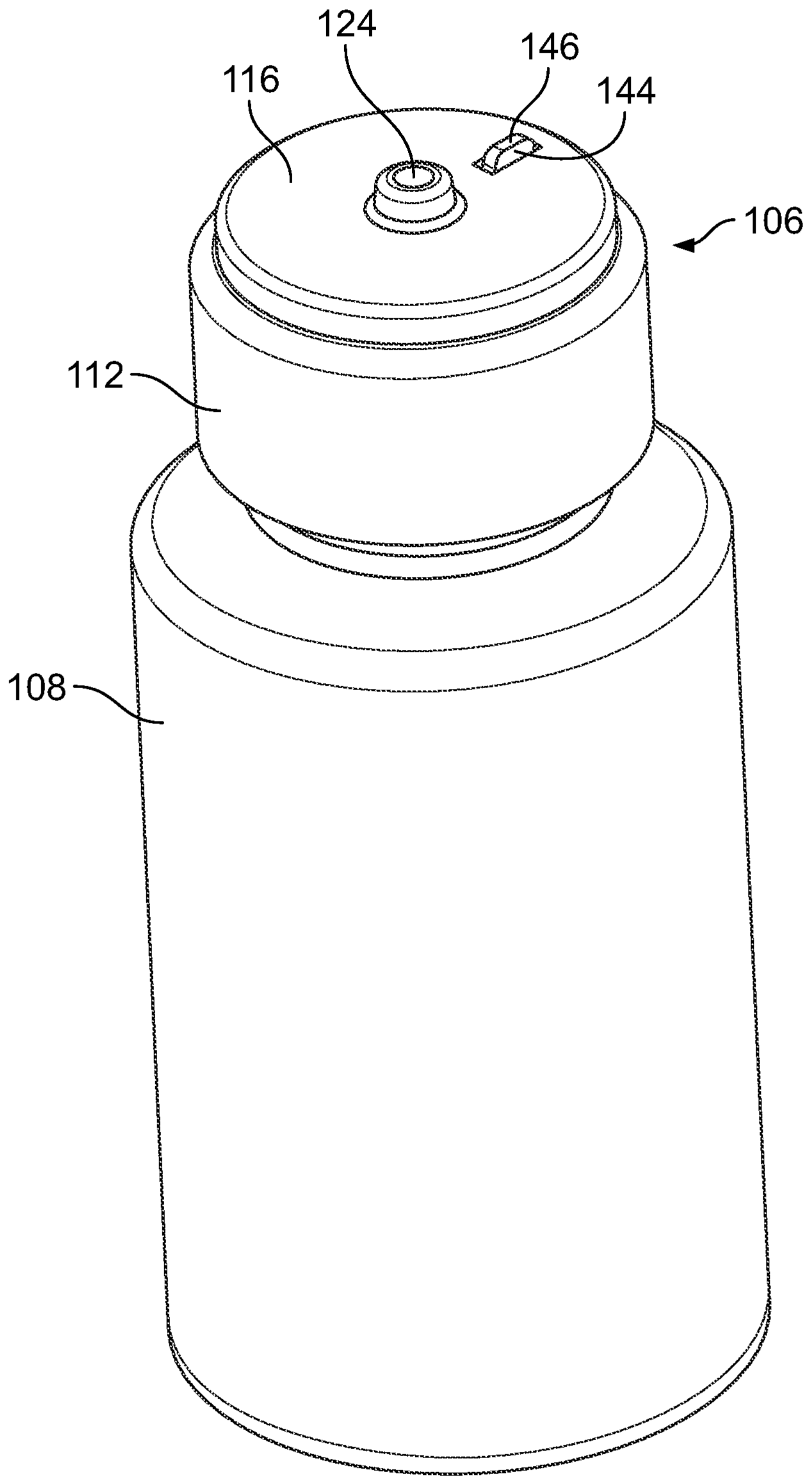
FIG. 2A is an upper perspective view of a vial having a second example protective locking system configured with a vial cap lock for one time use and that may be used with a transfer device, such as shown in FIG. 1A, or used separately, such as with a syringe needle, and having a non-removable key initially and permanently attached to a locking cap.
Figure 2B:
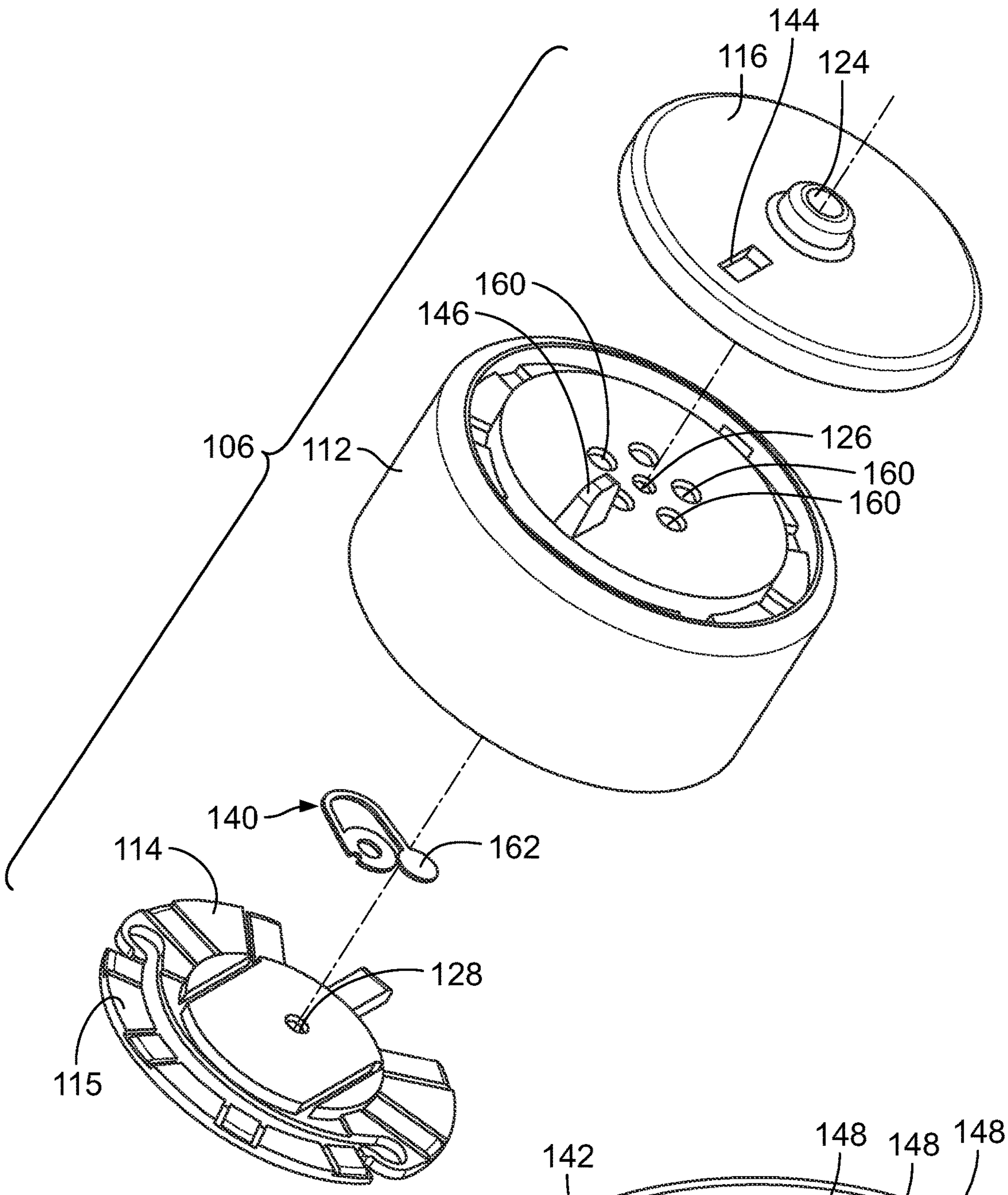
FIG. 2B is an upper perspective exploded view of the protective locking system for a vial having the vial cap lock shown in FIG. 2A removed from the vial for explanation purposes and including the non-removable key, the locking cap, a spring lock and a slide guard, and showing there may be alignment of respective needle openings through the key, the locking cap and the slide guard.
Figure 2C:
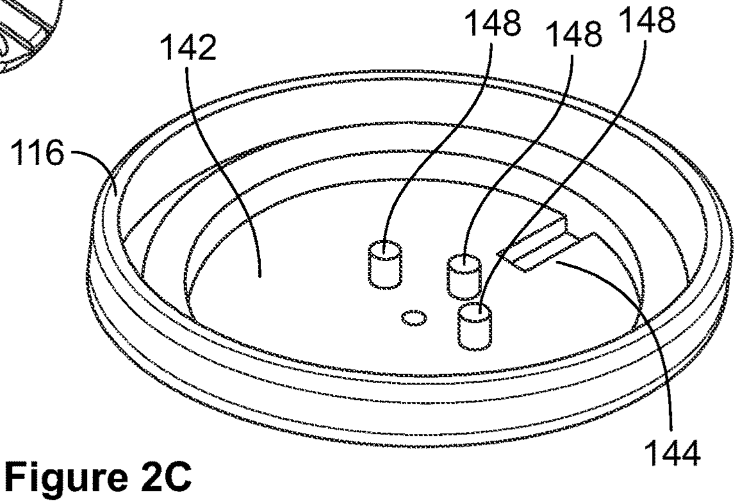
FIG. 2C is a perspective view of the underside of only the non-removable key shown in FIGS. 2A-2B and removed from the remainder of the locking cap for explanation purposes.

FIGS. 2A-2K illustrate a second example protective locking system 106 for use with a vial 108, which is configured with a vial cap lock for one time use and that may be used with a transfer device, such as shown in FIG. 1A, or used separately, such as with a syringe needle 120, and having a non-removable key 116, in the form of a lid, which is initially and permanently attached to a locking cap 112. As seen in FIG. 2B, the protective locking system 106 for a vial 108 includes the non-removable key 116, the locking cap 112, a spring lock 140 and a slide guard 114. The locking cap 112 is connected to the vial 108 via an inward extending shoulder 113 on the locking cap 112 that captures a rim of the vial 108. FIG. 2C shows the underside 142 of the non-removable key 116, which includes a locating opening 144 for proper registration with a locating projection 146 on the locking cap 112, as well as projections 148 that extend from the key 116.

Figure 2D:
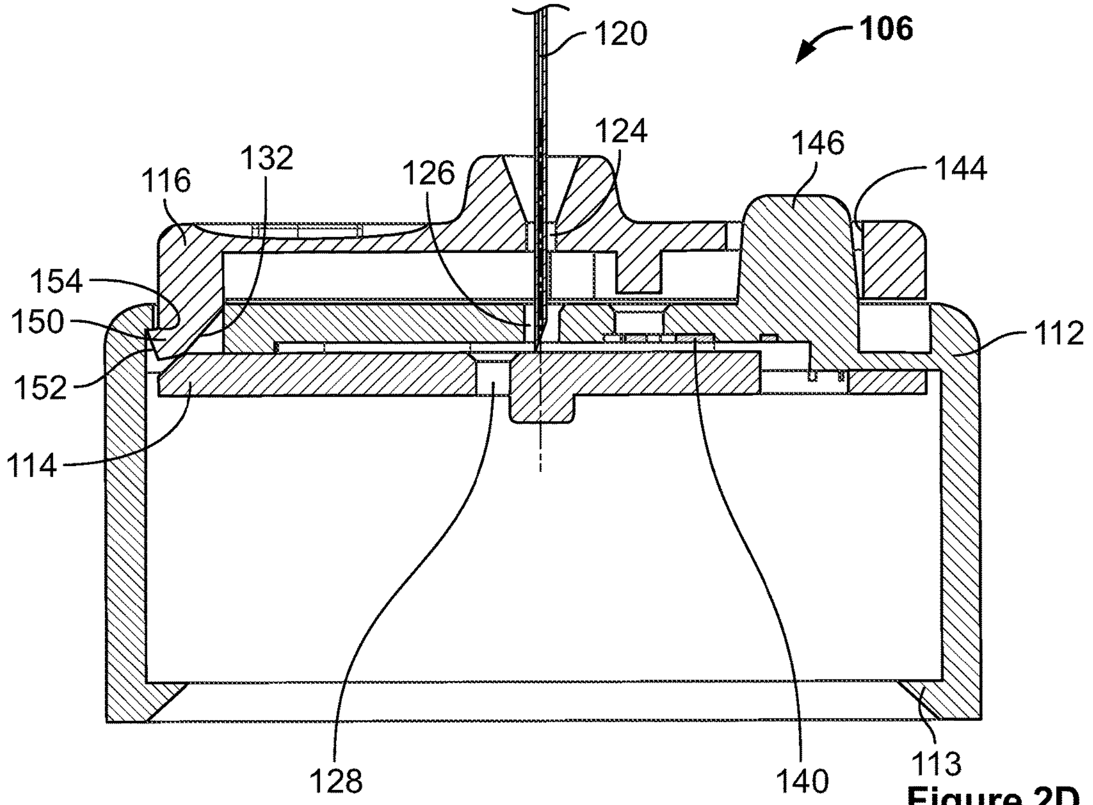
FIG. 2D is a cross-sectional view of the vial cap lock shown in FIGS. 2A-2C removed from the vial for explanation purposes, and further showing the slide guard blocking entry of a needle that is otherwise permitted to pass through the openings through the key and the locking cap, while the key is in an installed and fully raised first position.

FIG. 2D shows the slide guard 114 biased to a first position by a biasing portion 115 so as to be blocking entry of a needle 120 that is otherwise permitted to pass through the needle opening 124 through the key 116 and the needle opening 126 through the locking cap 112, while the key 116 is in an installed and fully raised first position. The key 116 includes at least one outward extension 150 that engages and results in the key 116 being non-removable from the locking cap 112. The at least one extension 150 has a cam surface 152 by which the key 116 may be previously installed to be non-removable by pushing it toward the locking cap 112 until the at least one extension 150 rides over and is trapped behind an inward extending shoulder 154 on the locking cap 112.

Figure 2E:
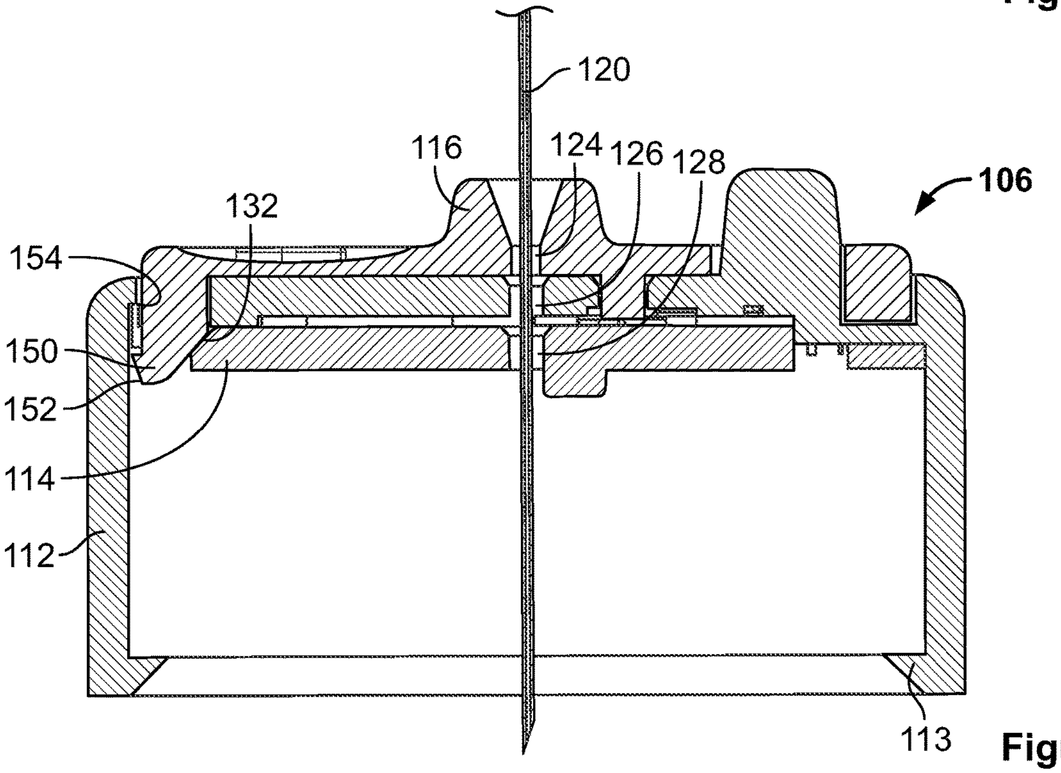
FIG. 2E is a cross-sectional view of the vial cap lock shown in FIG. 2D, having the key pushed or forced to a fully depressed second position, wherein the slide guard has been moved to align the needle opening therethrough with the respective needle openings through the key and the locking cap, and showing a needle passing through the respective needle openings and pins on the underside of the key have pushed and tripped the spring lock to be active, but the pins are temporarily holding the spring lock while the key is fully depressed

FIG. 2E shows the key 116 pushed or forced to a fully depressed second position, wherein the slide guard 114 has been moved from a first position wherein it was biased by a biasing portion 115 to a position blocking passage of the needle 120 to a second position to align the needle opening 128 therethrough with the respective needle openings 124, 126 through the key 116 and the locking cap 112, and showing a needle 120 passing through the respective needle openings 124, 126, 128. The slide guard 114 is moved from a first position to a second position when pushing downward on the key 116 due to an inward facing cam surface 132 on the key 116 that engages the slide guard 114.

The projections 148 that extend from the underside 142 of the key 116 may be in the form of pins, and they are aligned with actuation openings 160 through the locking cap 112. The spring lock 140 is located between the locking cap 112 and the slide guard 114. As seen in FIGS. 2E and 2I, when the key 116 is fully depressed, the projections 148 on the underside of the key 116 push and trip the spring lock 140 to move from an initial set position shown in FIG. 2H, wherein the needle opening 128 through the slide guard 114 is not aligned with the respective needle openings 124, 126 through the key 116 and the locking cap 112, to an active position shown in FIG. 2I. However, the projections 148 that extend from the key 116 also temporarily hold the spring lock 140, so as not to permit an arm 162 of the spring lock 140 to obstruct passage of the needle 120 while the key 116 is fully depressed.

Figure 2F:
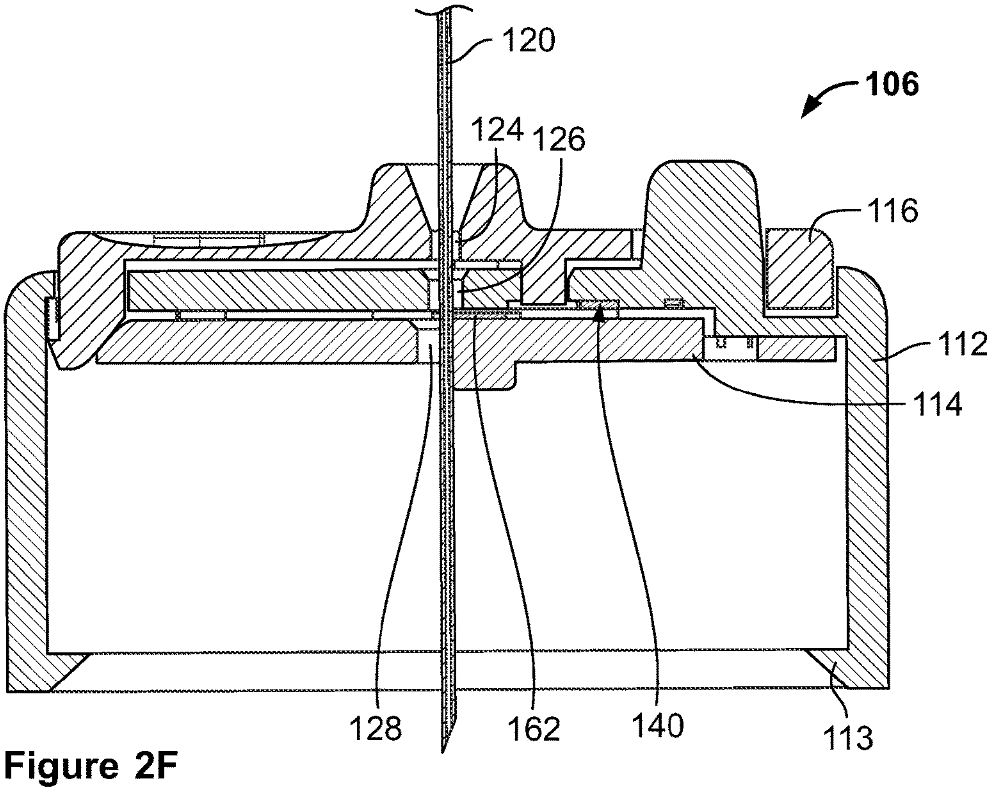
FIG. 2F is a cross-sectional view of the vial cap lock shown in FIGS. 2D-2E, having the pushing force on the key removed such that the key has moved to an intermediate third position between the fully raised first position and the fully depressed second position, wherein the slide guard and spring lock have moved to positions biased against the needle passing through the aligned respective needle openings through the key, the locking cap and the slide guard.
Figure 2G:
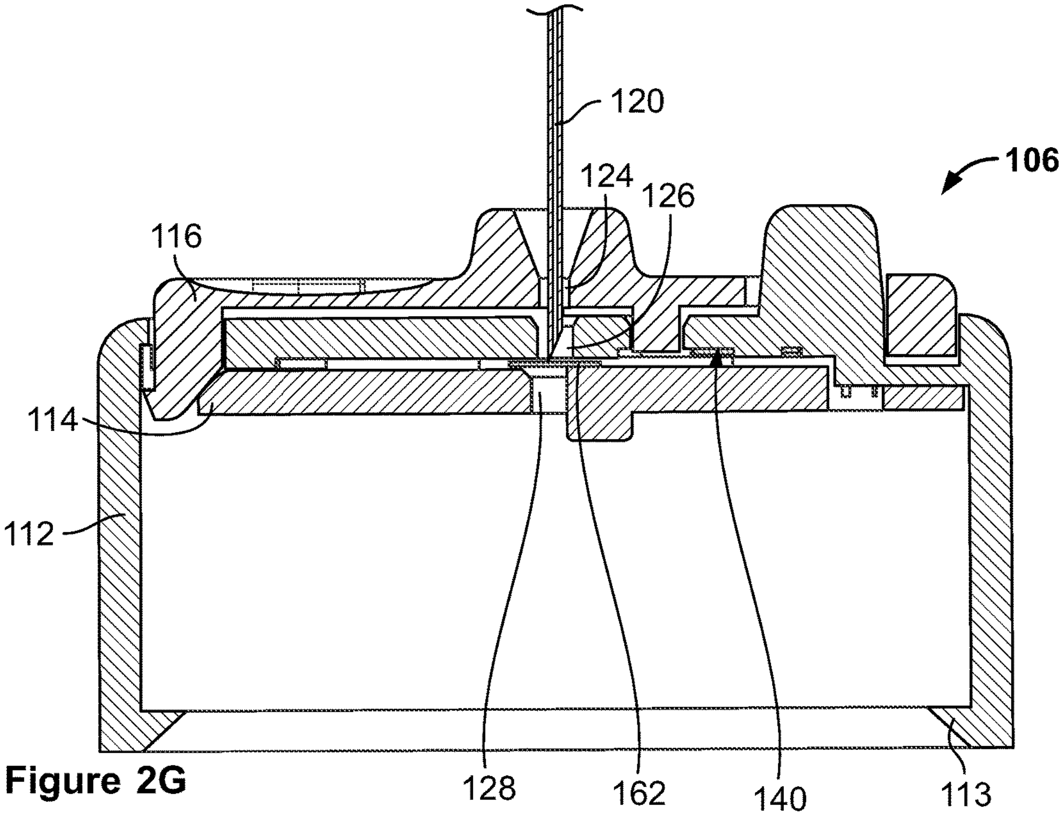
FIG. 2G is a cross-sectional view of the vial cap lock shown in FIGS. 2D-2F, after having removed the needle to the extent that the needle no longer passes through the needle opening through the slide guard, wherein the spring lock has moved to block the needle from passing through the slide guard, such as to enter a vial.
Figure 2H:
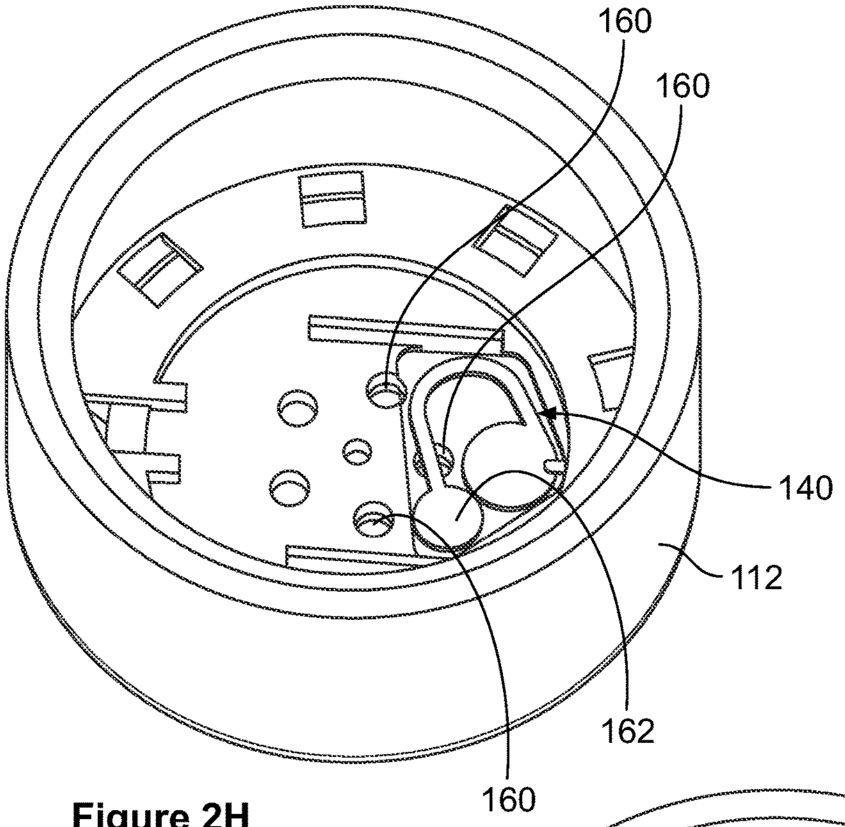
FIG. 2H is a perspective view of the underside of the vial cap lock corresponding to the fully raised first position of the key shown in FIG. 2D, wherein the needle opening through the slide guard is not aligned with the respective needle openings through the key and locking cap, and the spring lock is in an initial set position.
Figure 2I:
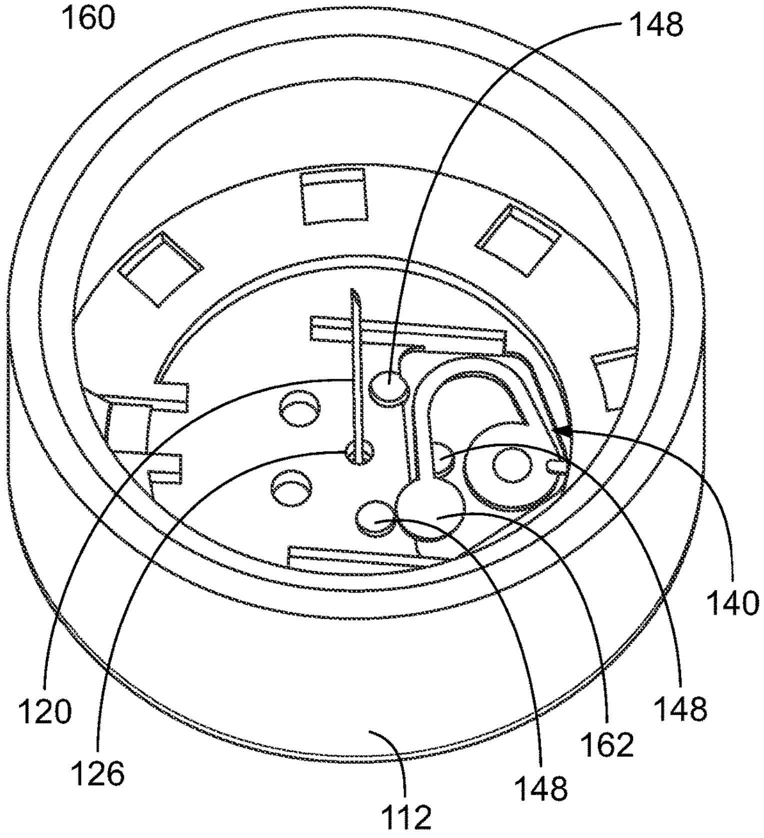
FIG. 2I is a perspective view of the underside of the vial cap lock corresponding to the fully depressed second position of the key shown in FIG. 2E, wherein the respective needle openings through the key, the locking cap and the slide guard are aligned, a needle is passing through the respective needle openings, and the pins on the underside of the key have pushed and tripped the spring lock to be active, but the pins are temporarily holding the spring lock while the key is fully depressed.
Figure 2J:
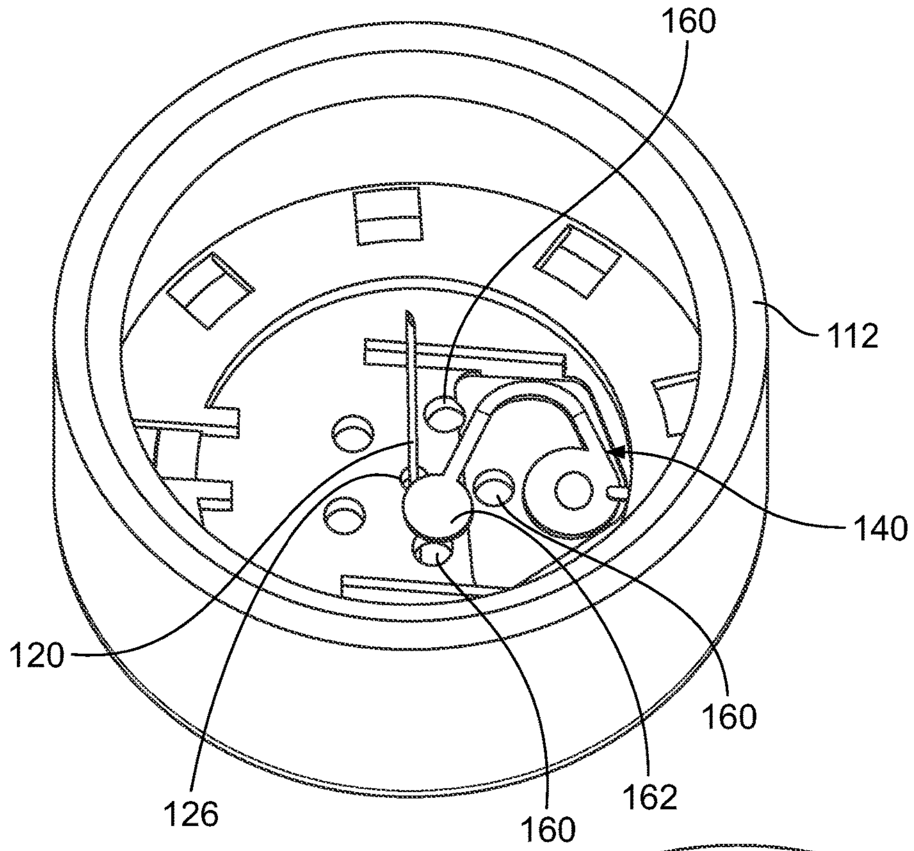
FIG. 2J is a perspective view of the underside of the vial cap lock corresponding to the intermediate third position of the key shown in FIG. 2F with the pushing force on the key removed, wherein the pins have released the active spring lock and the spring lock and slide guard have moved to be biased against the needle that is passing through the respective needle openings.

FIGS. 2F and 2J illustrate when the pushing force on the key 116 has been removed, such that the key 116 has moved to an intermediate third position between the fully raised first position and the fully depressed second position. In this intermediate position, the projections 148 extending from the underside of the key 116 are withdrawn from the actuation openings 160 through the locking cap 112, and release the active spring lock 140. The slide guard 114 and the arm 162 of the spring lock 140 have moved under the force of the biasing portion 115 to positions biased against the needle 120 passing through the aligned respective needle openings 124, 126, 128 through the key 116, the locking cap 112 and the slide guard 114.

Figure 2K:
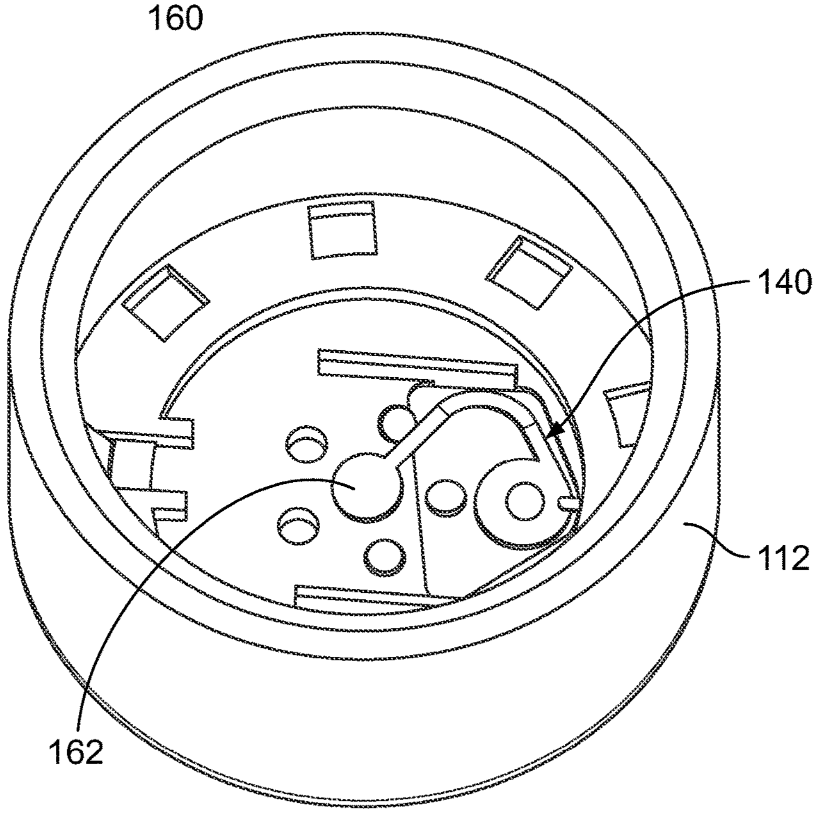
FIG. 2K is a perspective view of the underside of the vial cap lock corresponding to having removed the needle to the extent that the needle no longer passes through the needle opening through the slide guard as shown in FIG. 2G, wherein the spring lock has moved to block the needle from passing through the slide guard, such as to enter a vial.

As seen in FIGS. 2G and 2K, when the needle 120 has been removed to the extent that the needle 120 no longer passes through the needle opening 128 through the slide guard 114, the spring lock 140, by means of its arm 162, has moved to cover the needle opening 126 through the locking cap 112, so as to block the needle 120 from passing through the slide guard 114, such as to enter a vial 108.

Figure 3A:
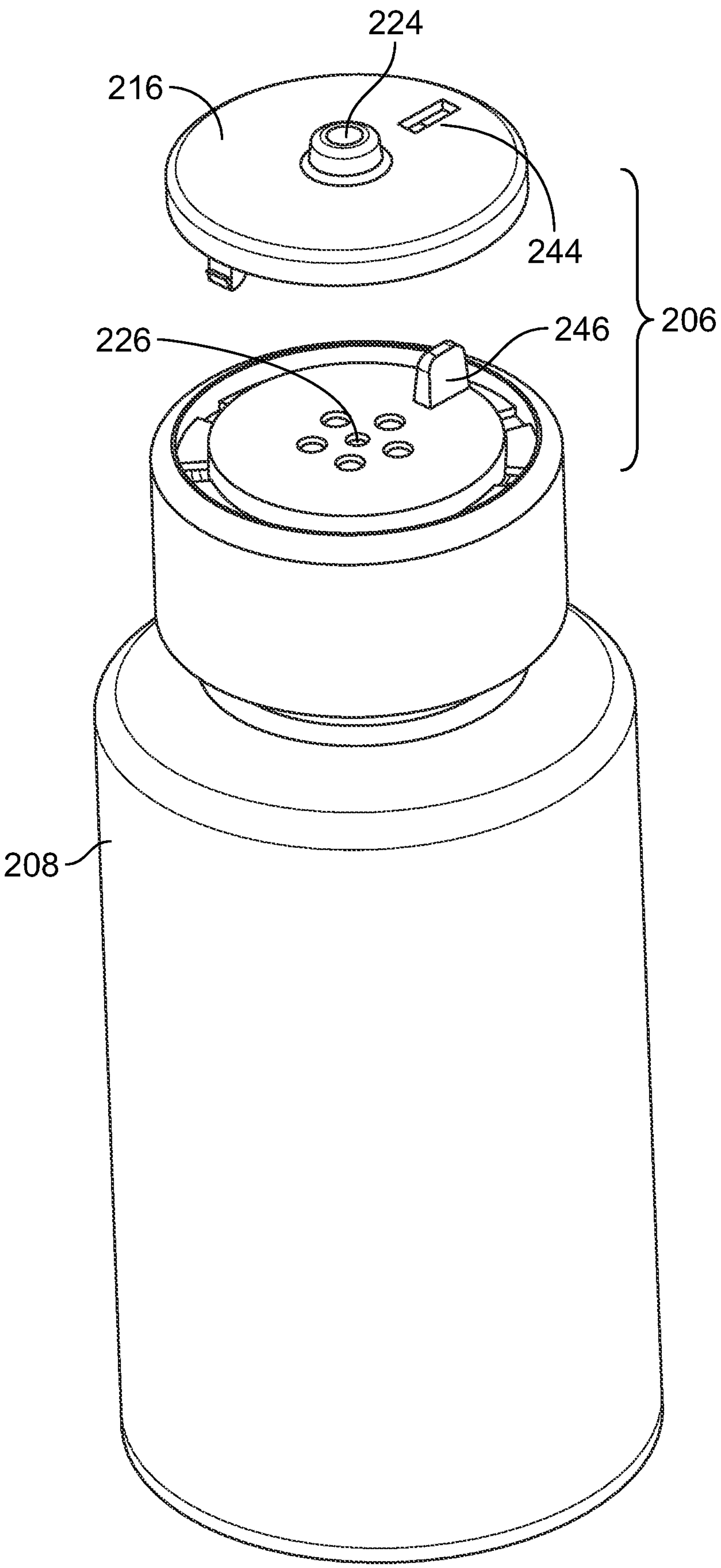
FIG. 3A is an upper perspective view of a vial having a third example protective locking system configured with a vial cap lock for one time use and that may be used with a transfer device, such as shown in FIG. 1A, or used separately, such as with a syringe needle, and having a key that is brought to the vial to unlock the vial for one time use and thereafter is non-removable from the locking cap on the vial.
Figure 3B:
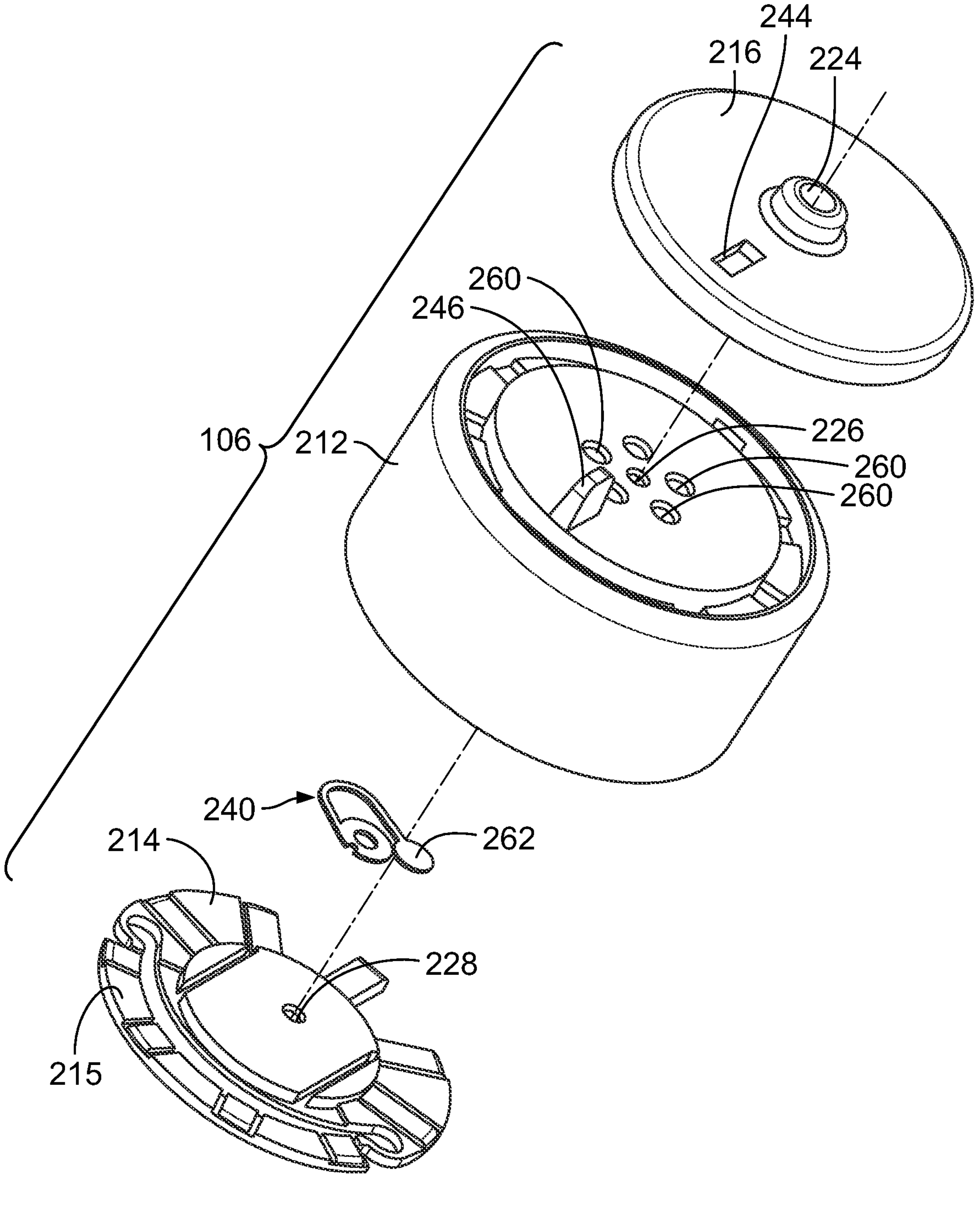
FIG. 3B is an upper perspective exploded view of the protective locking system for a vial having the vial cap lock shown in FIG. 3A removed from the vial for explanation purposes and including the key, the locking cap, a spring lock and a slide guard, and showing there may be alignment of the respective needle openings through the key, the locking cap and the slide guard.

Turning to FIGS. 3A-3J, a third protective locking system 206 for use with a vial 208, which is configured with a vial cap lock for one time use and that may be used with a transfer device, such as shown in FIG. 1A, or used separately, such as with a syringe needle 220, and having a key 216, in the form of a lid, which is brought to a locking cap 212 on the vial 208, to unlock the vial 208 for one time use and thereafter is non-removable from the locking cap 212 on the vial 208. As seen in FIG. 3B, the protective locking system 206 for a vial 208 includes the key 216, the locking cap 212, a spring lock 240 and a slide guard 214. The locking cap 312 is connected to the vial 308 via an inward extending shoulder 313 on the locking cap 312 that captures a rim of the vial 308. The key 216 includes a locating opening 244 for proper registration with a locating projection 246 on the locking cap 212. The underside of the locking cap 212 is constructed similarly to that which is shown in FIG. 2C, with projections 248 that extend from the key 216.

Figure 3C:
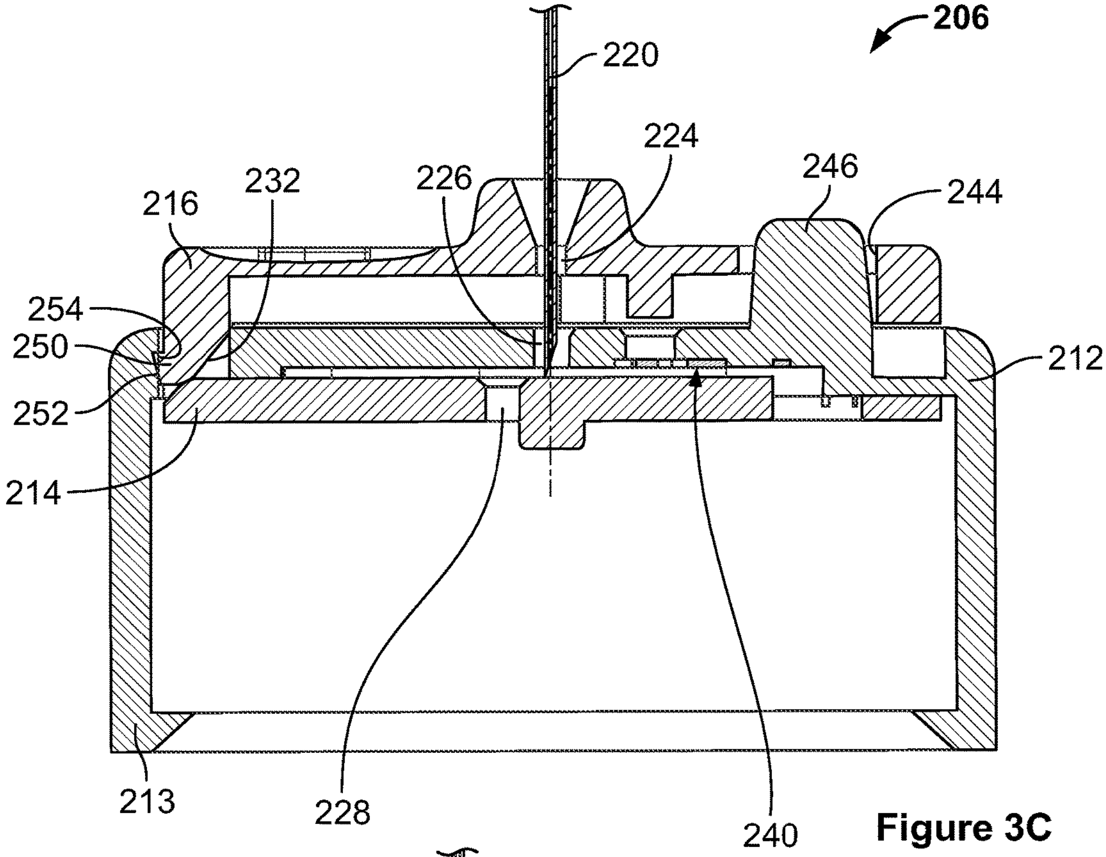
FIG. 3C is a cross-sectional view of the vial cap lock shown in FIGS. 3A-3B removed from the vial for explanation purposes, and further showing the slide guard blocking entry of a needle that is otherwise permitted to pass through the respective needle openings through the key and the locking cap, after the key is in an installed and fully raised first position.

FIG. 3C shows the slide guard 214 biased to a first position by a biasing portion 115 so as to be blocking entry of a needle 220 that is otherwise permitted to pass through the respective needle openings 224, 226 through the key 216 and the locking cap 212, after the key 216 is in an installed and fully raised first position. The key 216 includes at least one outward extension 250 that engages and results in the key 216 being non-removable from the locking cap 212. The at least one extension 250 has a cam surface 252 by which the key 216 may be pushed toward the locking cap 212 until the at least one extension 250 rides over and is trapped behind an inward extending shoulder 254 on the locking cap 212, thereby becoming non-removable.

Figure 3D:
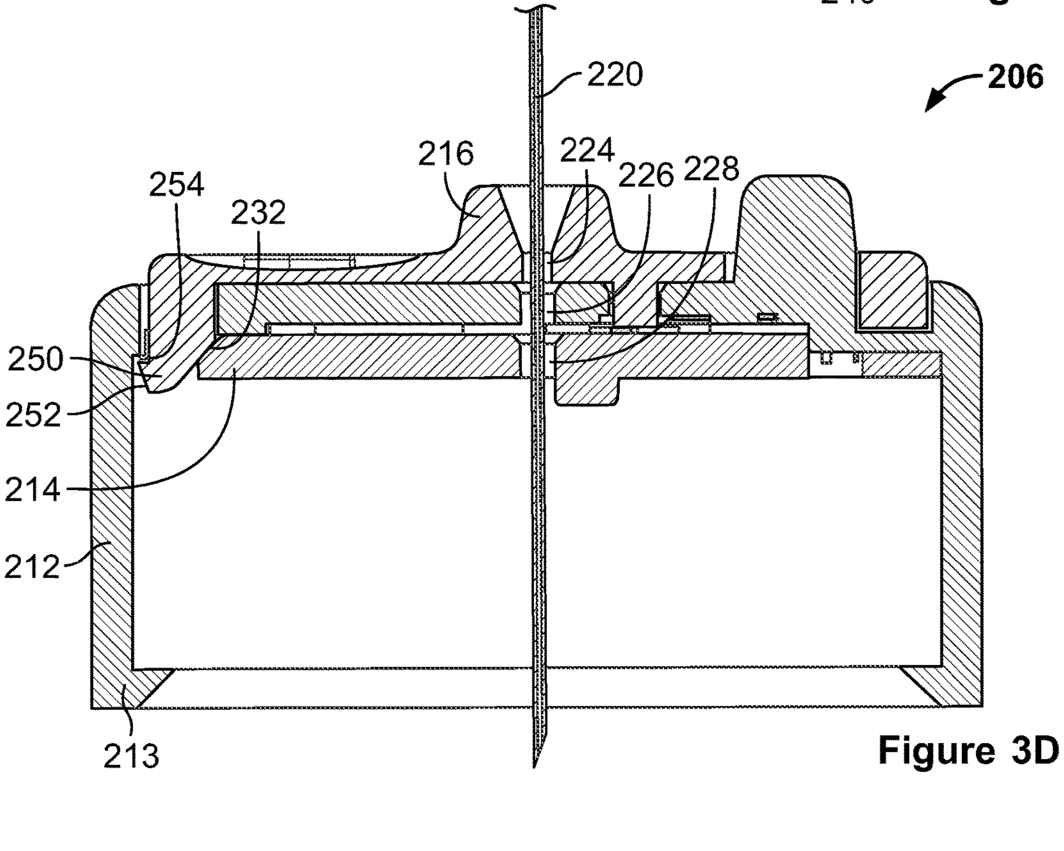
FIG. 3D is a cross-sectional view of the vial cap lock shown in FIG. 3C, having the key pushed or forced to a fully depressed second position, wherein the slide guard has been moved to align the needle opening therethrough with the respective needle openings through the key and the locking cap, and showing a needle passing through the respective needle openings and pins on the underside of the key have pushed and tripped the spring lock to be active, but the pins are temporarily holding the spring lock while the key is fully depressed.

FIG. 3D shows the key 216 pushed or forced to a fully depressed second position, wherein the slide guard 214 has been moved from a first position wherein it was biased by a biasing portion 215 to a position blocking passage of the needle 220 to a second position to align the needle opening 228 therethrough with the respective needle openings 224, 226 through the key 216 and the locking cap 212, and showing a needle 220 passing through the respective needle openings 224, 226, 228. The slide guard 214 is moved from a first position to a second position when pushing downward on the key 216 due to an inward facing cam surface 232 on the key 216 that engages the slide guard 214.

The projections 248 that extend from the underside of the key 216 may be constructed in the same manner as described with respect to the second example. Thus, the projections 248 may be in the form of pins, and they are aligned with actuation openings 260 through the locking cap 212. The spring lock 240 is located between the locking cap 212 and the slide guard 214. As seen in FIGS. 3D and 3H, when the key 216 is fully depressed, the projections 248 on the underside of the key 216 push and trip the spring lock 240 to move from an initial set position shown in FIG. 3G, wherein the needle opening 228 through the slide guard 214 is not aligned with the respective needle openings 224, 226 through the key 216 and the locking cap 212, to an active position shown in FIG. 3H. However, the projections 248 that extend from the key 216 also temporarily hold the spring lock 240, so as not to permit an arm 262 of the spring lock 240 to obstruct passage of the needle 220 while the key 216 is fully depressed.

Figure 3E:
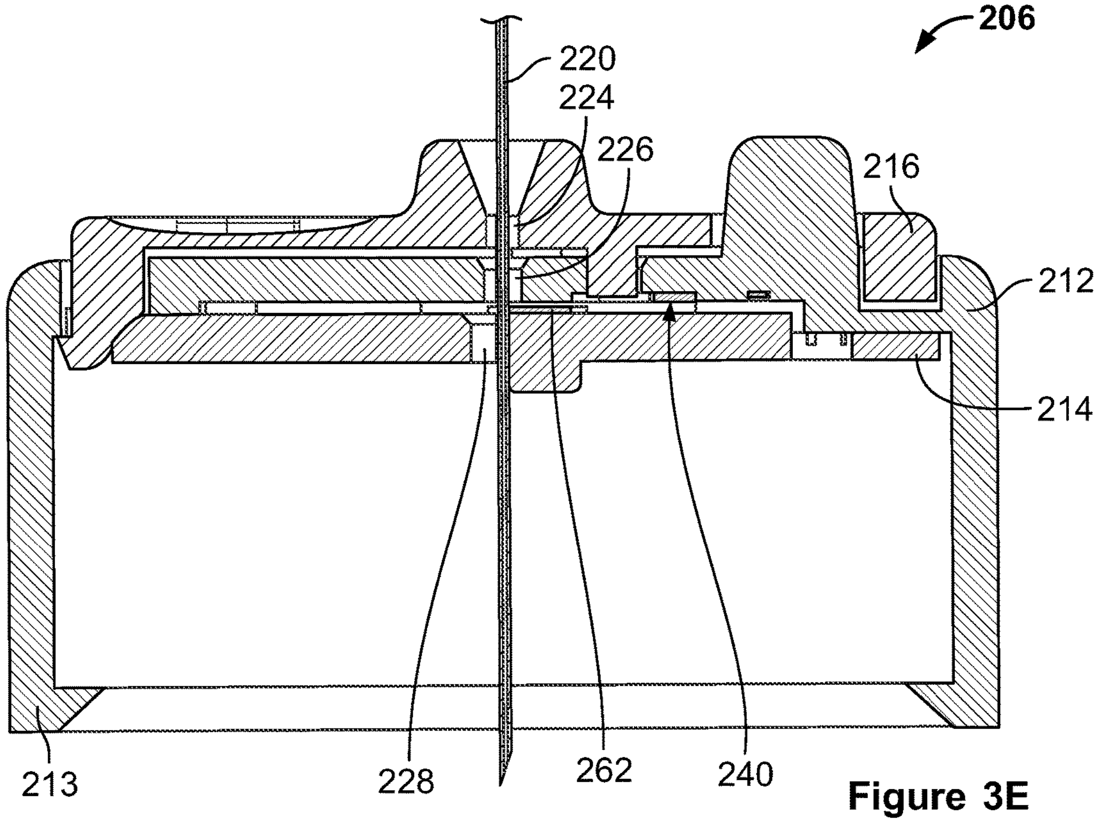
FIG. 3E is a cross-sectional view of the vial cap lock shown in FIGS. 3C-3D, having the pushing force on the key removed such that the key has moved to an intermediate third position between the fully raised first position and the fully depressed second position, wherein the slide guard and spring lock have moved to positions biased against the needle passing through the aligned respective needle openings through the key, the locking cap and the slide guard.
Figure 3F:
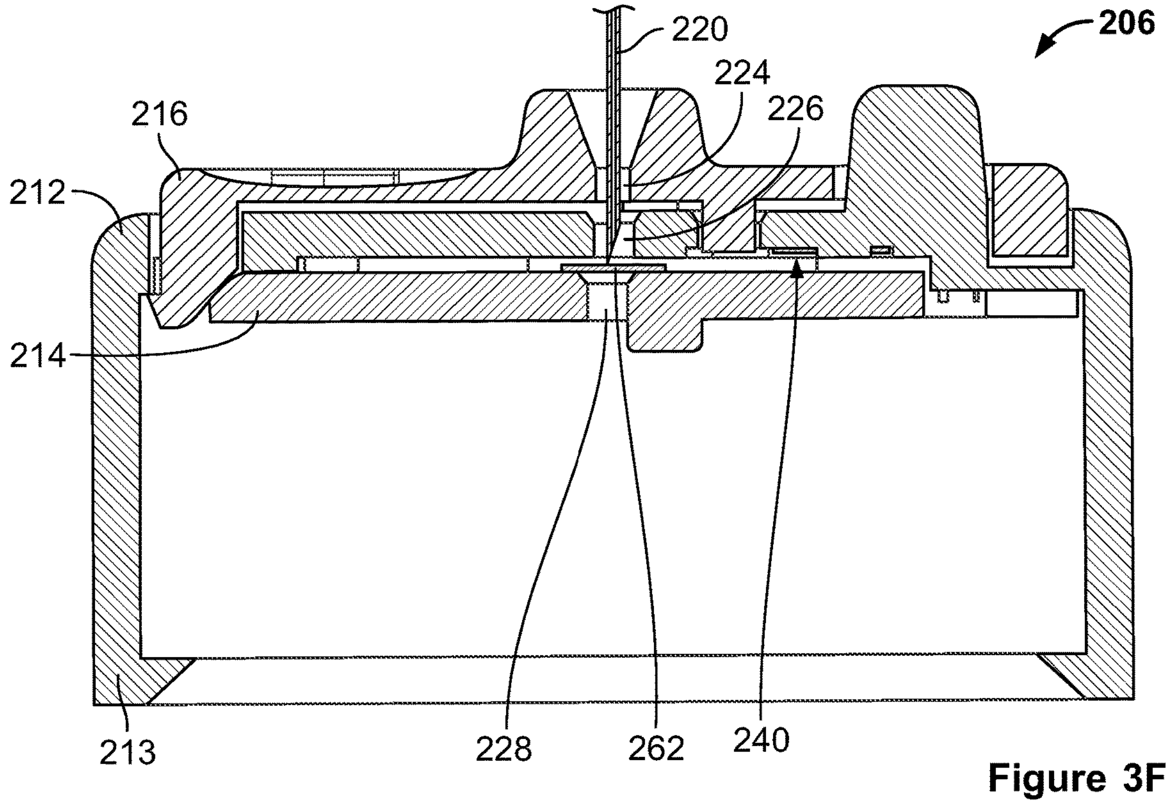
FIG. 3F is a cross-sectional view of the vial cap lock shown in FIGS. 3C-3E, after having removed the needle to the extent that the needle no longer passes through the opening through the slide guard, wherein the spring lock has moved to block the needle from passing through the slide guard, such as to enter a vial.
Figure 3G:
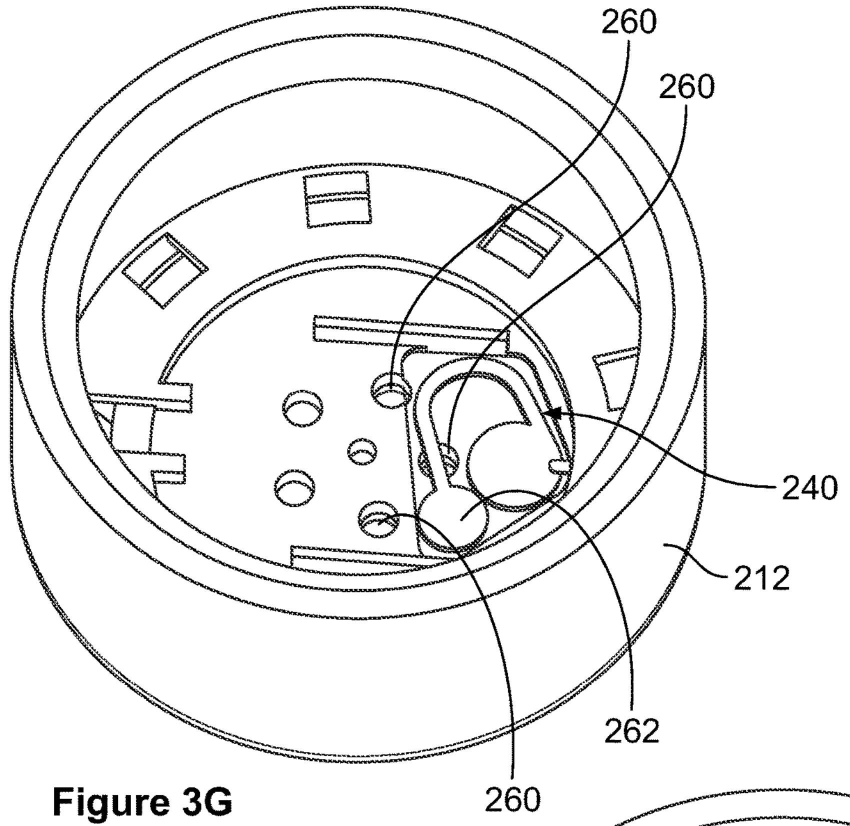
FIG. 3G is a perspective view of the underside of the vial cap lock corresponding to the fully raised first position of the key shown in FIG. 3C, wherein the opening through the slide guard is not aligned with the openings through the key and locking cap, and the spring lock is in an initial set position.
Figure 3H:
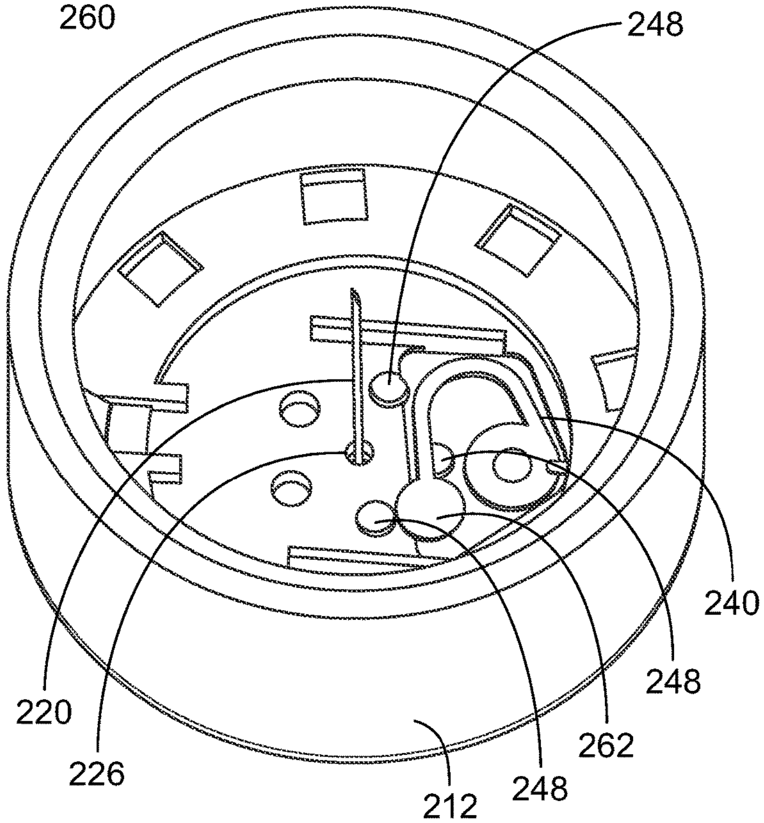
FIG. 3H is a perspective view of the underside of the vial cap lock corresponding to the fully depressed second position of the key shown in FIG. 3D, wherein the respective needle openings through the key, the locking cap and the slide guard are aligned, a needle is passing through the respective needle openings, and pins on the underside of the key have pushed and tripped the spring lock to be active, but the pins are temporarily holding the spring lock while the key is fully depressed.
Figure 3I:
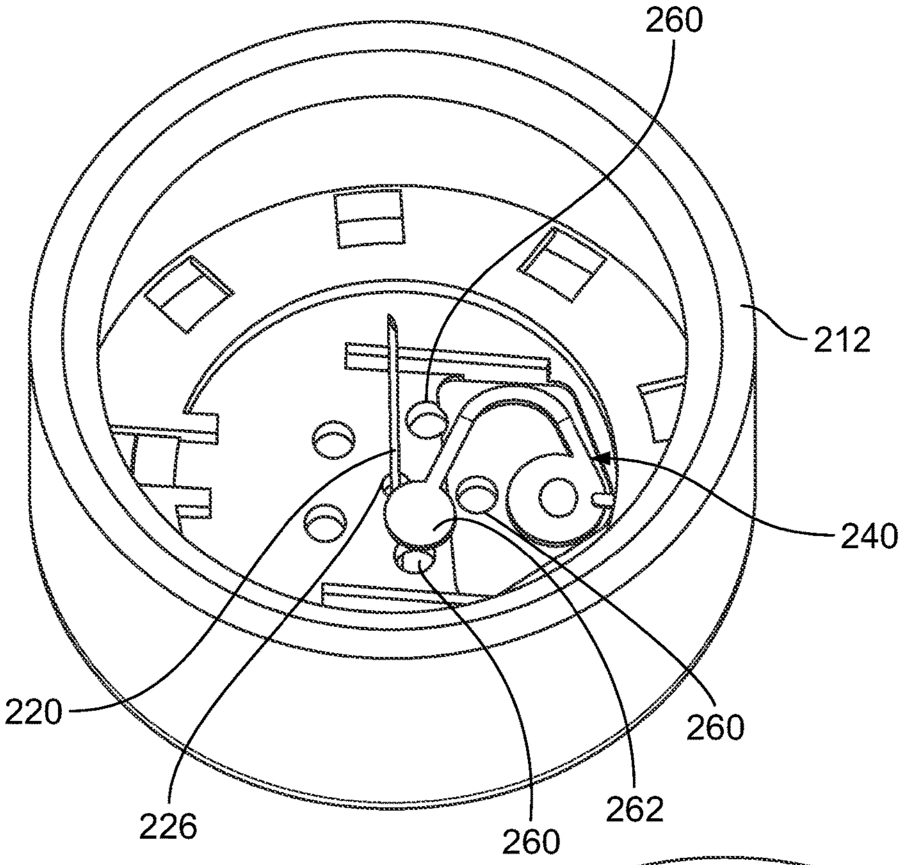
FIG. 3I is a perspective view of the underside of the vial cap lock corresponding to the intermediate third position of the key shown in FIG. 3E with the pushing force on the key removed, wherein the pins have released the active spring lock and the spring lock and slide guard have moved to be biased against the needle that is passing through the respective needle openings.

FIGS. 3E and 3I illustrate when the pushing force on the key 216 has been removed, such that the key 216 has moved to an intermediate third position between the fully raised first position and the fully depressed second position. In this intermediate position, the projections 248 extending from the underside of the key 216 are withdrawn from the actuation openings 260 through the locking cap 212, and release the active spring lock 240. The slide guard 214 and the arm 262 of the spring lock 240 have moved under the force of the biasing portion 215 to positions biased against the needle 220 passing through the aligned respective needle openings 224, 226, 228 through the key, the locking cap and the slide guard.

Figure 3J:
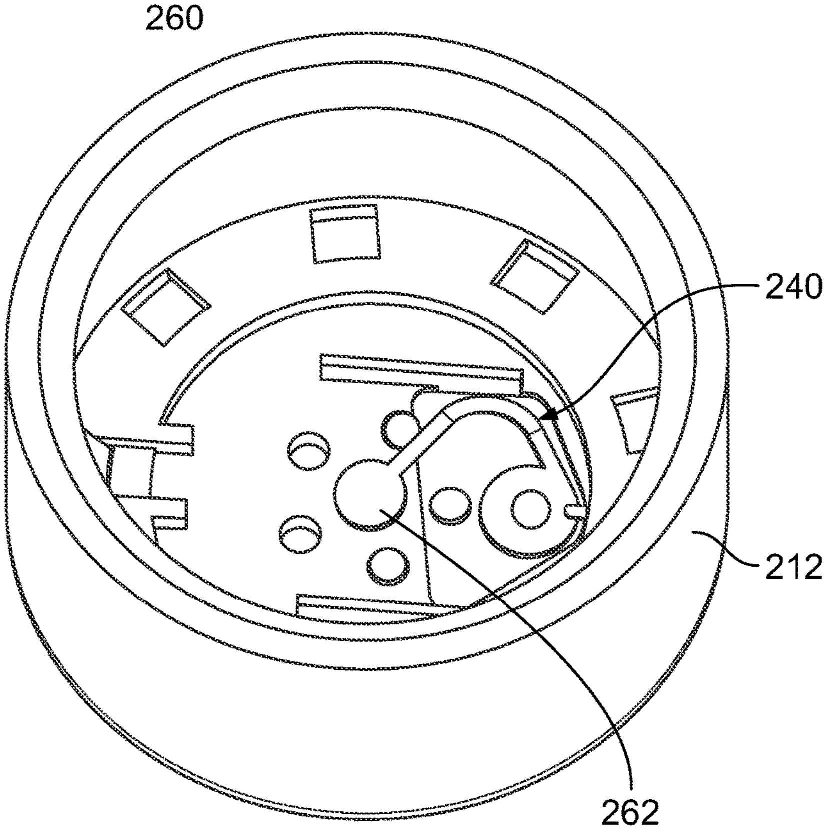
FIG. 3J is a perspective view of the underside of the vial cap lock corresponding to having removed the needle to the extent that the needle no longer passes through the needle opening through the slide guard as shown in FIG. 3F, wherein the spring lock has moved to block the needle from passing through the slide guard, such as to enter a vial.

As seen in FIGS. 3F and 3J, when the needle 220 has been removed to the extent that the needle 220 no longer passes through the needle opening 228 through the slide guard 214, the spring lock 240, by means of its arm 262, has moved to cover the needle opening 226 through the locking cap 212, so as to block the needle 220 from passing through the slide guard 214, such as to enter a vial 208.

Figure 4A:
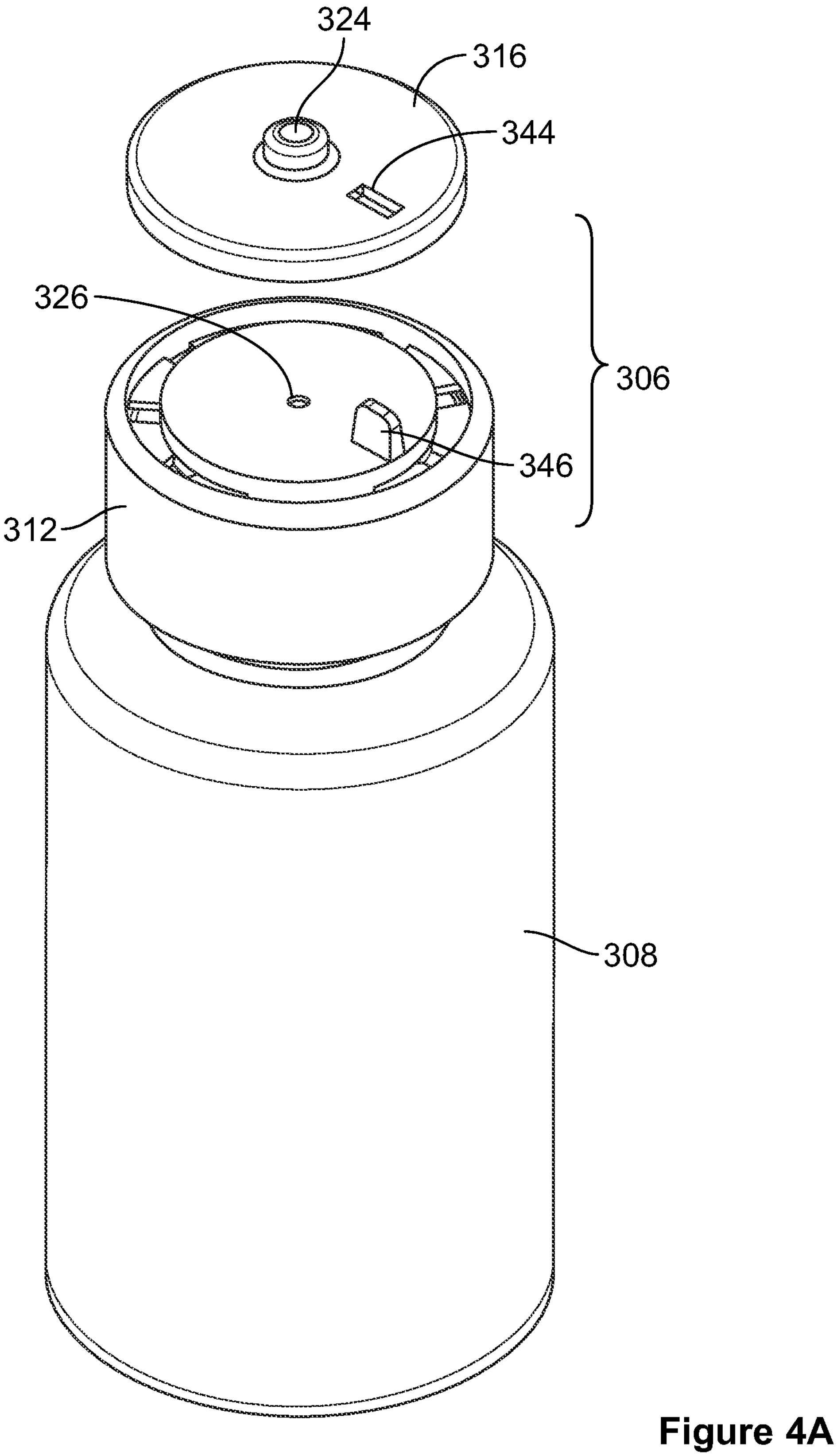
FIG. 4A is an upper perspective view of a vial having a fourth example protective locking system which is reusable and configured with a vial cap lock providing access via a separate reusable generic key and that may be used with a transfer device, such as shown in FIG. 1A, or used separately, such as with a syringe needle, and wherein the key is brought to the vial to unlock the vial for use and thereafter is removable from the locking cap on the vial.
Figure 4B:
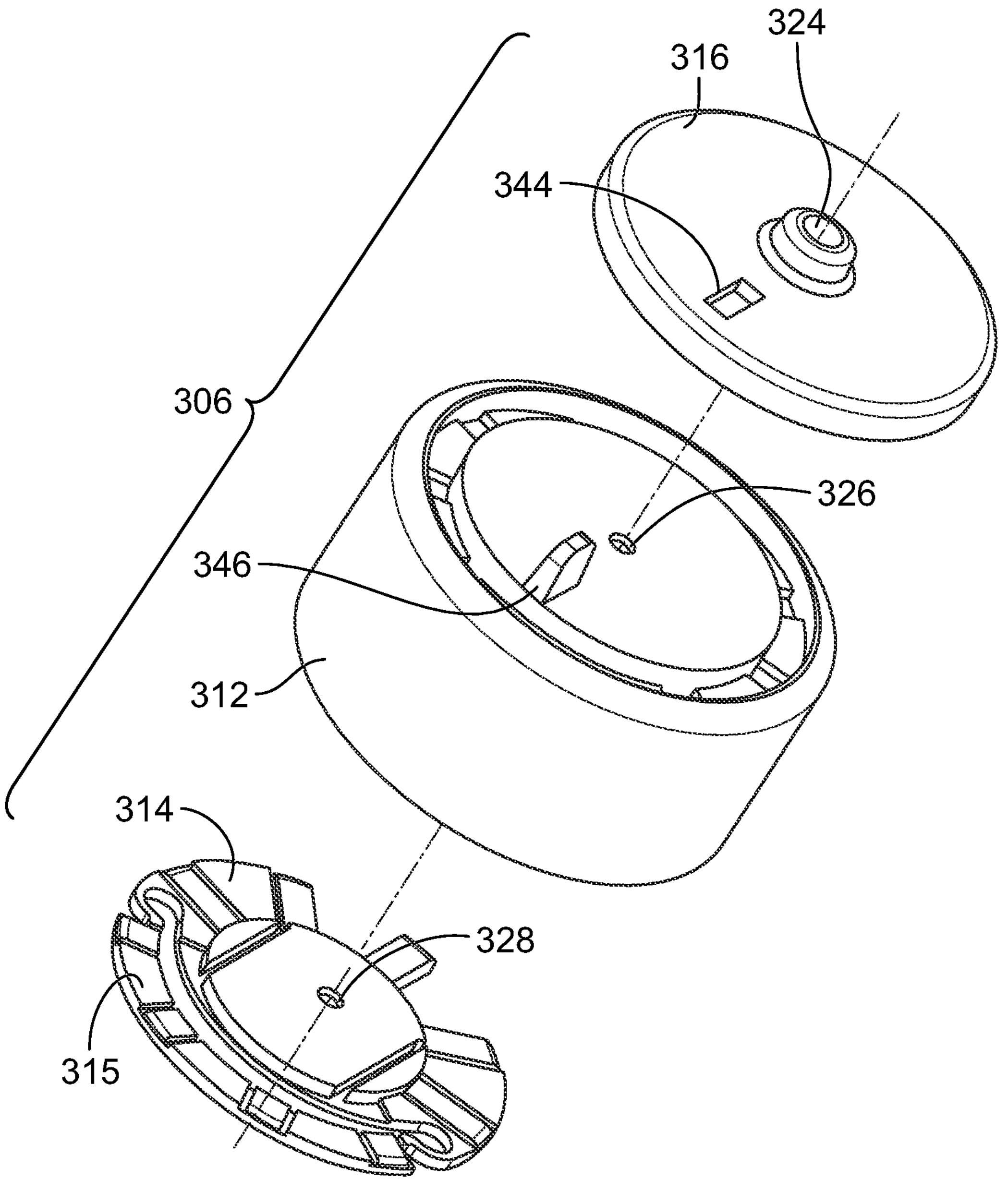
FIG. 4B is an upper perspective exploded view of the protective locking system for a vial having the vial cap lock shown in FIG. 4A removed from the vial for explanation purposes and including the key, the locking cap and a slide guard, and showing there may be alignment of respective needle openings through the key, the locking cap and the slide guard.

Turning to FIGS. 4A-4J, a fourth protective locking system 306 for use with a vial 308, which has a vial cap lock providing access via a separate reusable generic key 316 and that may be used with a transfer device, such as shown in FIG. 1A, or used separately, such as with a syringe needle 320. The key 316, in the form of a lid, is brought to a locking cap 312 on the vial 308, to unlock the vial 308 and is reusable. Thus, the key 316 is removable from a locking cap 312 on the vial 308 after use. As seen in FIG. 4B, the protective locking system 306 for a vial 308 includes the key 316, the locking cap 312 and a slide guard 314. The key 316 includes a locating opening 344 for proper registration with a locating projection 346 on the locking cap 312.

FIG. 4B shows the protective locking system 306 includes the key 316, the locking cap 312 and a slide guard 314, and shows there may be alignment of respective needle openings 324, 326, 328 through the key 316, the locking cap 312 and the slide guard 314. The locking cap 312 is connected to the vial 308 via an inward extending shoulder 313 on the locking cap 312 that captures a rim of the vial 308.

Figure 4C:
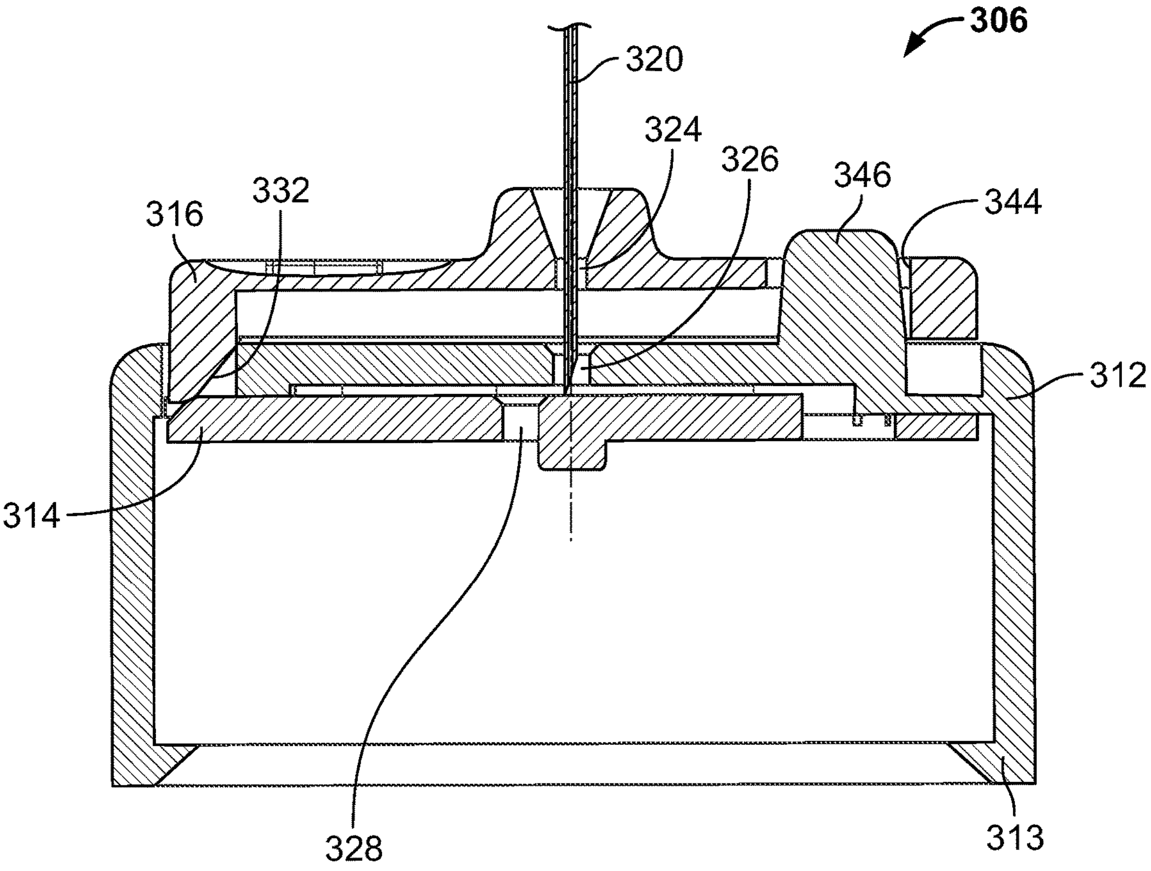
FIG. 4D is a cross-sectional view of the vial cap lock shown in FIG. 4C, having the key pushed or forced to a fully depressed second position, wherein the slide guard has been moved to align the needle opening therethrough with the respective needle openings through the key and the locking cap, and showing a needle passing through the respective needle openings.
FIG. 4E is a cross-sectional view of the vial cap lock shown in FIGS. 4C-4D, having the key released, wherein the slide guard has moved to a position biased against the needle passing through the aligned respective needle openings through the key, the locking cap and the slide guard.
FIG. 4F is a cross-sectional view of the vial cap lock shown in FIGS. 4C-4E, after having released the key and removed the needle to the extent that the needle no longer passes through the needle opening through the slide guard, wherein the slide guard has moved to block the needle from passing through the slide guard, such as to enter a vial.
FIG. 4G is a perspective view of the underside of the vial cap lock corresponding to the fully raised first position of the key shown in FIG. 4C, wherein the slide guard is in a position that blocks entry of a needle.
FIG. 4H is a perspective view of the underside of the vial cap lock corresponding to the fully depressed second position of the key shown in FIG. 4D, wherein the respective needle openings through the key, the locking cap and the slide guard are aligned and a needle is passing through the respective needle openings.
FIG. 4I is a perspective view of the underside of the vial cap lock corresponding to having released the key as shown in FIG. 4E, wherein the slide guard has moved to be biased against the needle that is passing through the respective needle openings.
FIG. 4J is a perspective view of the underside of the vial cap lock corresponding to having released the key and removed the needle to the extent that it no longer passes through the needle opening through the slide guard as shown in FIG. 4F, wherein the slid guard has moved to block the needle from passing through the slide guard, such as to enter a vial.
Figure 4D:
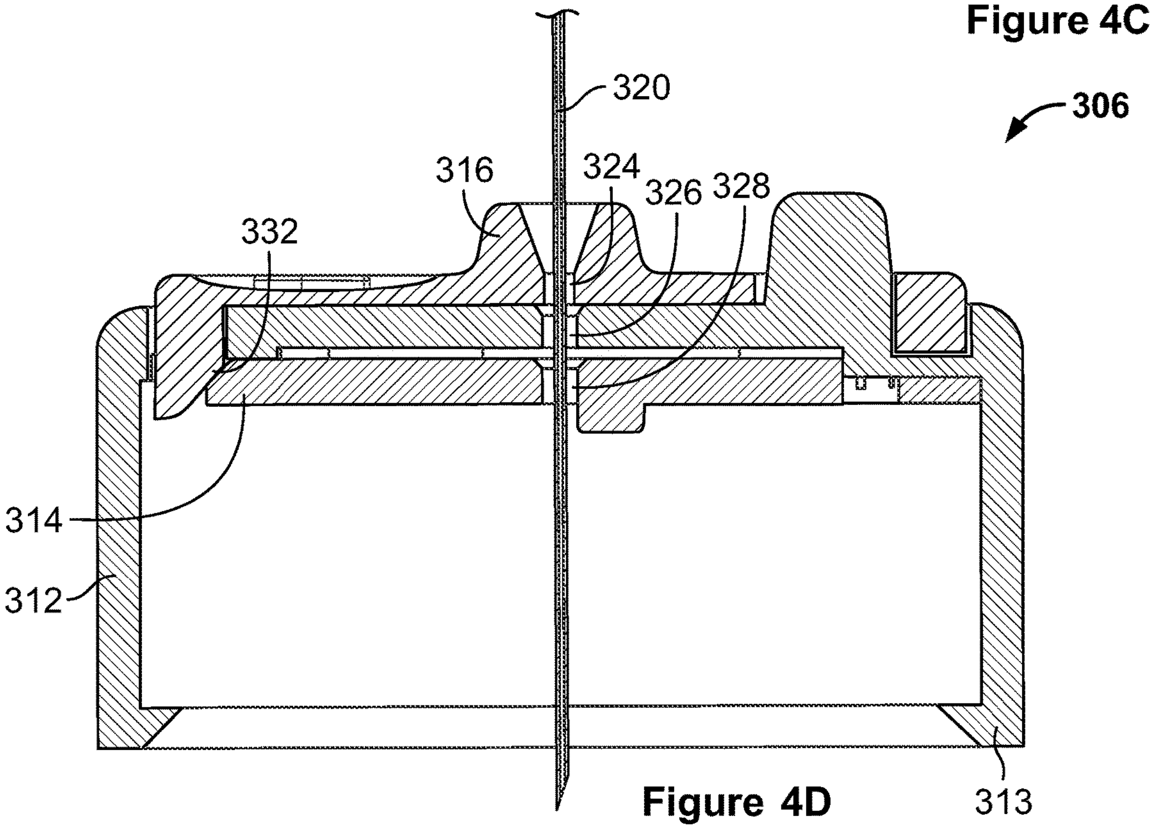
Figure 4E:
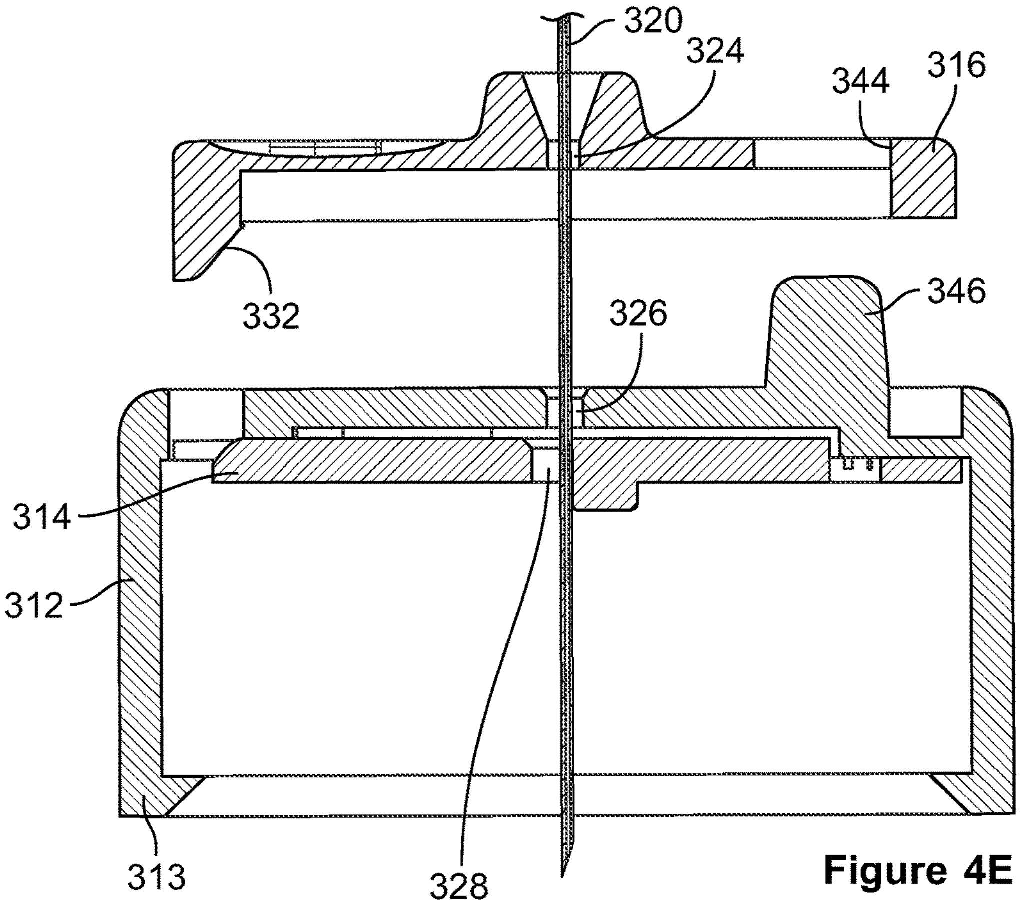
Figure 4F:
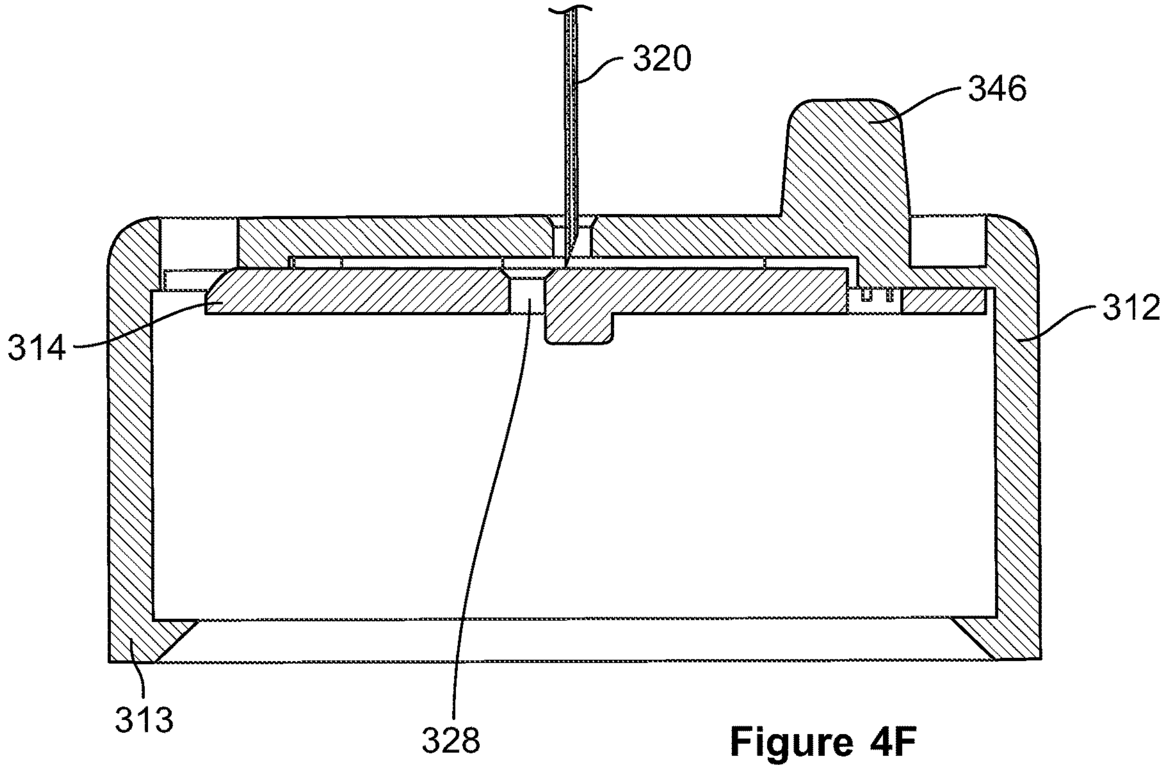
Figure 4G:
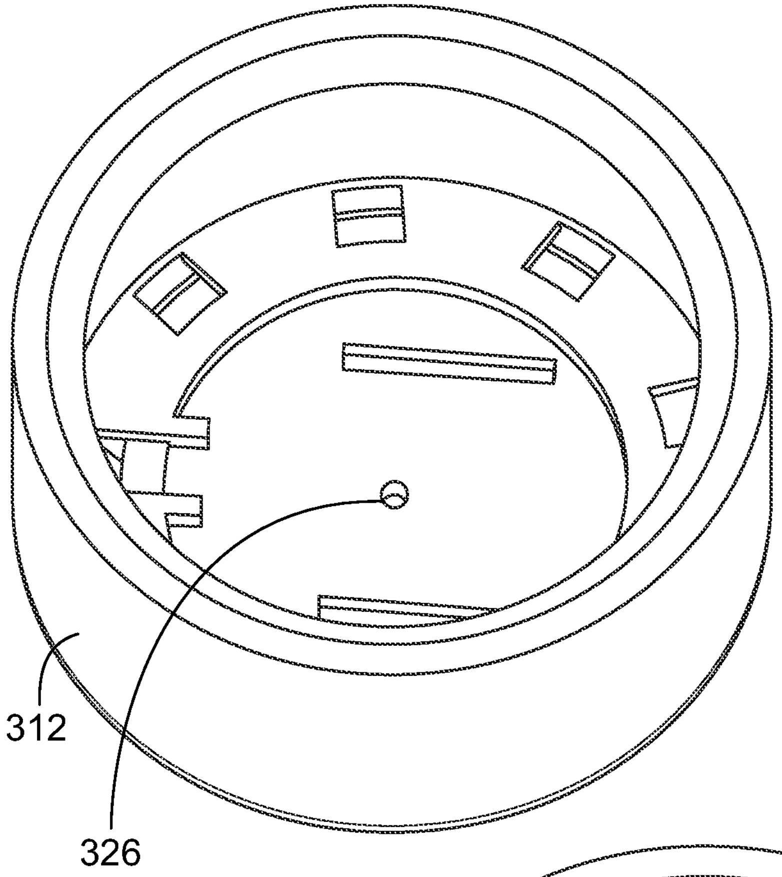
Figure 4H:
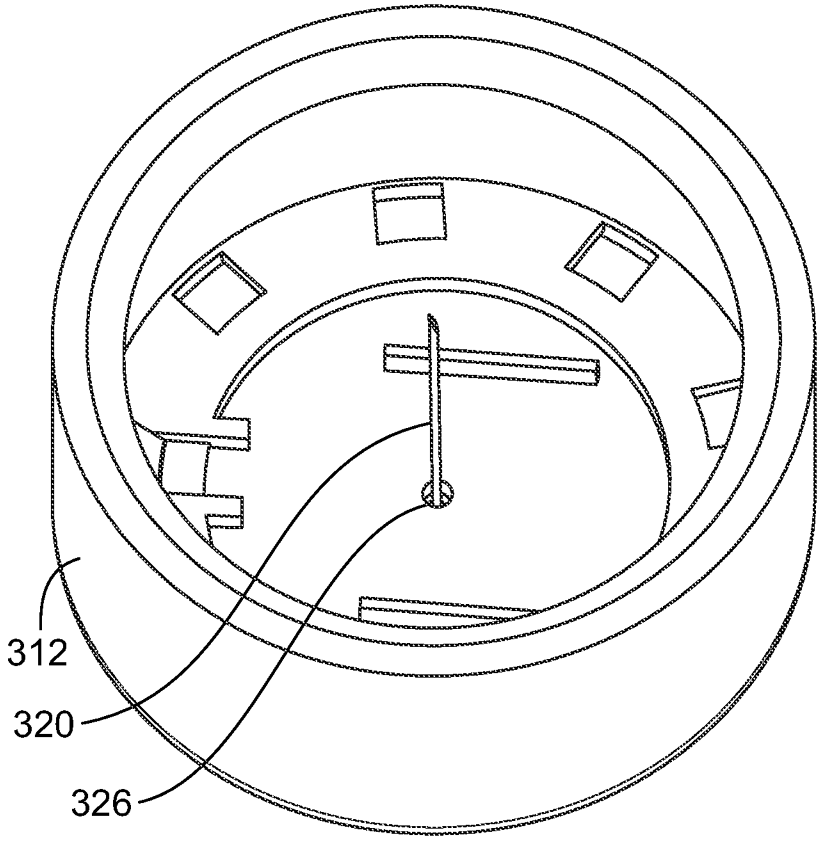

FIGS. 4C and 4G show the slide guard 314 biased to a first position by a biasing portion 315 so as to be blocking entry of a needle 320 that is otherwise permitted to pass through the respective needle openings 324, 326 through the key 316 and the locking cap 312, after the key 316 is brought to the locking cap 312 and is in a fully raised first position. The key 316 is removable and reusable, so it does not have features that cause it to become permanently attached to the locking cap 312. FIGS. 4D and 4H show the key 316 pushed or forced to a fully depressed second position, wherein the slide guard 314 has been moved from the first position wherein it was biased by a biasing portion 315 to a position blocking passage of the needle 320 to a second position to align the needle opening 328 therethrough with the respective needle openings 324, 326 through the key 316 and the locking cap 312, and showing a needle 320 passing through the respective needle openings 324, 326, 328. The slide guard 314 is moved from a first position to a second position when pushing downward on the key 316 due to an inward facing cam surface 332 on the key 316 that engages the slide guard 314.

Figure 4I:
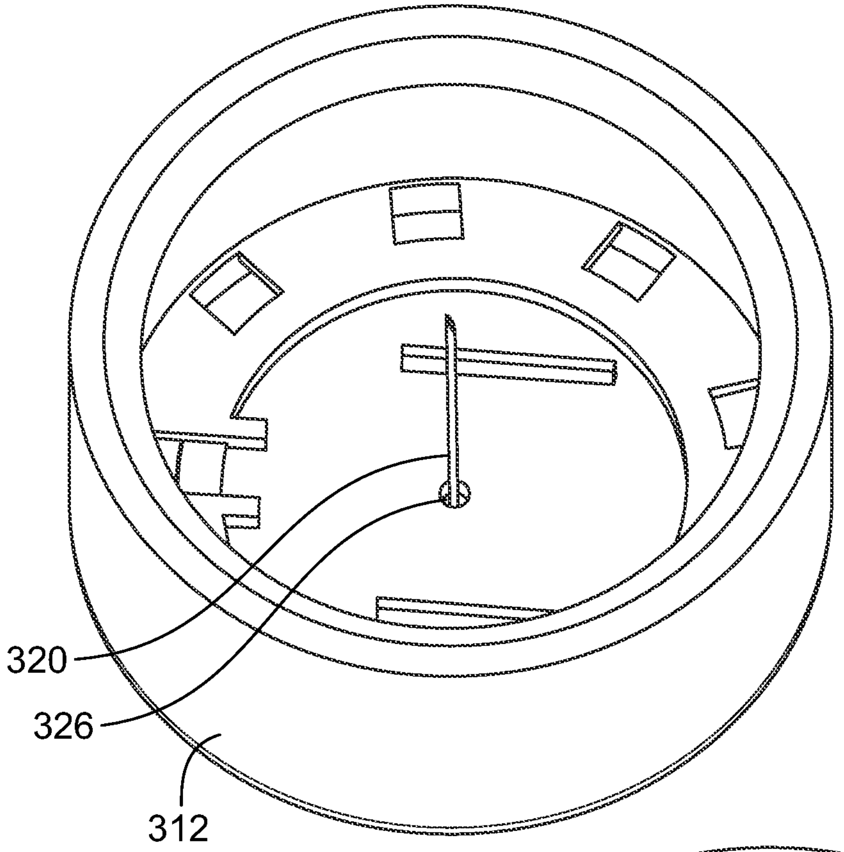
Figure 4J:
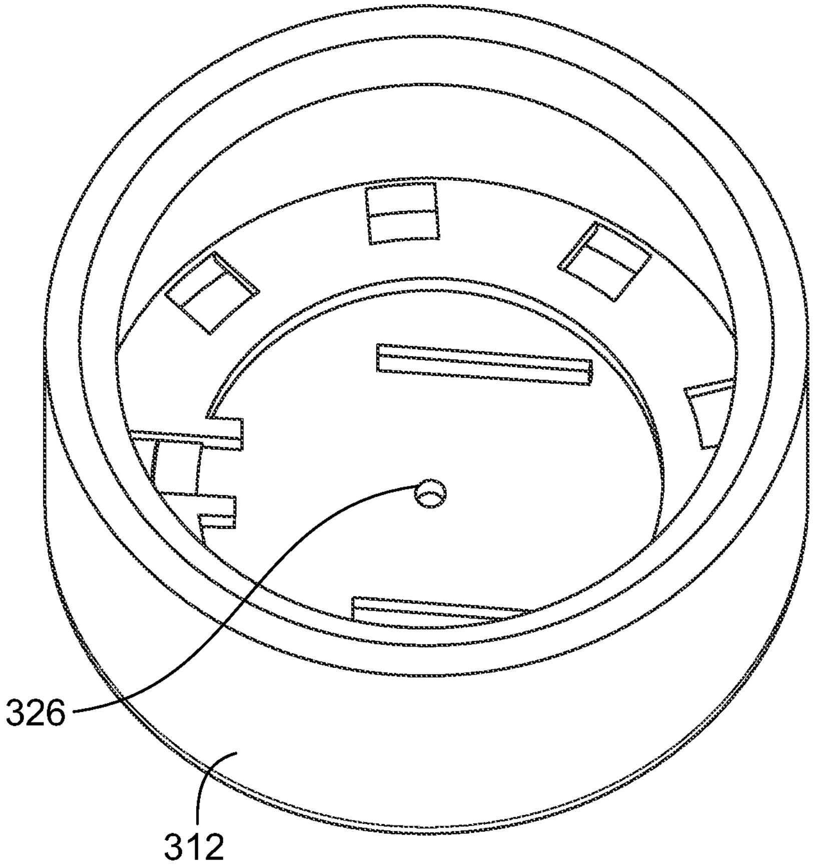

In FIGS. 4E and 4I, the key has been released, and slide guard 314 has moved to a position biased against the needle 320 passing through the aligned respective needle openings 324, 326, 328 through the key, the locking cap and the slide guard. In FIGS. 4F and 4J, after having released the key 316 and removed the needle 320 to the extent that the needle 320 no longer passes through the needle opening 328 through the slide guard 314, the slide guard 314 has moved to block the needle 320 from passing through the slide guard 320, such as to enter a vial 308.

FIGS. 5A-5K illustrate a fifth example protective locking system 406 for use with a vial 408, which is configured with a vial cap lock for a custom drug, wherein the vial 408 may be used with a transfer device, such as shown in FIG. 1A, or separately, such as with a syringe needle 420, and having a removable key 416, in the form of a lid, that is custom in that it is related to the drug and authority to access the drug.

Figure 5A:
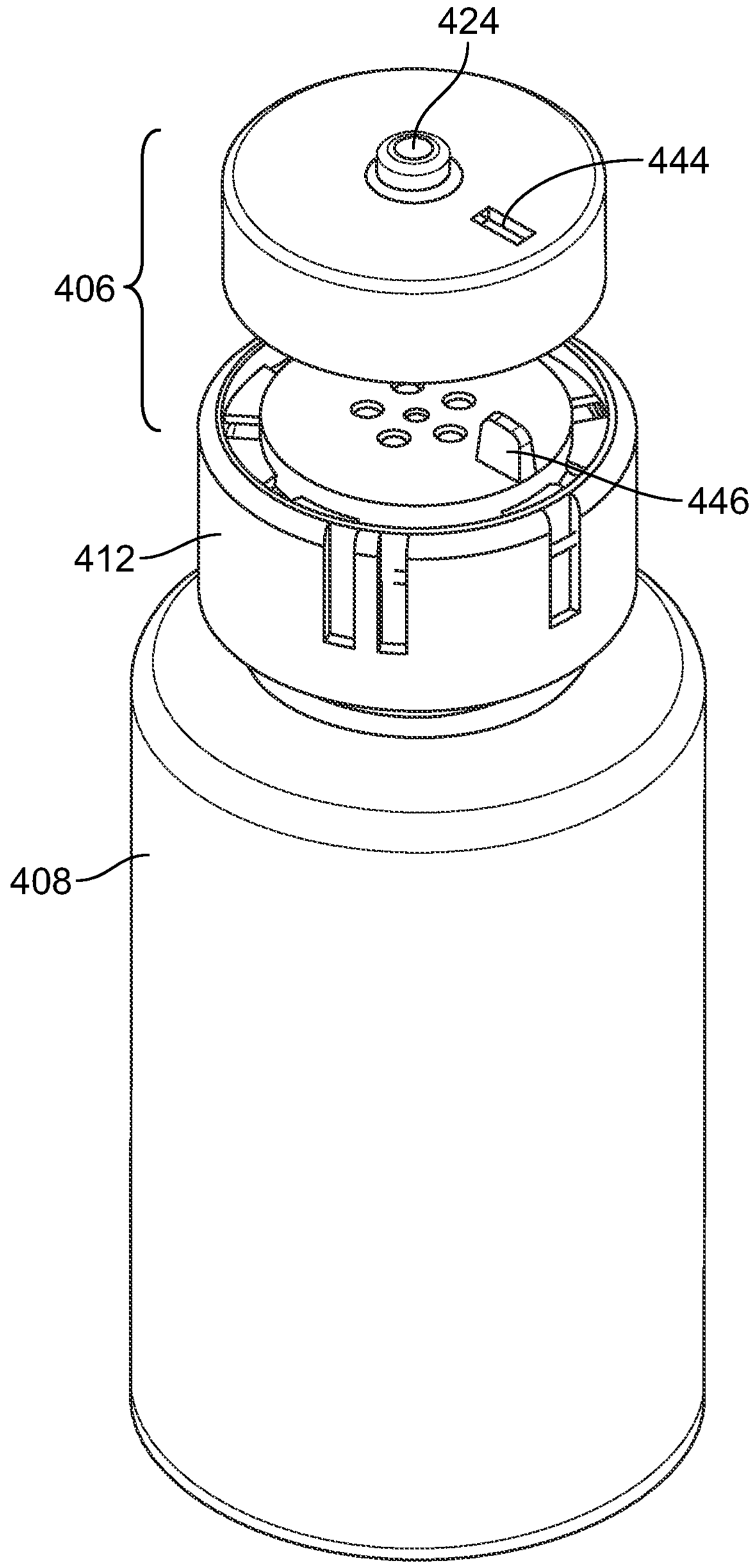
FIG. 5A is an upper perspective view of a vial having a fifth example protective locking system configured with a vial cap lock for a custom drug, wherein the vial may be used with a transfer device, such as shown in FIG. 1A, or separately, such as with a syringe needle, and having a removable key that is custom in that it is related to the drug and authority to access the drug.
Figure 5B:
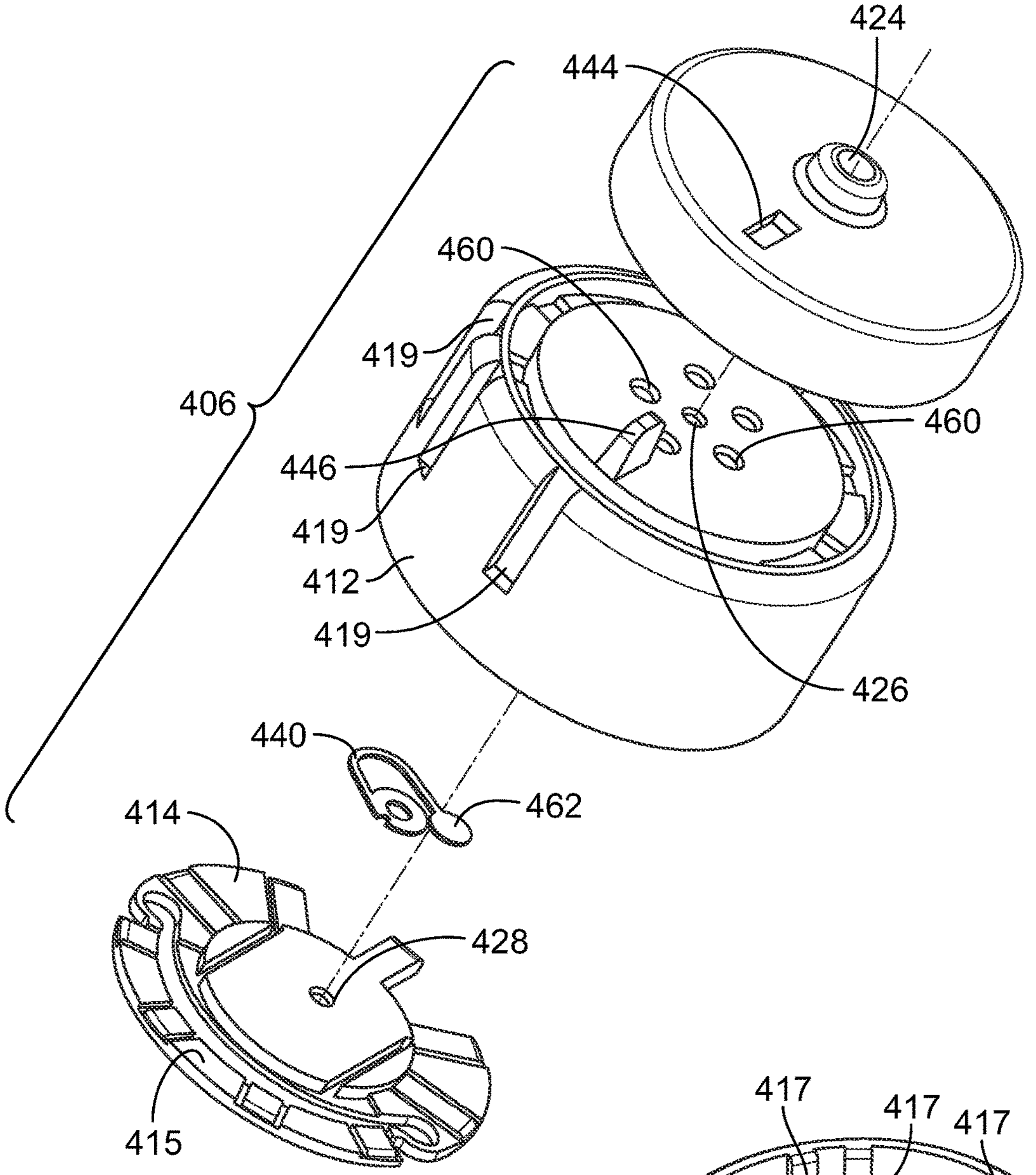
FIG. 5B is an upper perspective exploded view of the protective locking system for a vial having the vial cap lock shown in FIG. 5A removed from the vial for explanation purposes and including the key, the locking cap, a spring lock and a slide guard, and showing there may be alignment of respective needle openings through the key, the locking cap and the slide guard.
Figure 5C:
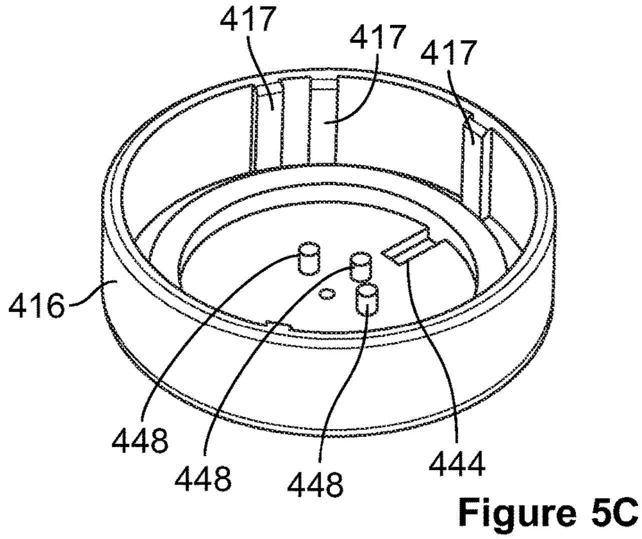
FIG. 5C is a perspective view of the underside of only the unique key shown in FIGS. 5A-5B and removed from the remainder of the locking cap for explanation purposes.

As seen in FIG. 5B, the protective locking system 406 for a vial 408 includes the key 416, the locking cap 412, a spring lock 440 and a slide guard 414. The locking cap 412 is connected to the vial 408 via an inward extending shoulder 413 on the locking cap 412 that captures a rim of the vial 408. FIG. 5C shows the underside 442 of unique key 416, which includes a locating opening 444 for proper registration with a locating projection 446 on the locking cap 412, as well as projections 448 that extend from the key 416.

Figure 5D:
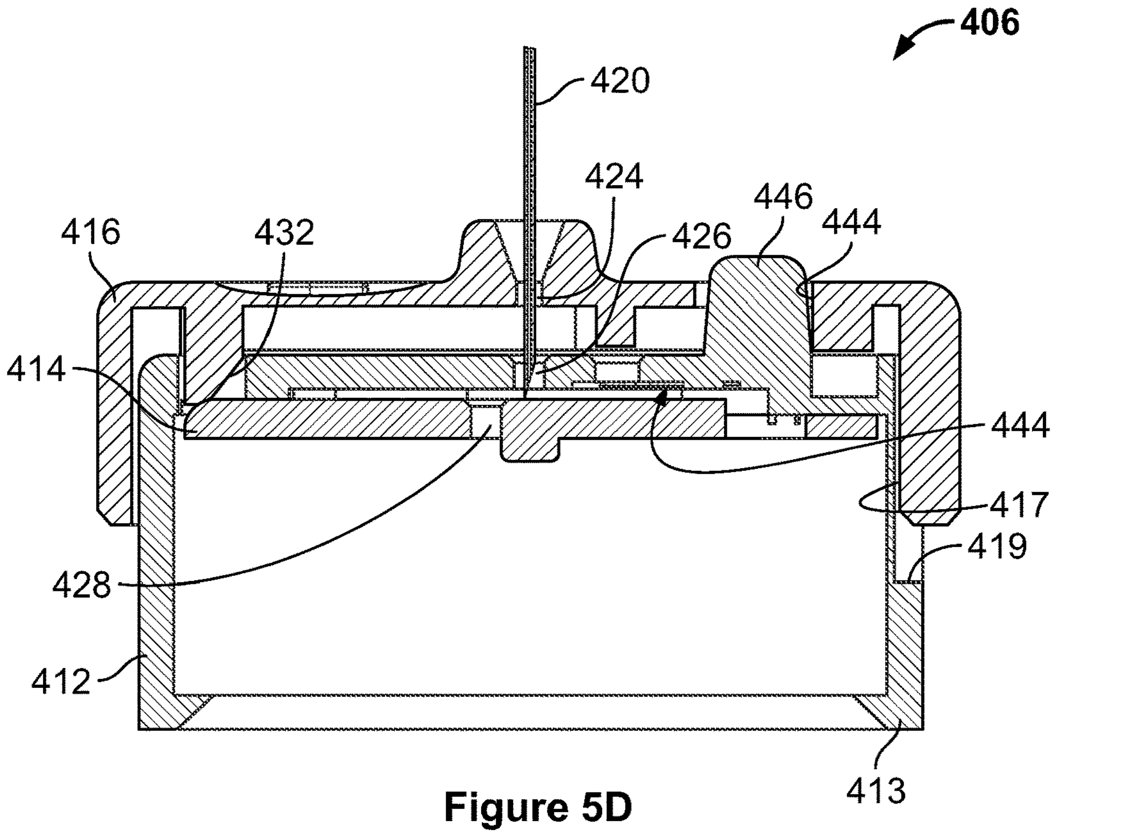
FIG. 5D is a cross-sectional view of the vial cap lock shown in FIGS. 5A-5C removed from the vial for explanation purposes, and further showing the slide guard blocking entry of a needle that is otherwise permitted to pass through the respective needle openings through the key and the locking cap, after the key is brought to the locking cap and is in a fully raised first position.

FIG. 5D shows the slide guard 414 biased to a first position by a biasing portion 415 so as to be blocking entry of a needle 420 that is otherwise permitted to pass through the needle opening 424 through the key 416 and the needle opening 426 through the locking cap 412, while the key 416 is in an installed and fully raised first position. For security purposes, the key 416 includes at least one rib 417 extending inward that must be aligned with slots 419 in the outer surface of the locking cap 412 to permit use of the key 416 with the locking cap 412. Various unique patterns of ribs 417 and slots 419 can be employed for improved security.

Figure 5E:
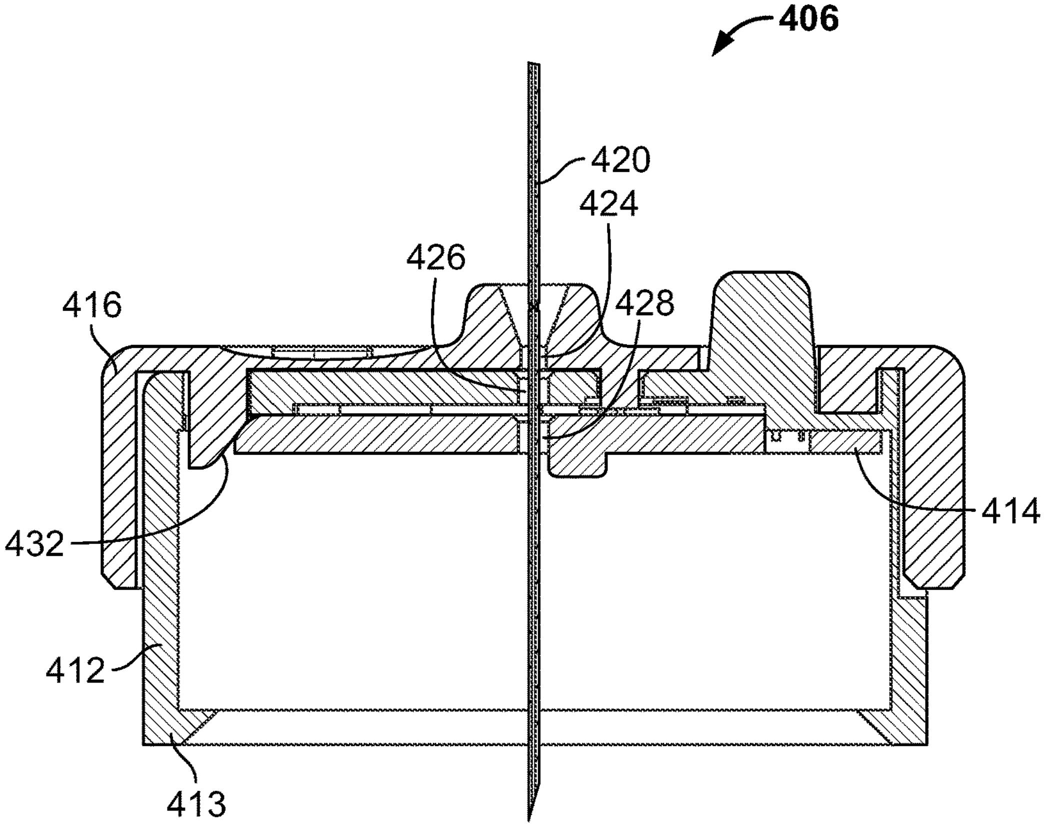
FIG. 5E is a cross-sectional view of the vial cap lock shown in FIG. 5D, having the key pushed or forced to a fully depressed second position, wherein the slide guard has been moved to align the needle opening therethrough with the respective needle openings through the key and the locking cap, and showing a needle passing through the respective needle openings and pins on the underside of the key have pushed and tripped the spring lock to be active, but the pins are temporarily holding the spring lock while the key is fully depressed

FIG. 5E shows the key 416 pushed or forced to a fully depressed second position, wherein the slide guard 414 has been moved from a first position wherein it was biased by a biasing portion 415 to a position blocking passage of the needle 420 to a second position to align the needle opening 428 therethrough with the respective needle openings 424, 426 through the key 416 and the locking cap 412, and showing a needle 420 passing through the respective needle openings 424, 426, 428. The slide guard 414 is moved from a first position to a second position when pushing downward on the key 416 due to an inward facing cam surface 432 on the key 416 that engages the slide guard 414.

The projections 448 that extend from the underside 442 of the key 416 may be in the form of pins, and they are aligned with actuation openings 460 through the locking cap 412. The spring lock 440 is located between the locking cap 412 and the slide guard 414. As seen in FIGS. 5E and 5I, when the key 416 is fully depressed, the projections 448 on the underside of the key 416 push and trip the spring lock 440 to move from an initial set position shown in FIG. 5H, wherein the needle opening 428 through the slide guard 414 is not aligned with the respective needle openings 424, 426 through the key 416 and the locking cap 412, to an active position shown in FIG. 5I. However, the projections 448 that extend from the key 416 also temporarily hold the spring lock 440, so as not to permit an arm 462 of the spring lock 440 to obstruct passage of the needle 420 while the key 416 is fully depressed.

Figure 5F:
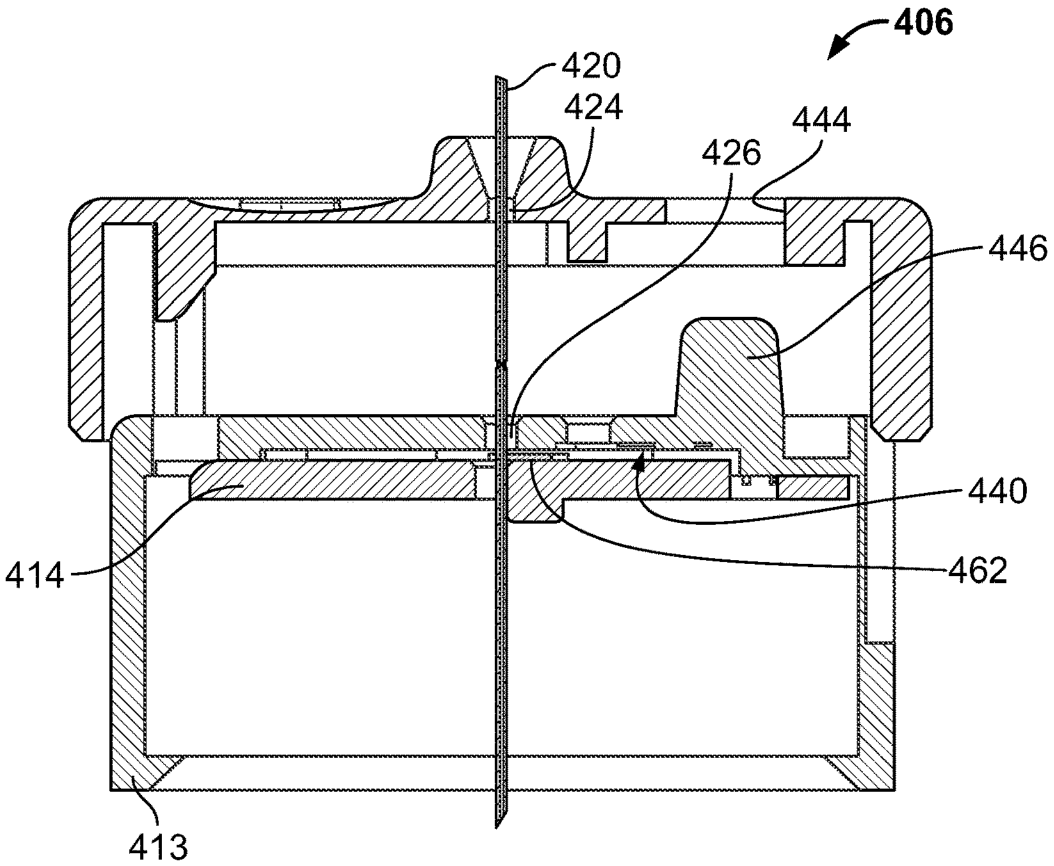
FIG. 5F is a cross-sectional view of the vial cap lock shown in FIGS. 5D-5E, having the key released, wherein the slide guard and spring lock have moved to positions biased against the needle passing through the aligned respective needle openings through the key, the locking cap and the slide guard.
Figure 5G:
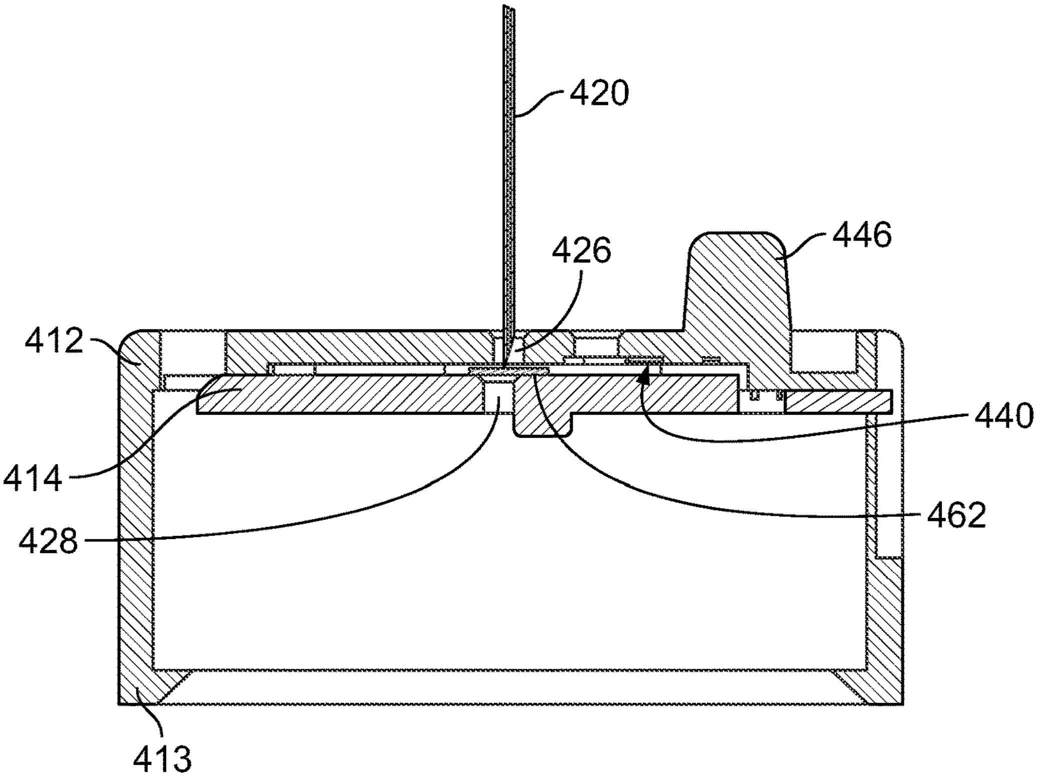
FIG. 5G is a cross-sectional view of the vial cap lock shown in FIGS. 5D-5F, after having released and removed the key and removed the needle to the extent that the needle no longer passes through the needle opening through the slide guard, wherein the spring lock has moved to block the needle from passing through the slide guard, such as to enter a vial.
Figure 5H:
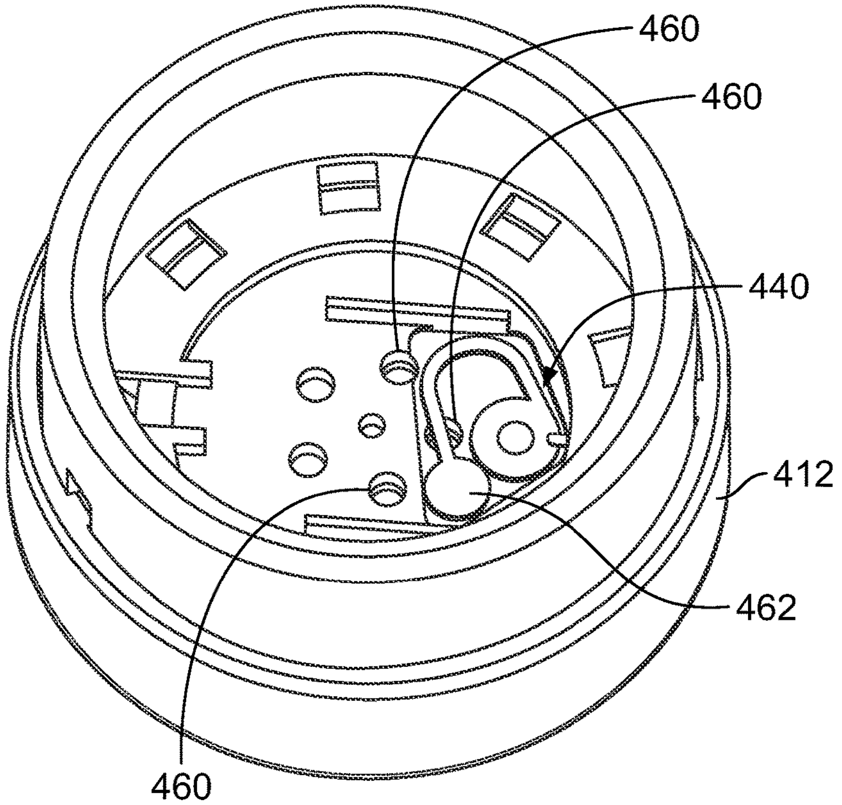
FIG. 5H is a perspective view of the underside of the vial cap lock corresponding to the key having been brought to the locking cap and being in a fully raised first position as shown in FIG. 5D, wherein the needle opening through the slide guard is not aligned with the respective needle openings through the key and locking cap, and the spring lock is in an initial set position.
Figure 5I:
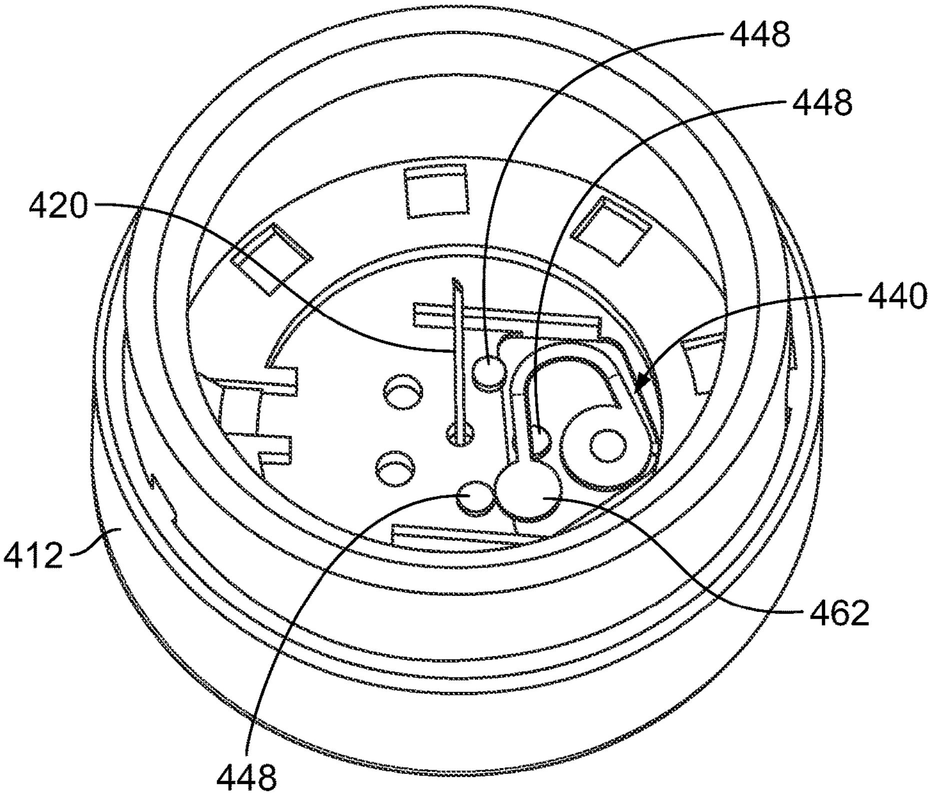
FIG. 5I is a perspective view of the underside of the vial cap lock corresponding to the fully depressed second position of the key shown in FIG. 5E, wherein the respective needle openings through the key, the locking cap and the slide guard are aligned, a needle is passing through the respective needle openings, and the pins on the underside of the key have pushed and tripped the spring lock to be active, but the pins are temporarily holding the spring lock while the key is fully depressed.
Figure 5J:
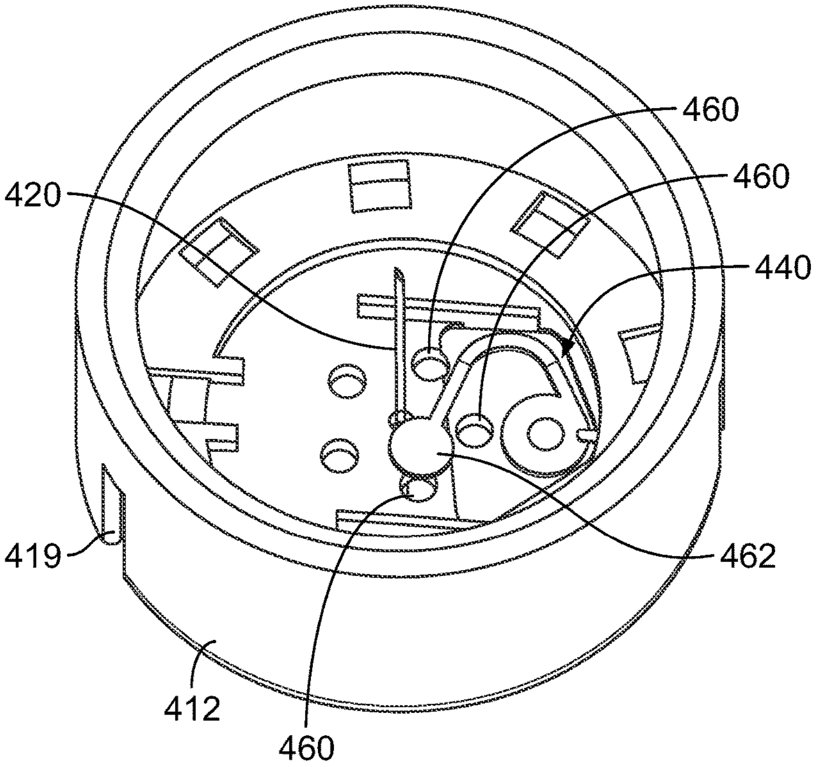
FIG. 5J is a perspective view of the underside of the vial cap lock corresponding to having released the key as shown in FIG. 5F, wherein the pins have released the active spring lock and the spring lock and slide guard have moved to be biased against the needle that is passing through the respective needle openings.

FIGS. 5F and 5J illustrate when the pushing force on the key 416 has been removed, such that the key 416 has moved to an intermediate third position between the fully raised first position and the fully depressed second position. In this intermediate position, the projections 448 extending from the underside of the key 416 are withdrawn from the actuation openings 460 through the locking cap 412, and release the active spring lock 440. The slide guard 414 and the arm 462 of the spring lock 440 have moved under the force of the biasing portion 415 to positions biased against the needle 420 passing through the aligned respective needle openings 424, 426, 428 through the key 416, the locking cap 412 and the slide guard 414.

Figure 5K:
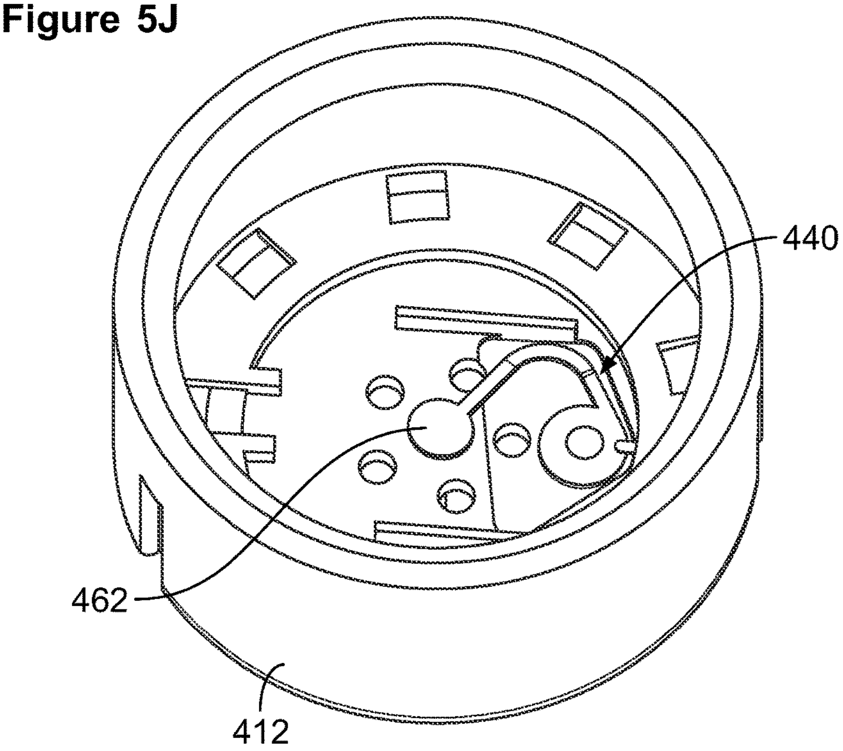
FIG. 5K is a perspective view of the underside of the vial cap lock corresponding to having released and removed the key and removed the needle to the extent that the needle no longer passes through the needle opening through the slide guard as shown in FIG. 5G, wherein the spring lock has moved to block the needle from passing through the slide guard, such as to enter a vial.

As seen in FIGS. 5G and 5K, when the needle 420 has been removed to the extent that the needle 420 no longer passes through the needle opening 428 through the slide guard 414, the spring lock 440, by means of its arm 462, has moved to cover the needle opening 426 through the locking cap 412, so as to block the needle 420 from passing through the slide guard 414, such as to enter a vial 408.

FIGS. 6A-6K show a sixth example protective locking system 506 configured with a vial cap lock providing access via a separate reusable rotary key 516 and that may be used with a transfer device, such as shown in FIG. 1A, or used separately, such as with a syringe needle 520, and wherein the key 516 is in the form of a lid that is brought to the vial 508 and locking cap 512 to unlock the vial 508 for use. Thereafter, the key 516 is removable from the locking cap 512.

Figure 6A:
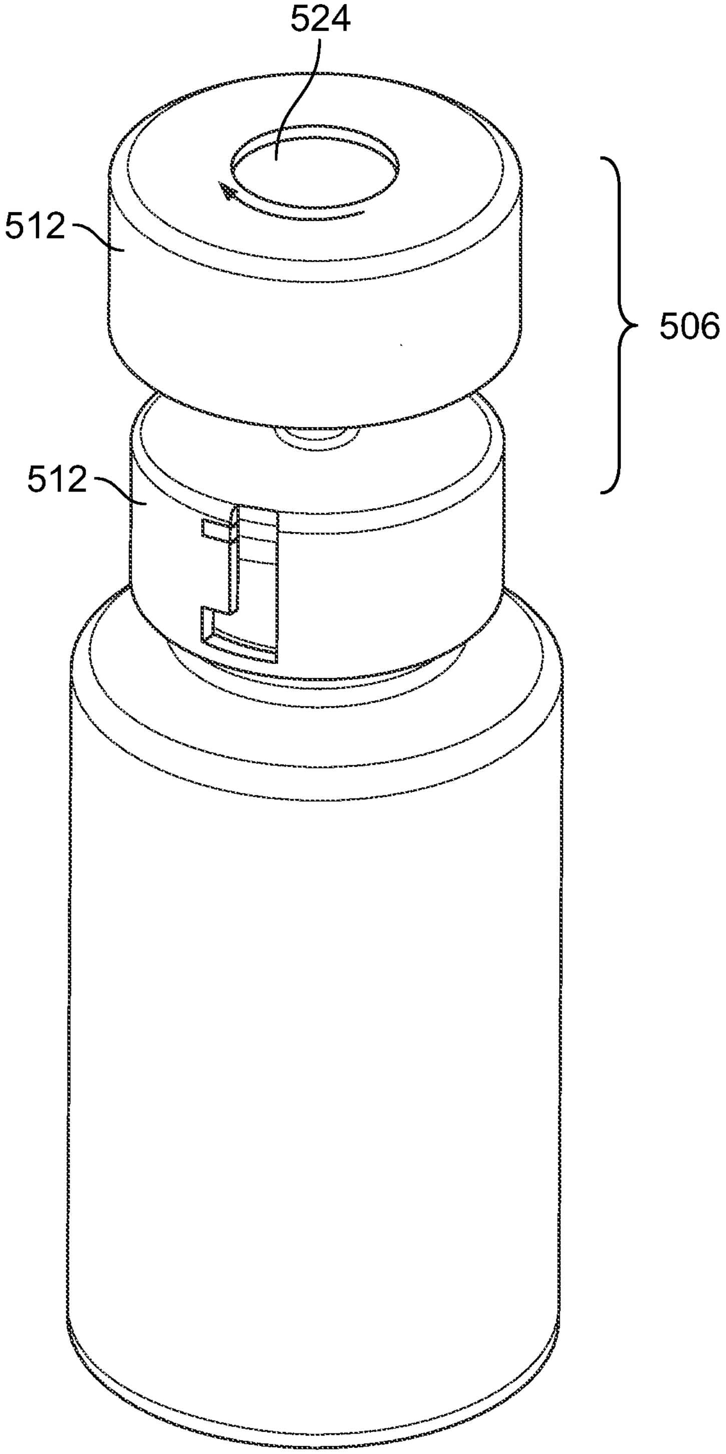
FIG. 6A is an upper perspective view of a reusable vial having a sixth example protective locking system configured with a vial cap lock providing access via a separate reusable rotary key and that may be used with a transfer device, such as shown in FIG. 1A, or used separately, such as with a syringe needle, and wherein the key is brought to the vial to unlock the vial for use and thereafter is removable from the locking cap on the vial.
Figure 6B:
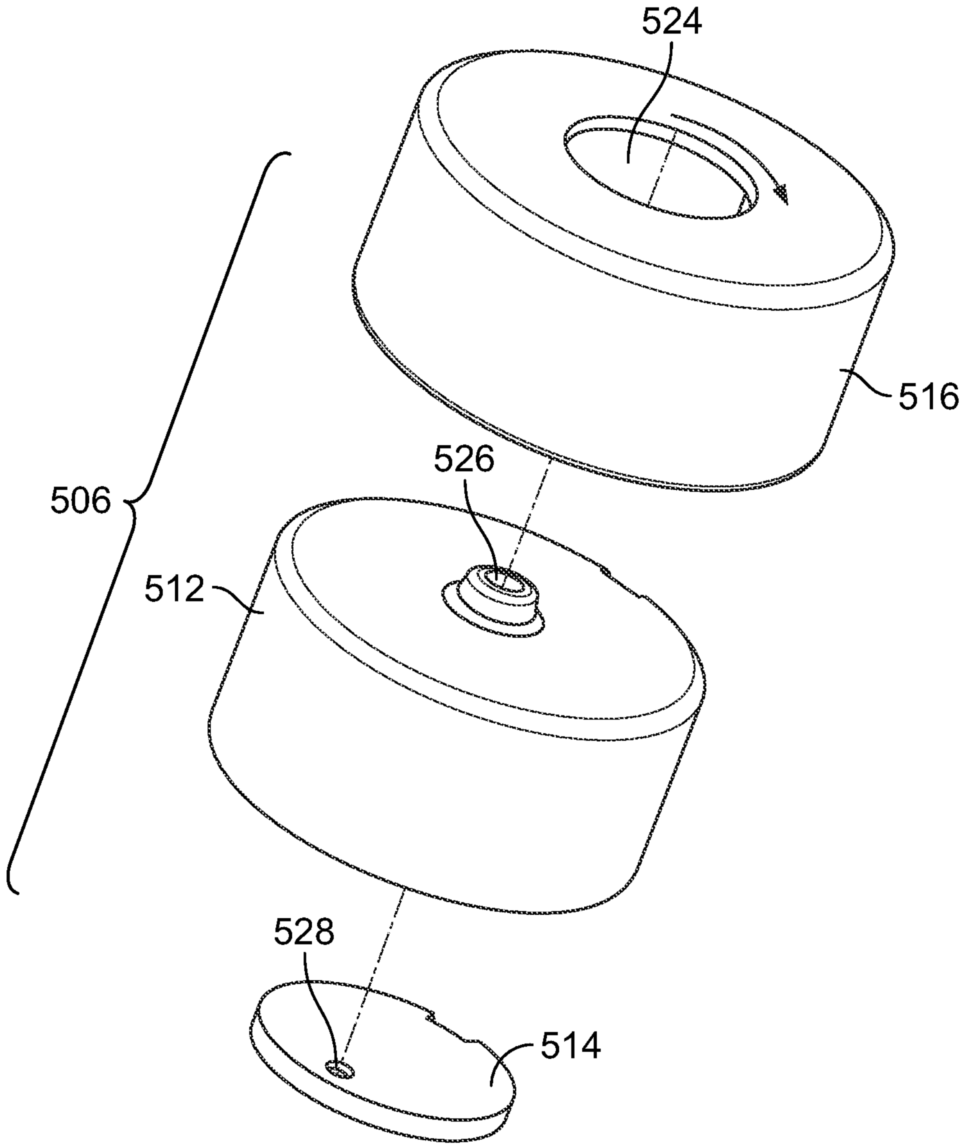
FIG. 6B is an upper perspective exploded view of the protective locking system for a vial having the vial cap lock shown in FIG. 6A removed from the vial for explanation purposes and including the key, the locking cap and a slide guard, and showing there may be alignment of respective needle openings through the key, the locking cap and the slide guard.
Figure 6C:
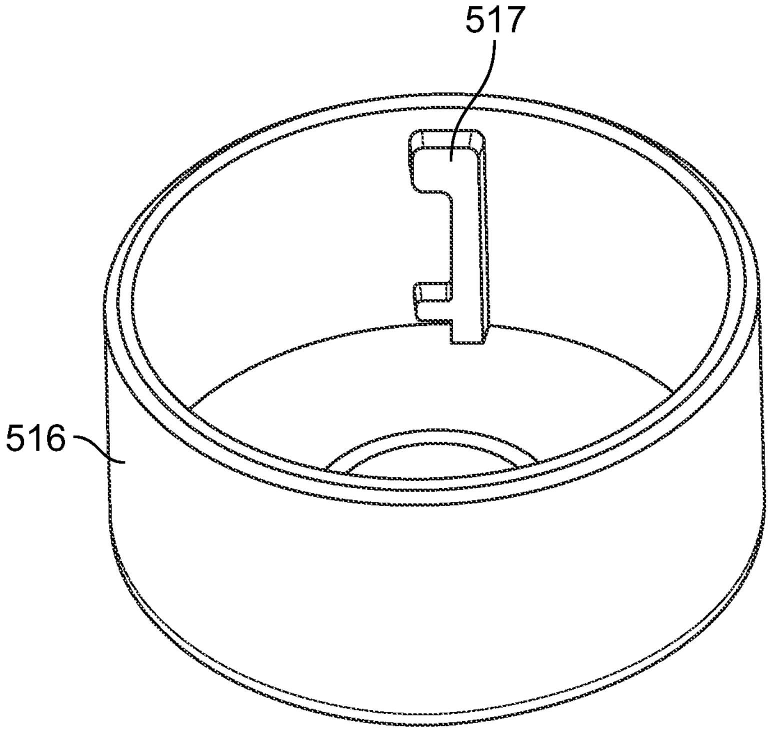
FIG. 6C is a perspective view of the underside of only the rotary key shown in FIGS. 6A-6B and removed from the remainder of the locking cap for explanation purposes.

FIG. 6B shows the protective locking system 506 includes the key 516, the locking cap 512 and a slide guard 514, and shows there may be alignment of respective needle openings 524, 526, 528 through the key 516, the locking cap 512 and the slide guard 514. The locking cap 512 is connected to the vial 508 via an inward extending shoulder 513 on the locking cap 512 that captures a rim of the vial 508. FIG. 6C shows the underside of the key 516 and a projection in the form of at least one rib 517 extending inward from the key 516.

Figure 6D:
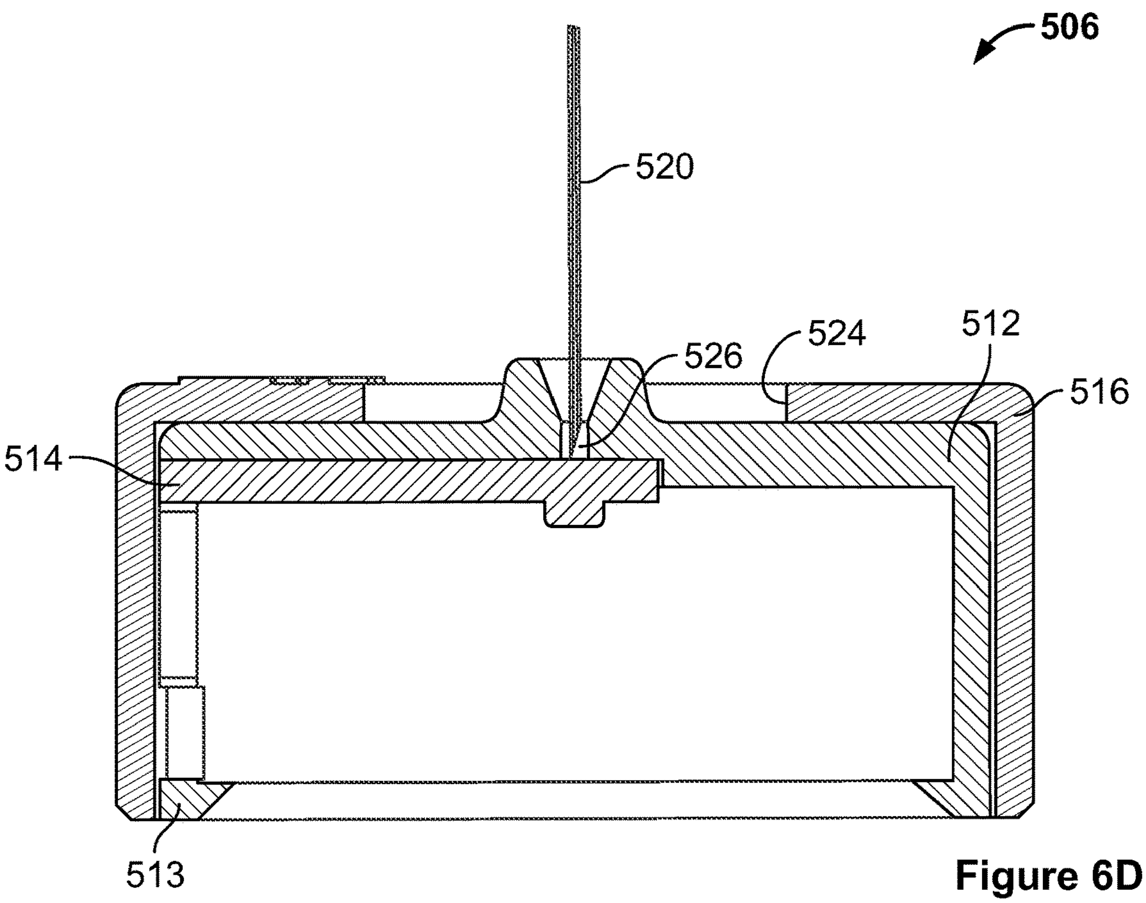
FIG. 6D is a cross-sectional view of the vial cap lock shown in FIGS. 6A-6C removed from the vial for explanation purposes, and further showing the slide guard blocking entry of a needle that is otherwise permitted to pass through the respective needle openings through the key and the locking cap, after the key is brought to the locking cap and is in a first rotational position.
Figure 6E:
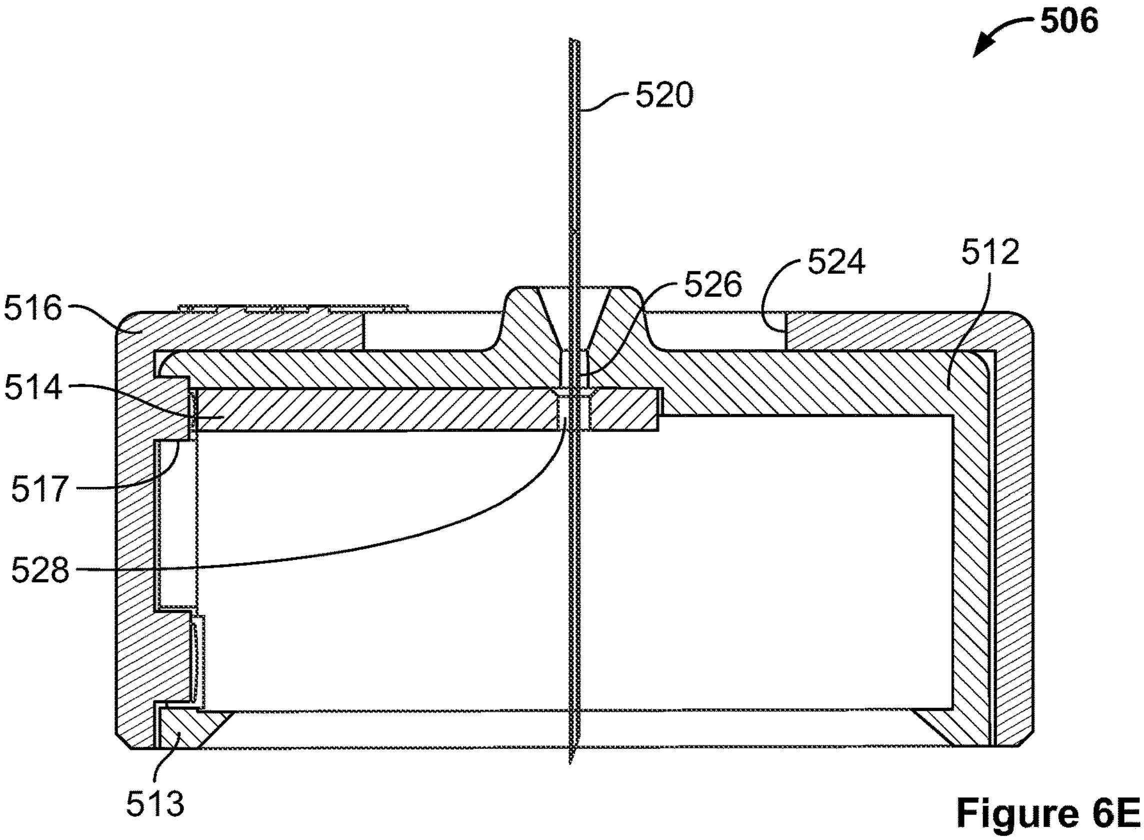
FIG. 6E is a cross-sectional view of the vial cap lock shown in FIG. 6A-6D, having the key rotated to a second rotational position, wherein the slide guard has been moved to align the needle opening therethrough with the respective needle openings through the key and the locking cap, and showing a needle passing through the respective needle openings.
Figure 6F:
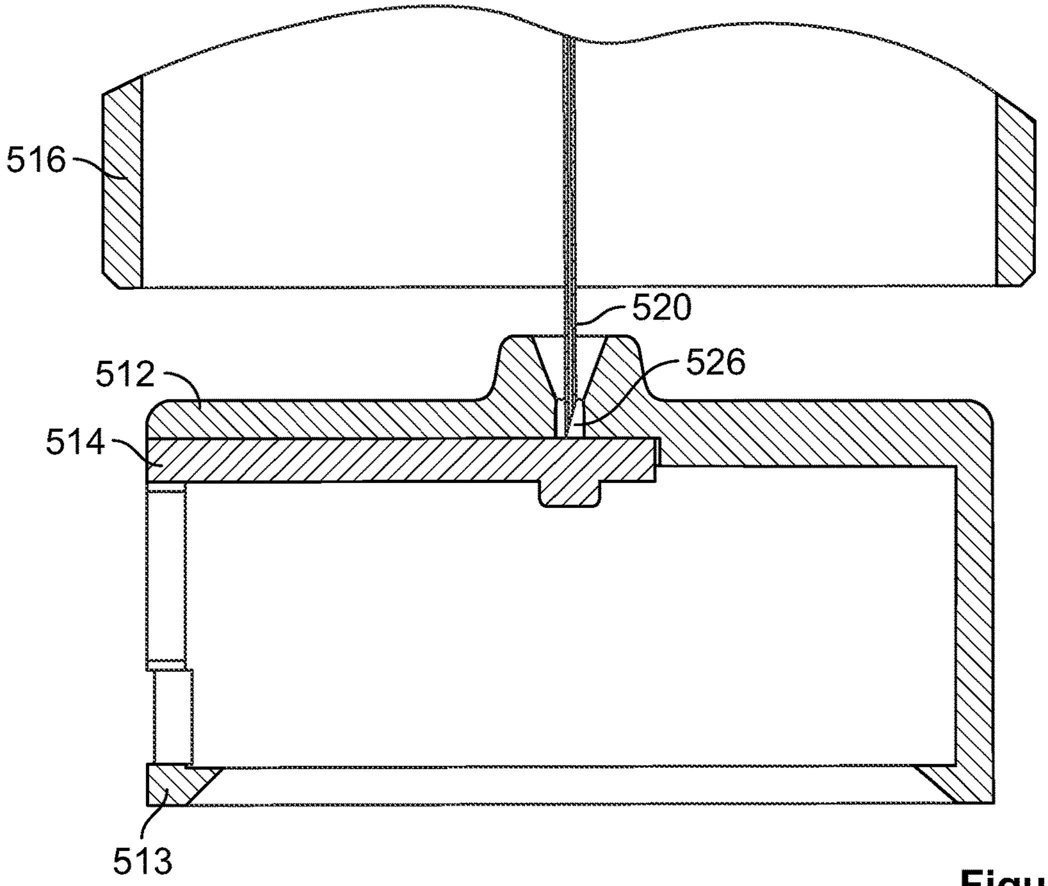
FIG. 6F is a cross-sectional view of the vial cap lock shown in FIGS. 6D-6E, after having the key released, wherein the slide guard has moved to block the needle from passing through the slide guard, such as to enter a vial.
Figure 6G:
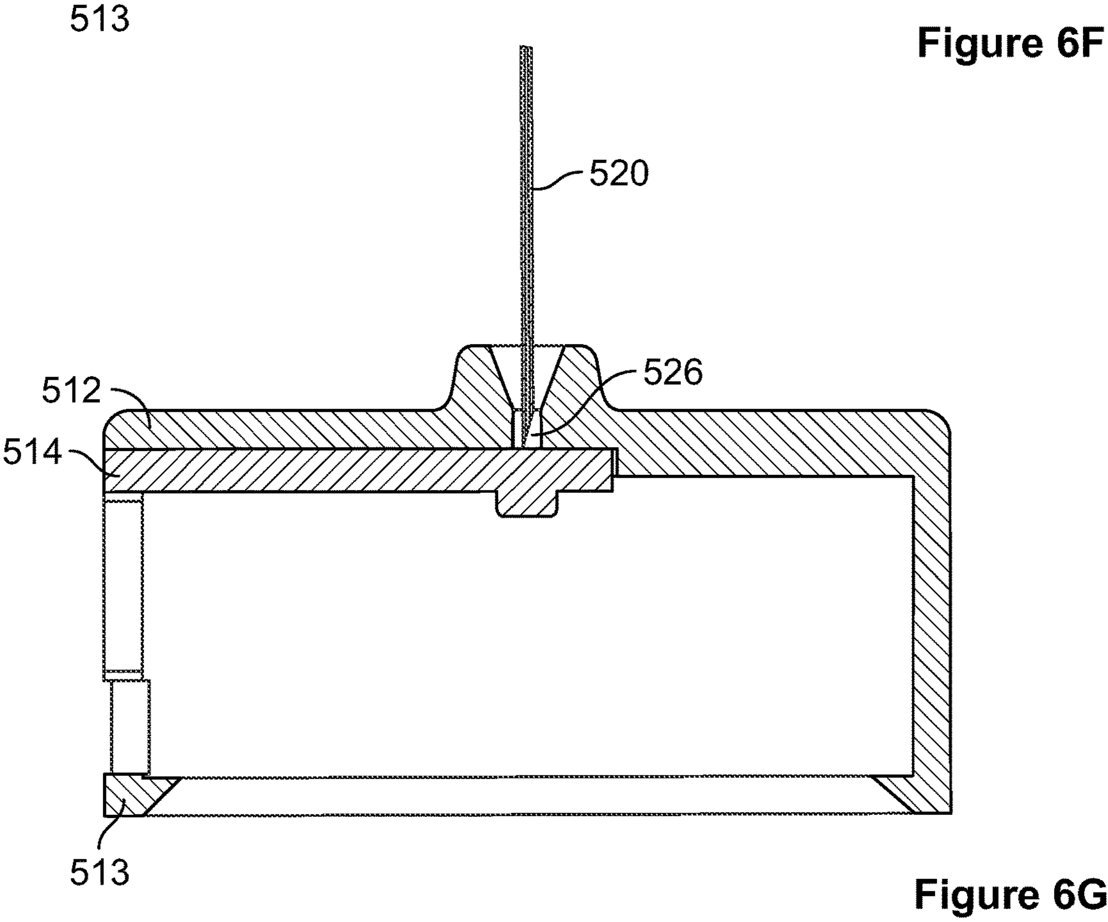
FIG. 6G is a cross-sectional view of the vial cap lock shown in FIGS. 6D-6F, after having released and removed the key and removed the needle to the extent that the needle no longer passes through the needle opening through the slide guard, wherein the slide guard has moved to block the needle from passing through the slide guard, such as to enter a vial.
Figure 6H:
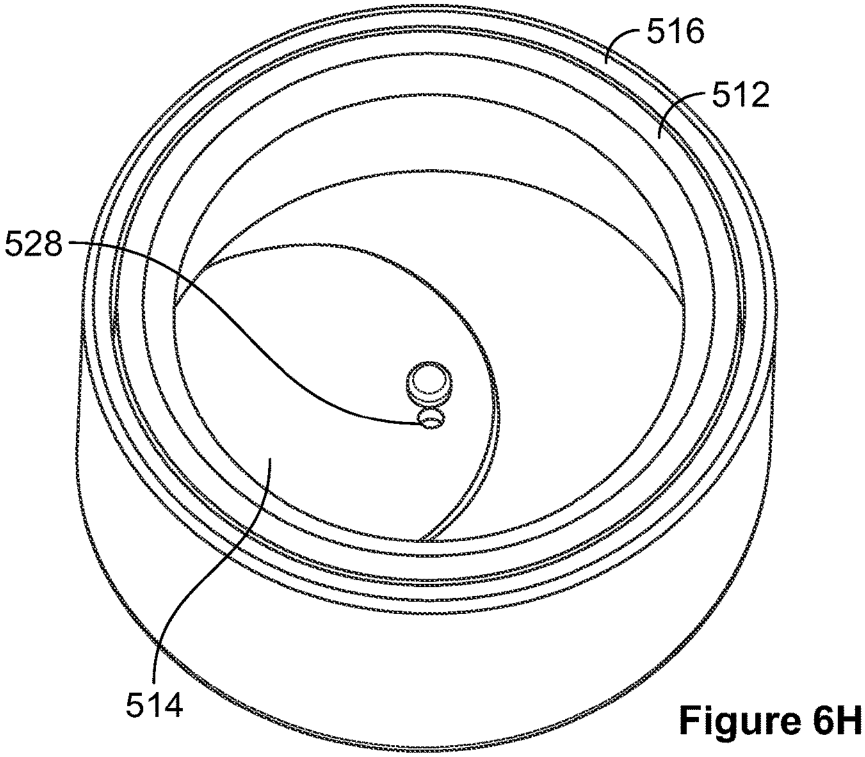
FIG. 6H is a perspective view of the underside of the vial cap lock corresponding to the key having been brought to the locking cap and being in a first rotational position as shown in FIG. 6D, wherein the needle opening through the slide guard is not aligned with the respective needle openings through the key and locking cap, and the slide guard is in a position that blocks entry of a needle.
Figure 6I:
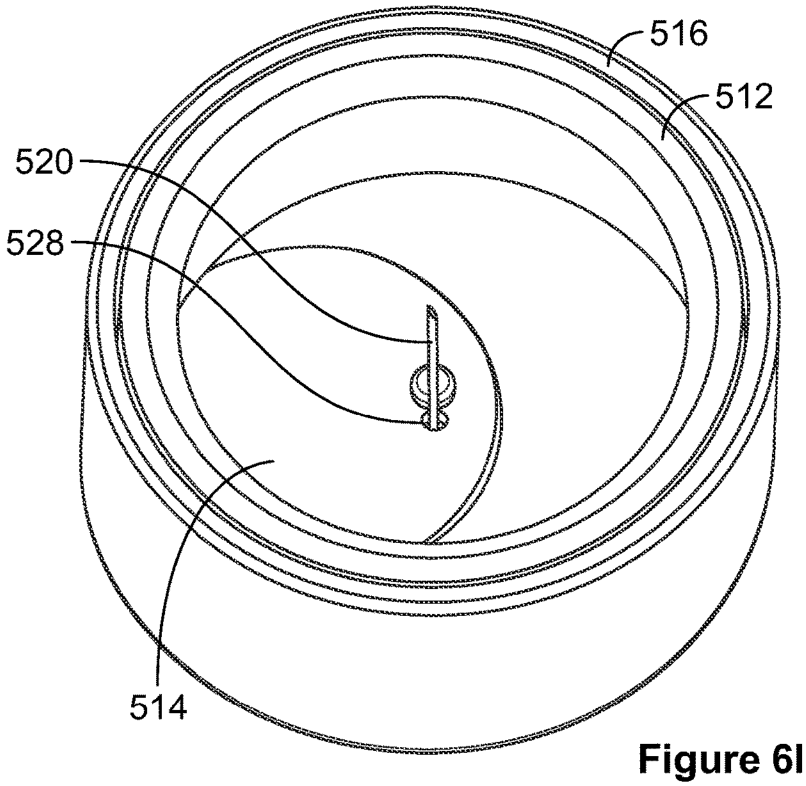
FIG. 6I is a perspective view of the underside of the vial cap lock corresponding to the key being in the second rotational position shown in FIG. 6E, wherein the respective needle openings through the key, the locking cap and the slide guard are aligned and a needle is passing through the respective needle openings.
Figure 6K:
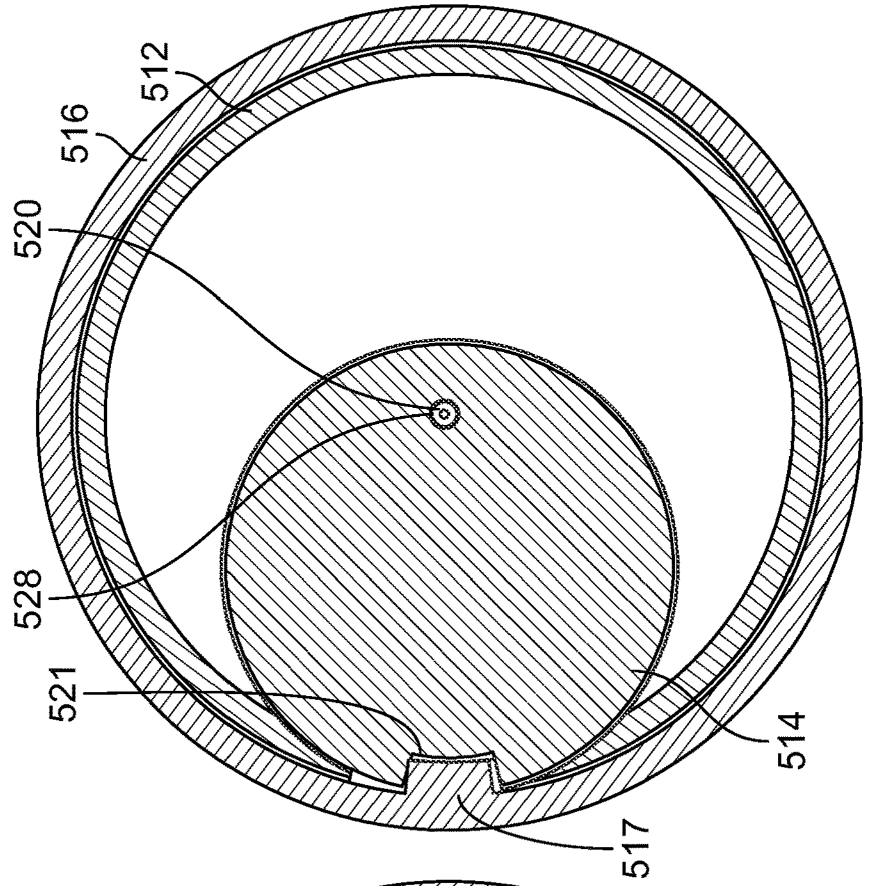
FIG. 6K is a cross-sectional view through the key, the locking cap and the slide guard from the underside of the vial cap lock and corresponding to the second rotational position of the key shown in FIGS. 6E and 6I, wherein the needle opening through the slide guard is aligned with the respective needle openings through the key and locking cap.
Figure 6J:
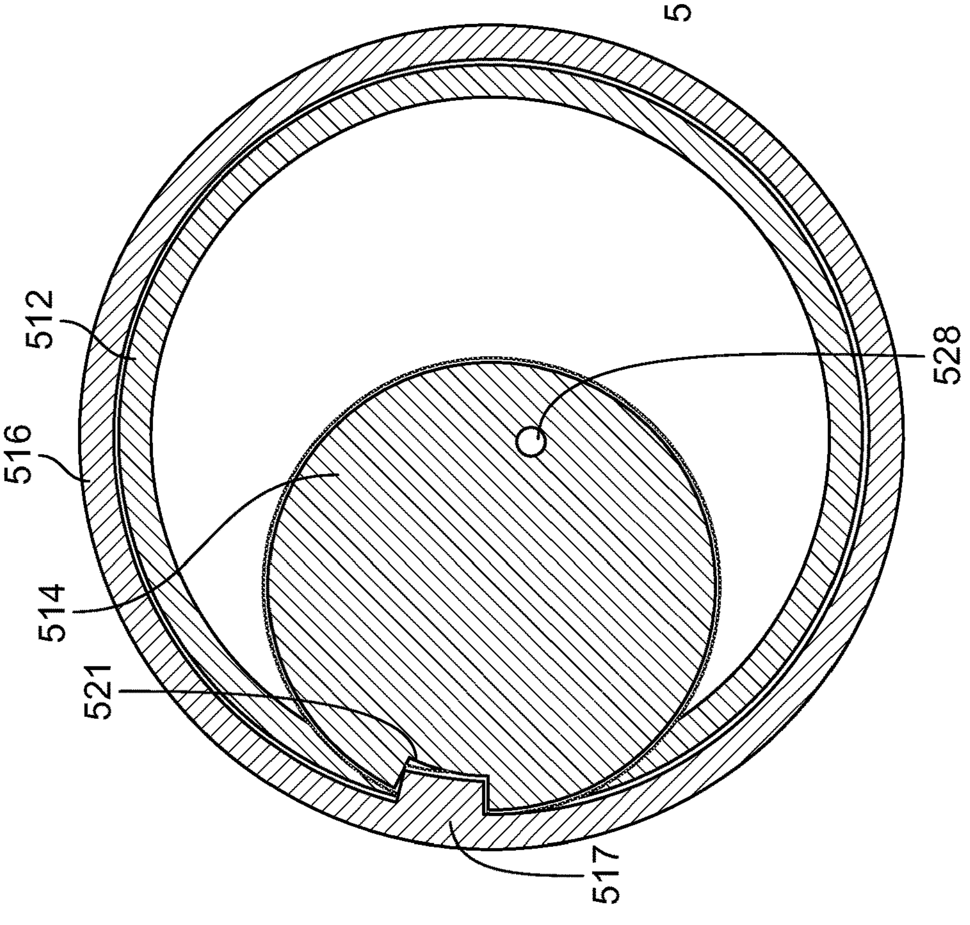
FIG. 6J is a cross-sectional view through the key, the locking cap and the slide guard from the underside of the vial cap lock and corresponding to the first rotational position of the key shown in FIGS. 6D and 6H, wherein the needle opening through the slide guard is not aligned with the respective needle openings through the key and locking cap.

FIGS. 6D, 6H and 6J show the slide guard 514 in a first position blocking entry of a needle 520 that is otherwise permitted to pass through the respective needle openings 524, 526 through the key 516 and the locking cap 512, after the key 516 is brought to the locking cap 512 and is in a first rotational position. FIGS. 6E, 6I and 6K show the key 516 rotated to a second rotational position, wherein the slide guard 514 has been moved to align the needle opening 528 therethrough with the respective needle openings 524, 526 through the key 516 and the locking cap 512. Movement of the slide guard 514 is via rotary movement of the key 516, which drives engagement of the at least one rib 517 with a notch 521 in the slide guard 514 to attain the second position.

In FIGS. 6F and 6G, the key 516 has been released and the needle 520 has been removed to the extent that the needle 520 no longer passes through the needle opening 528 through the slide guard 514. The slide guard 514 also has moved back to the first position where it blocks the needle 520 from passing through the slide guard 514.

Turning to FIGS. 7A-7J, a seventh protective locking system 606 for use with a vial 608, which has a vial cap lock providing access via a non-clocking reusable key 616 and that may be used with a transfer device, such as shown in FIG. 1A, or used separately, such as with a syringe needle 620. The key 616, in the form of a lid, is brought to a locking cap 612 on the vial 608, to unlock the vial 608 and is reusable. Thus, the key 616 is removable from a locking cap 612 on the vial 608 after use. As seen in FIG. 6B, the protective locking system 606 for a vial 608 includes the key 616, the locking cap 612 and a slide guard 614, and there may be alignment of respective needle openings 624, 626, 628 through the key 616, the locking cap 612 and the slide guard 614. The locking cap 612 is connected to the vial 608 via an inward extending shoulder 613 on the locking cap 612 that captures a rim of the vial 608.

Figure 7A:
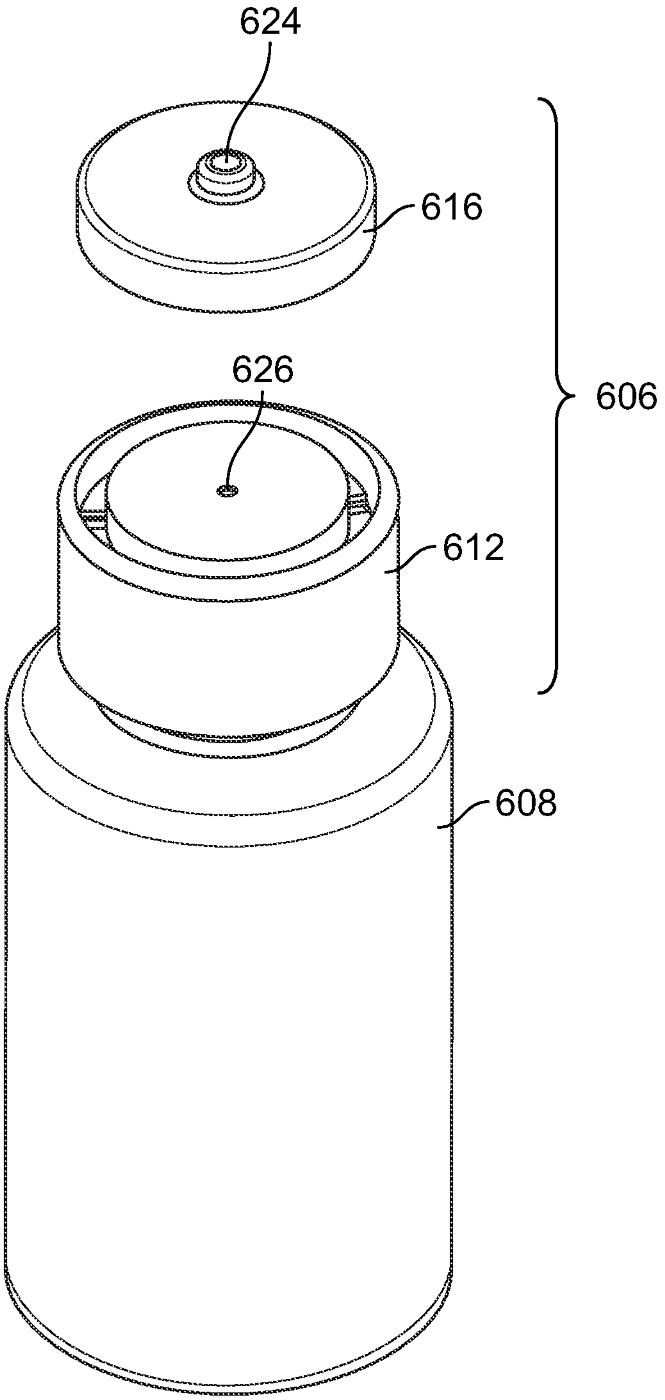
FIG. 7A is an upper perspective view of a vial having a seventh example protective locking system configured with a vial cap lock, wherein the vial may be used with a transfer device, such as shown in FIG. 1A, or separately, such as with a syringe needle, and having a removable key and a non-clocking slide guard that blocks needle insertion after use.
Figure 7B:
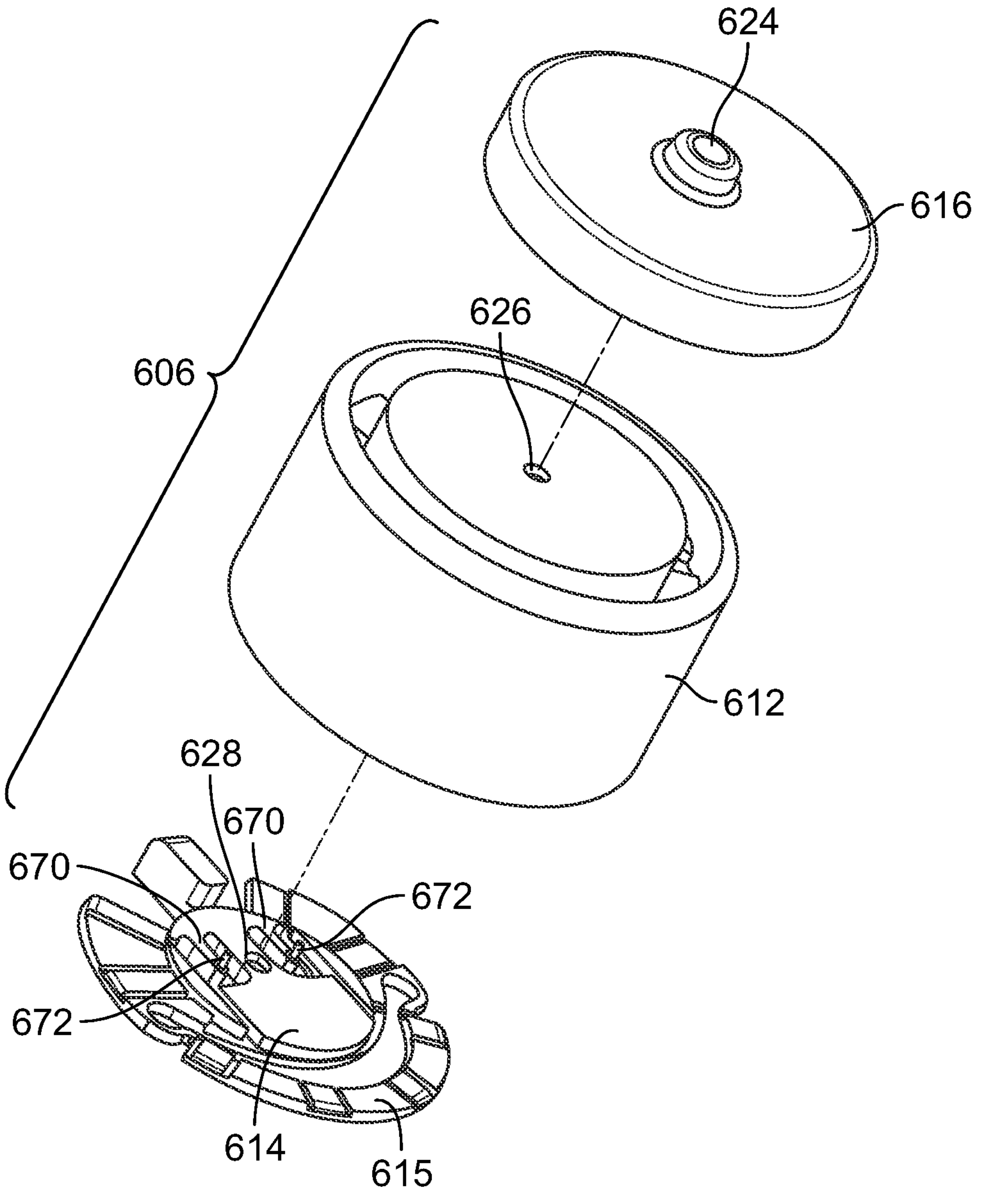
FIG. 7B is an upper perspective exploded view of the protective locking system for a vial having the vial cap lock shown in FIG. 7A removed from the vial for explanation purposes and including the key, the locking cap and a slide guard, and showing there may be alignment of respective needle openings through the key, the locking cap and the slide guard.
Figure 7C:
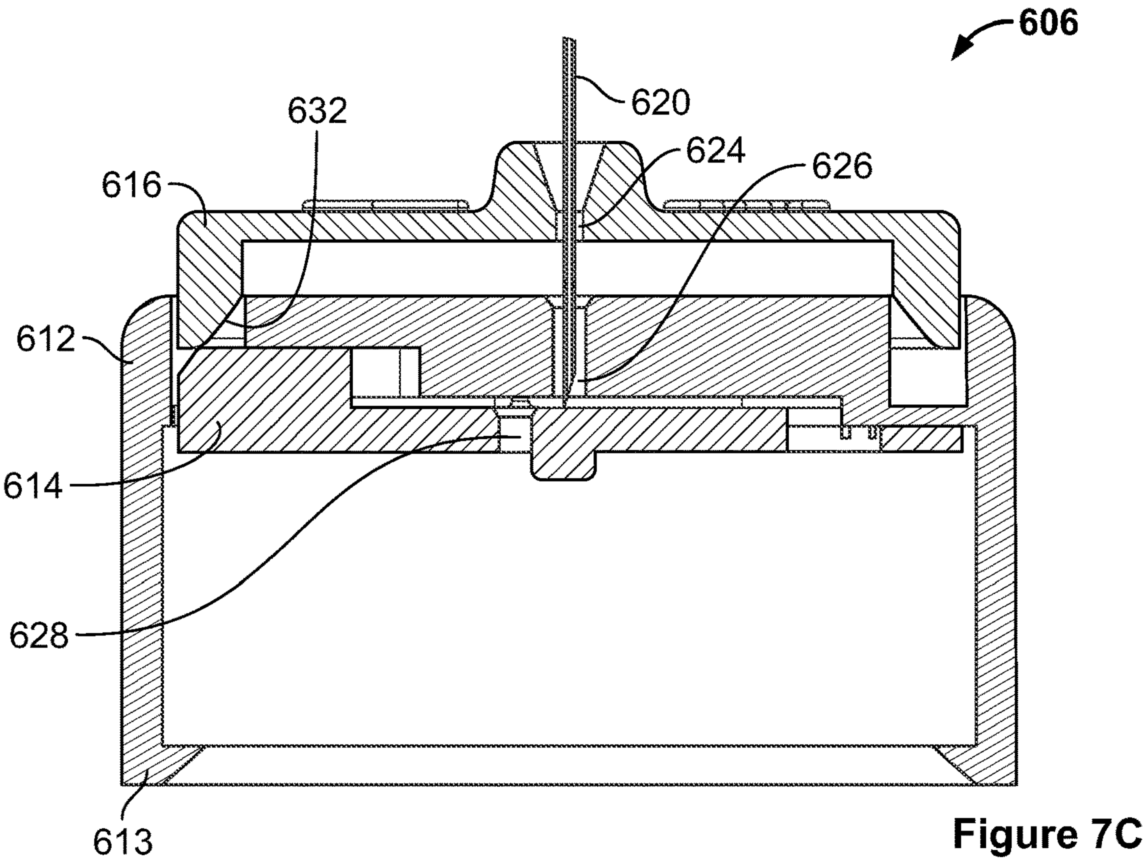
FIG. 7C is a cross-sectional view of the vial cap lock shown in FIGS. 7A-7B removed from the vial for explanation purposes, and further showing the slide guard blocking entry of a needle that is otherwise permitted to pass through the respective needle openings through the key and the locking cap, after the key is brought to the locking cap and is in a fully raised first position.
Figure 7D:
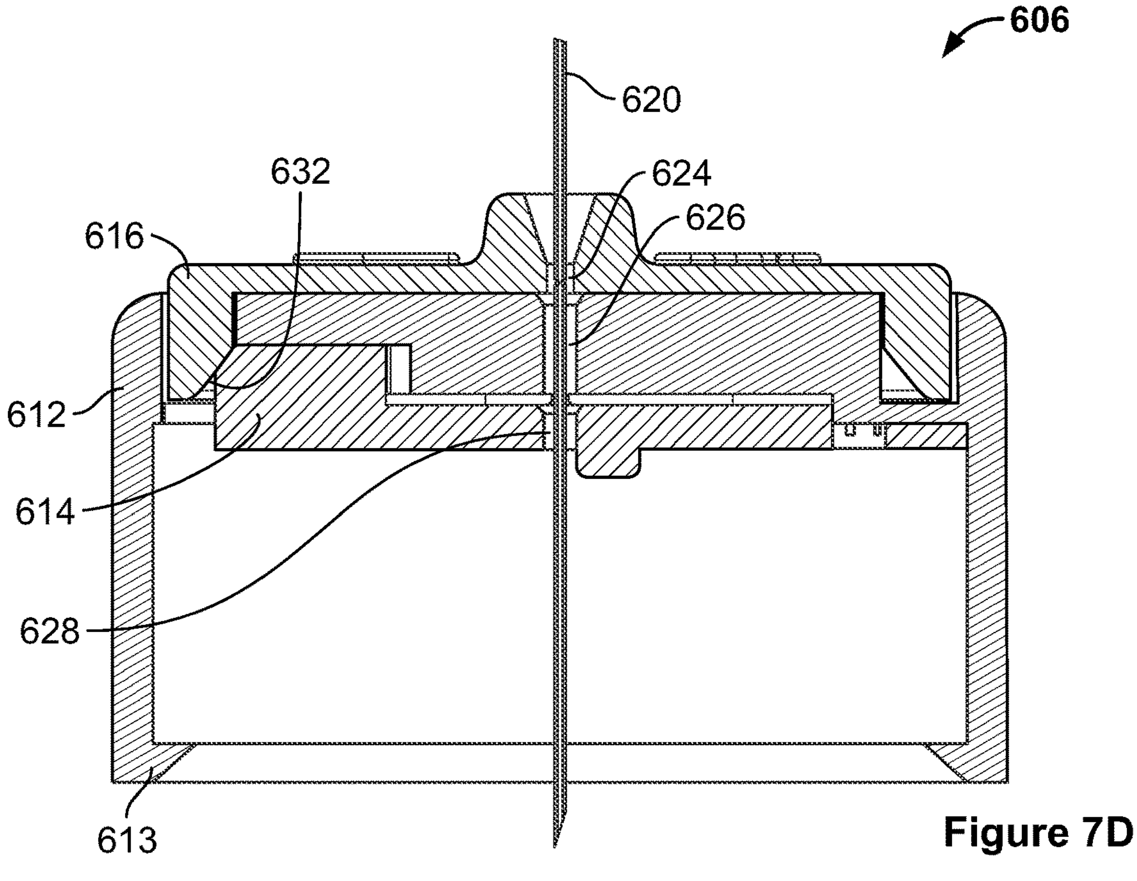
FIG. 7D is a cross-sectional view of the vial cap lock shown in FIG. 7C, having the key pushed or forced to a fully depressed second position, wherein the slide guard has been moved to align the needle opening therethrough with the respective needle openings through the key and the locking cap, and showing a needle passing through the respective needle openings.
Figure 7E:
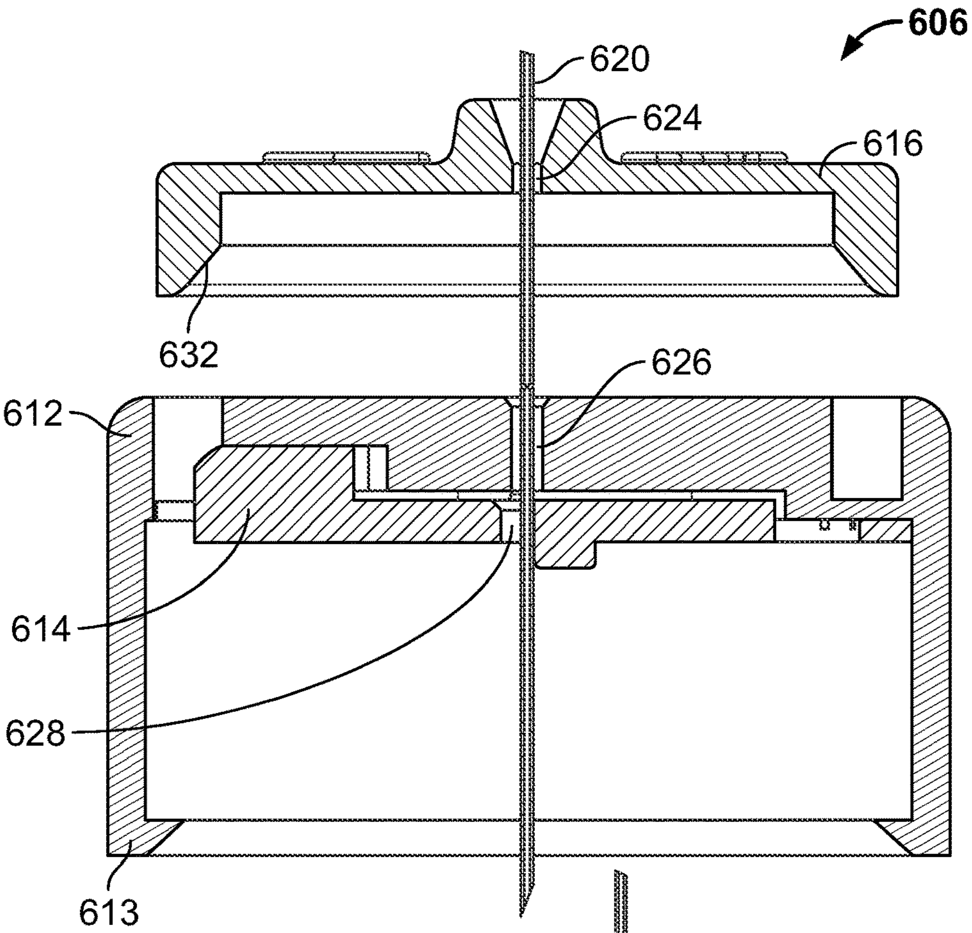
FIG. 7E is a cross-sectional view of the vial cap lock shown in FIGS. 7C-7D, having the key released, wherein the slide guard has moved to a position biased against the needle passing through the aligned respective needle openings through the key, the locking cap and the slide guard.
Figure 7F:
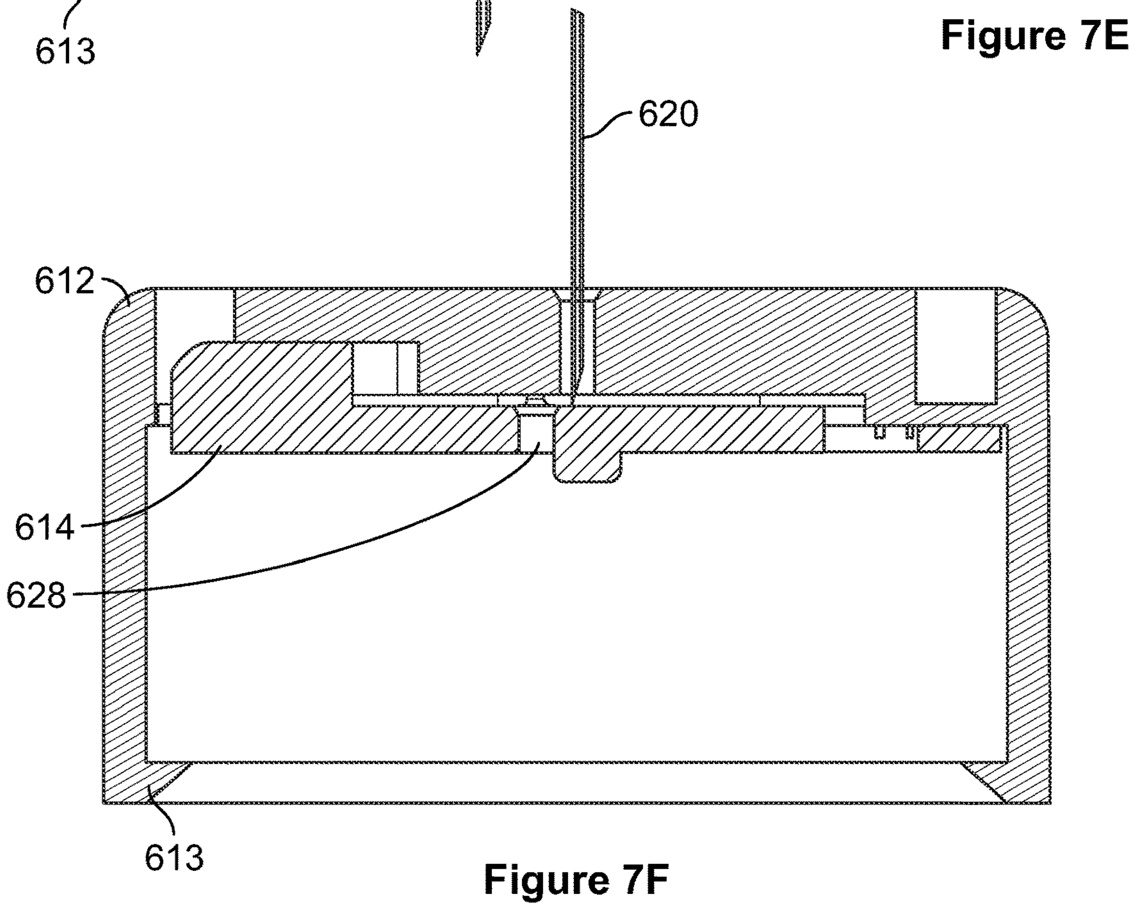
FIG. 7F is a cross-sectional view of the vial cap lock shown in FIGS. 7C-7E, after having released and removed the key and removed the needle to the extent that the needle no longer passes through the needle opening through the slide guard, wherein the slide guard has moved to block the needle from passing through the slide guard, such as to enter a vial.
Figure 7G:
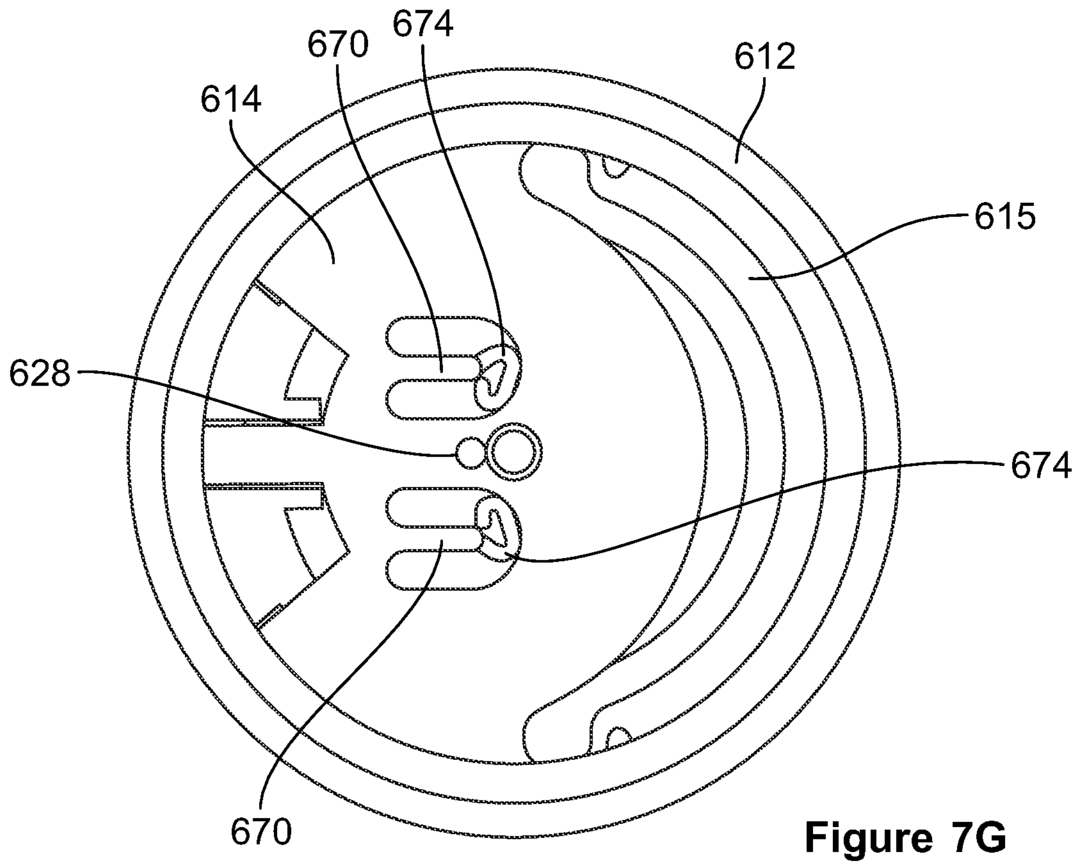
FIG. 7G is a bottom view of the underside of the vial cap lock corresponding to the key having been brought to the locking cap and being in a fully raised first position as shown in FIG. 7C, wherein the needle opening through the slide guard is not aligned with the respective needle openings through the key and locking cap, and pins on slider arms of the slide guard are in a neutral first position in slots within the underside of the locking cap.

FIGS. 7C and 7G show the slide guard 614 biased to a first position by a biasing portion 615 so as to be blocking entry of a needle 620 that is otherwise permitted to pass through the respective needle openings 624, 626 through the key 616 and the locking cap 612, after the key 616 is brought to the locking cap 612 and is in a fully raised first position. The key 616 is removable and reusable, so it does not have features that cause it to become permanently attached to the locking cap 612. With the key 616 in a fully raised first position, the needle opening 628 through the slide guard 614 is not aligned with the respective needle openings 624, 626 through the key 616 and locking cap 612, and pins 672 on slider arms 670 of the slide guard 614 are in a neutral first position in slots 674 within the underside of the locking cap 612.

Figure 7H:
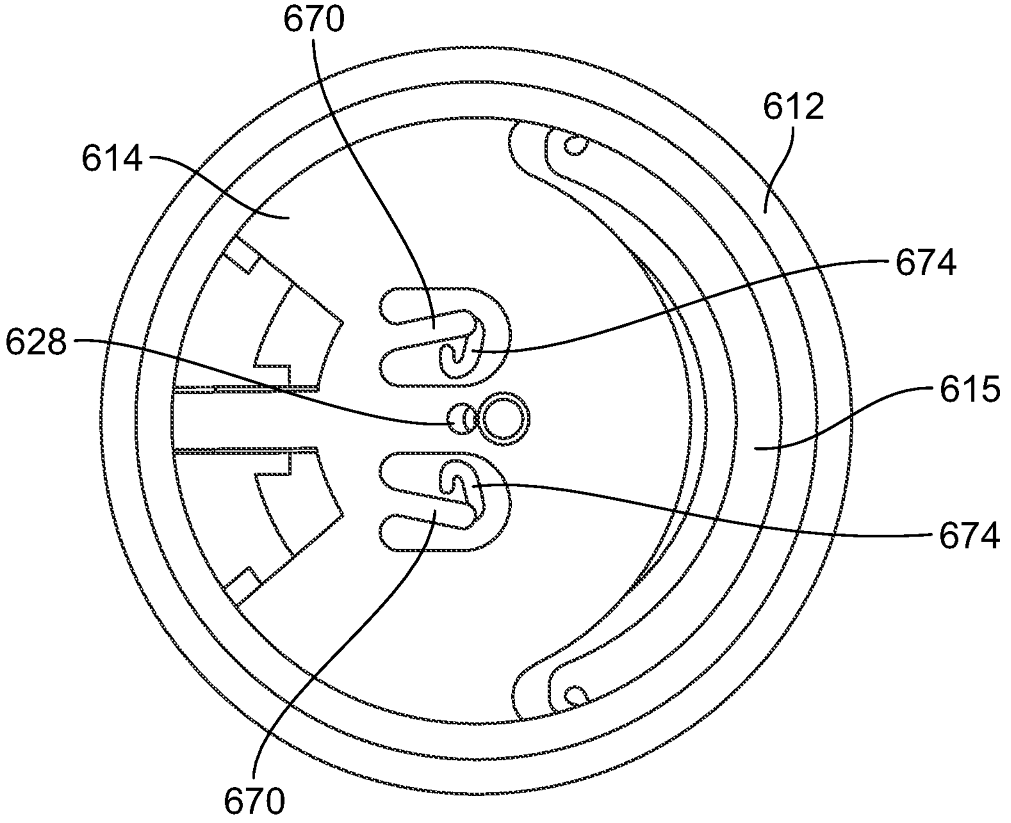
FIG. 7H is a bottom view of the underside of the vial cap lock corresponding to a partially depressed position of the key, wherein the respective needle openings through the key, the locking cap and the slide guard are partially aligned, and the slider arms on the slide guard flex outward as the pins on the slider arms follow the slots in the underside of the locking cap.

FIG. 7H shows the slide guard 614 moved while the key 616 is partially depressed, wherein the respective needle openings 624, 626, 628 through the key 616, the locking cap 612 and the slide guard 614 are partially aligned, and slider arms 670 on the slide guard 614 flex outward as pins 672 on the slider arms 670 follow slots 674 in the underside of the locking cap 612.

Figure 7I:
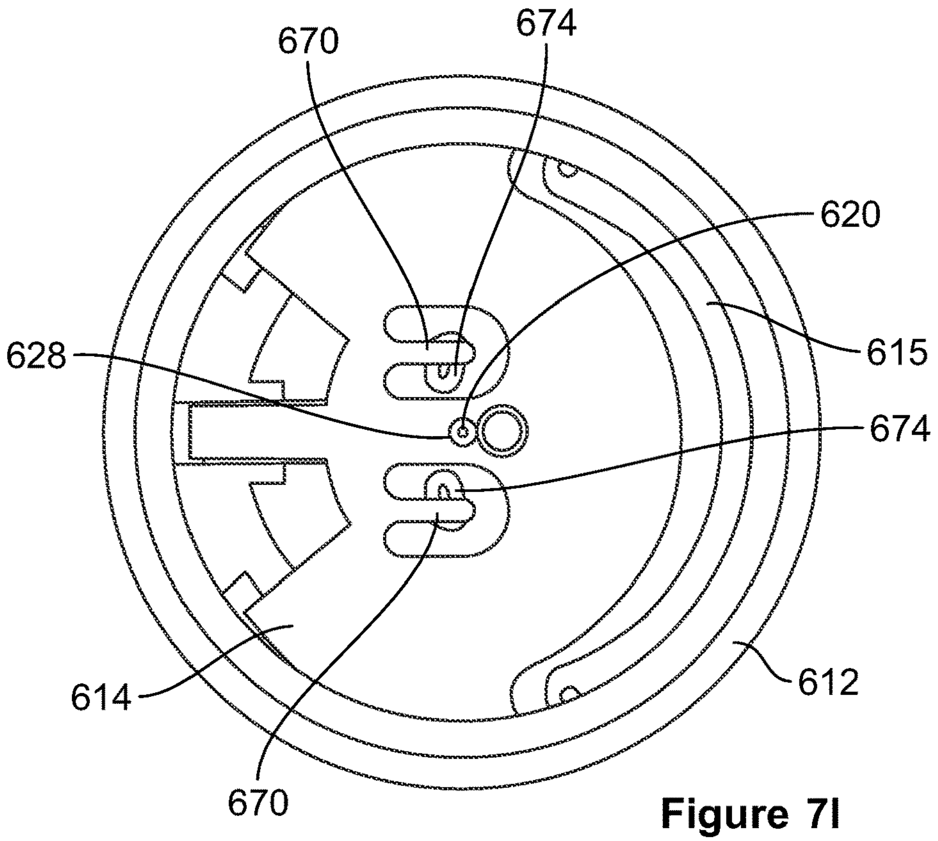
FIG. 7I is a bottom view of the underside of the vial cap lock corresponding to a fully depressed second position of the key, wherein the respective needle openings through the key, the locking cap and the slide guard are aligned and a needled is passing through the respective needle openings as shown in FIG. 7D, and the slider arms on the slide guard have flexed further as the pins on the slider arms followed the slots in the underside of the locking cap.

FIGS. 7D and 7I show the key 616 pushed or forced to a fully depressed second position, wherein the slide guard 614 has been moved from the first position wherein it was biased by a biasing portion 615 to a position blocking passage of the needle 620 to a second position to align the needle opening 628 therethrough with the respective needle openings 624, 626 through the key 616 and the locking cap 612, and showing a needle 620 passing through the respective needle openings 624, 626, 628. The slide guard 614 is moved from a first position to a second position when pushing downward on the key 616 due to an inward facing cam surface 632 on the key 616 that engages the slide guard 614. The slider arms 670 on the slide guard 614 have flexed further as the pins 672 on the slider arms 670 followed the slots 674 in the underside of the locking cap 612.

Figure 7J:
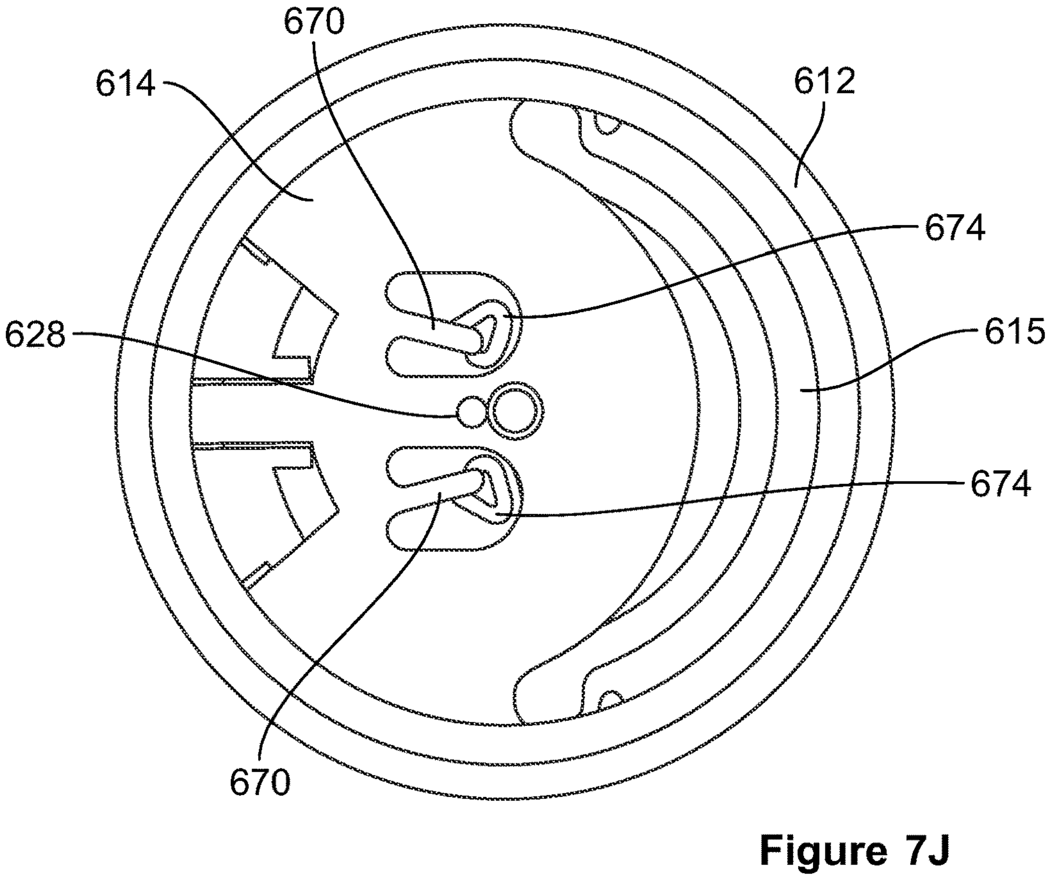
FIG. 7J is a bottom view of the underside of the vial cap lock corresponding to having released the key and removed the needle as shown in FIG. 7F, wherein the slide guard has moved to a locked position blocking the needle from passing through the slide guard, such as to reenter the vial, and the slider arms on the slide guard are flexed inward as the pins on the slider arms followed the slots in the underside of the locking cap until the pins became trapped, so as to prevent further movement of the slide guard.

In FIGS. 7E, the key has been released, and slide guard 614 has moved to a position biased against the needle 620 passing through the aligned respective needle openings 624, 626, 628 through the key 616, the locking cap 612 and the slide guard 614. In FIGS. 7F and 7J, after having released the key 616 and removed the needle 620 to the extent that the needle 620 no longer passes through the needle opening 628 through the slide guard 614, the slide guard 614 has moved to block the needle 620 from passing through the slide guard 620, such as to reenter the vial 608. The slide guard 614 has moved to a locked position blocking the needle 620 from passing through the slide guard 620, such as to reenter the vial 608, as the slider arms 670 on the slide guard 614 are flexed inward and the pins 672 on the slider arms 670 followed the slots 674 in the underside of the locking cap 612 until the pins 672 became trapped, so as to prevent further movement of the slide guard.

Figure 8A:
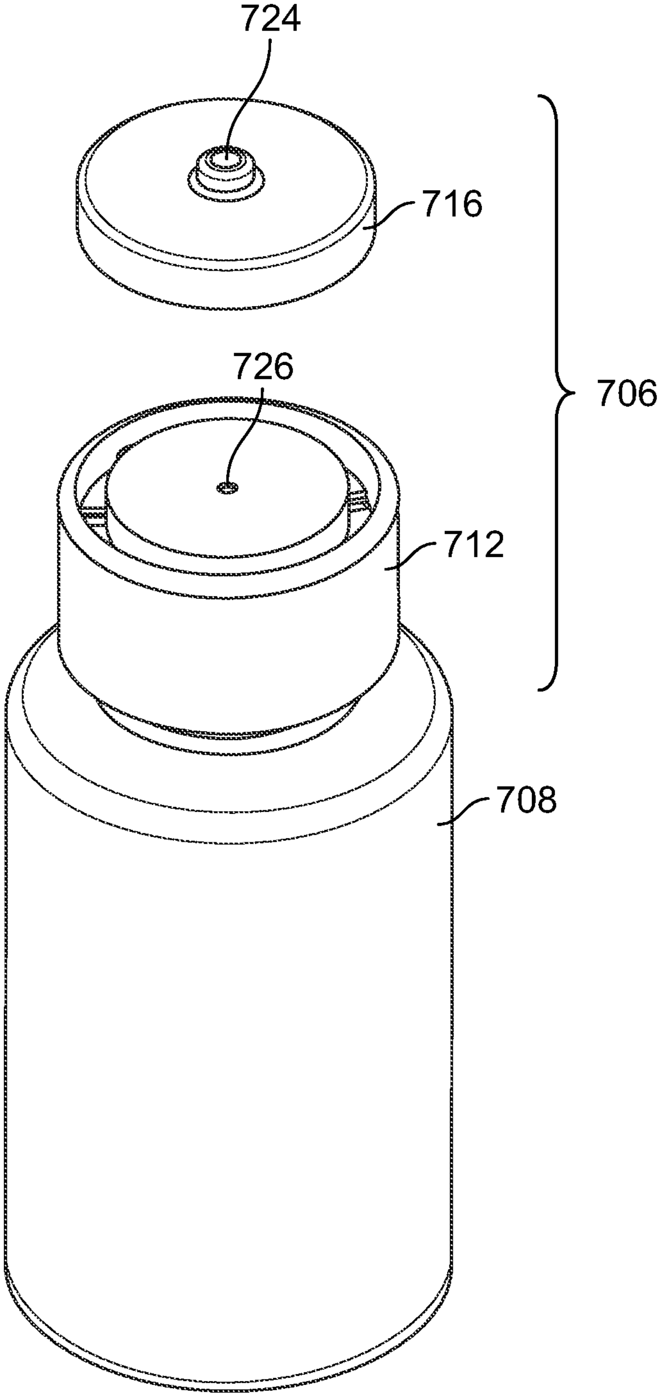
FIG. 8A is an upper perspective view of a vial having an eighth example protective locking system configured with a vial cap lock, wherein the vial may be used with a transfer device, such as shown in FIG. 1A, or separately, such as with a syringe needle, and having a removable key and a slide guard that blocks needle insertion after use.
Figure 8B:
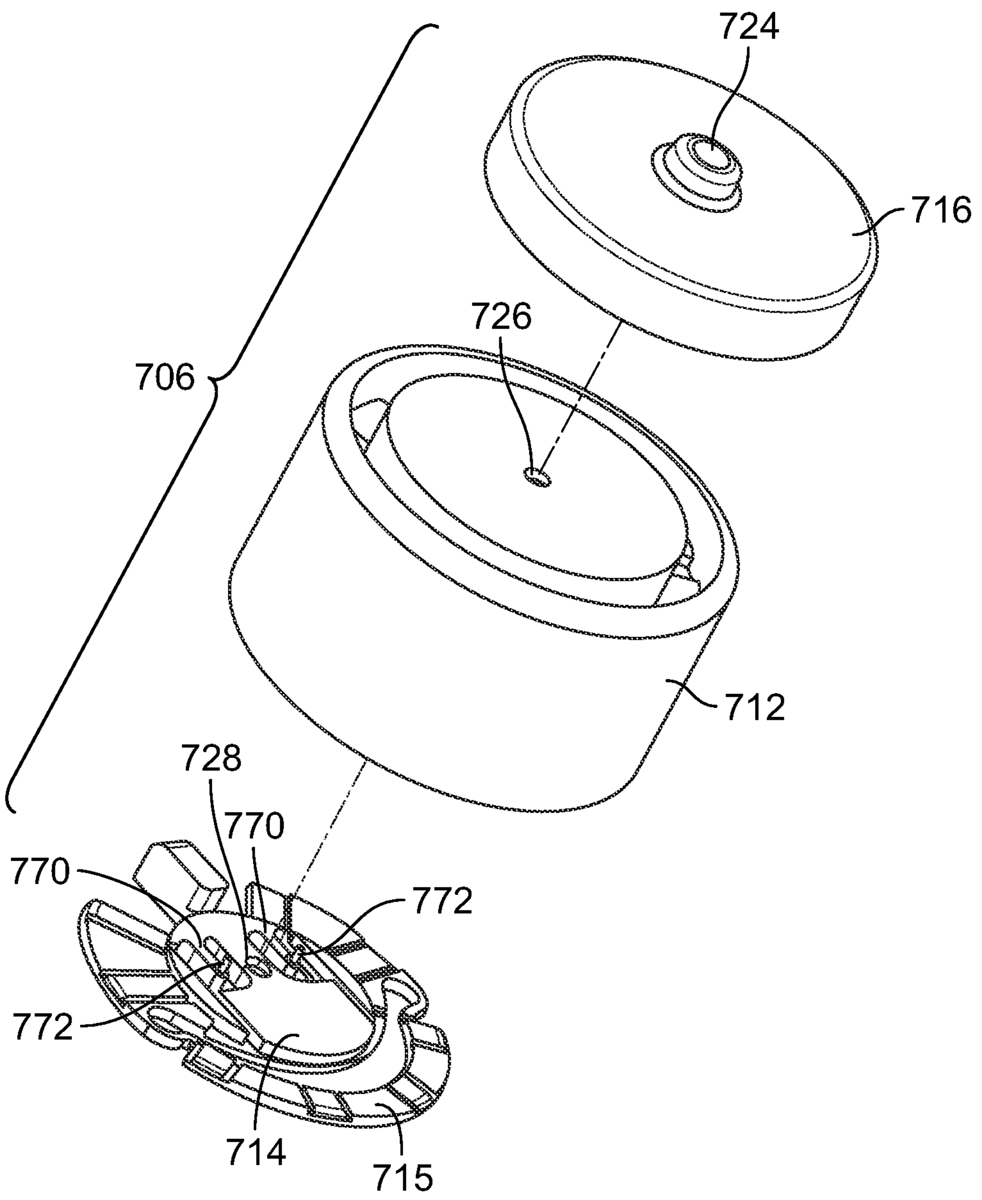
FIG. 8B is an upper perspective exploded view of the protective locking system for a vial having the vial cap lock shown in FIG. 8A removed from the vial for explanation purposes and including the key, the locking cap and a slide guard, and showing there may be alignment of respective needle openings through the key, the locking cap and the slide guard.

Turning to FIGS. 8A-8J, an eighth protective locking system 706 for use with a vial 708, which has a vial cap lock providing access via a reusable key 716 and that may be used with a transfer device, such as shown in FIG. 1A, or used separately, such as with a syringe needle 720. The key 716, in the form of a lid, is brought to a locking cap 712 on the vial 708, to unlock the vial 708 and is reusable. Thus, the key 716 is removable from a locking cap 712 on the vial 708 after use. As seen in FIG. 8B, the protective locking system 706 for a vial 708 includes the key 716, the locking cap 712 and a slide guard 714, and there may be alignment of respective needle openings 724, 726, 728 through the key 716, the locking cap 712 and the slide guard 714. The locking cap 712 is connected to the vial 708 via an inward extending shoulder 713 on the locking cap 712 that captures a rim of the vial 708.

Figure 8C:
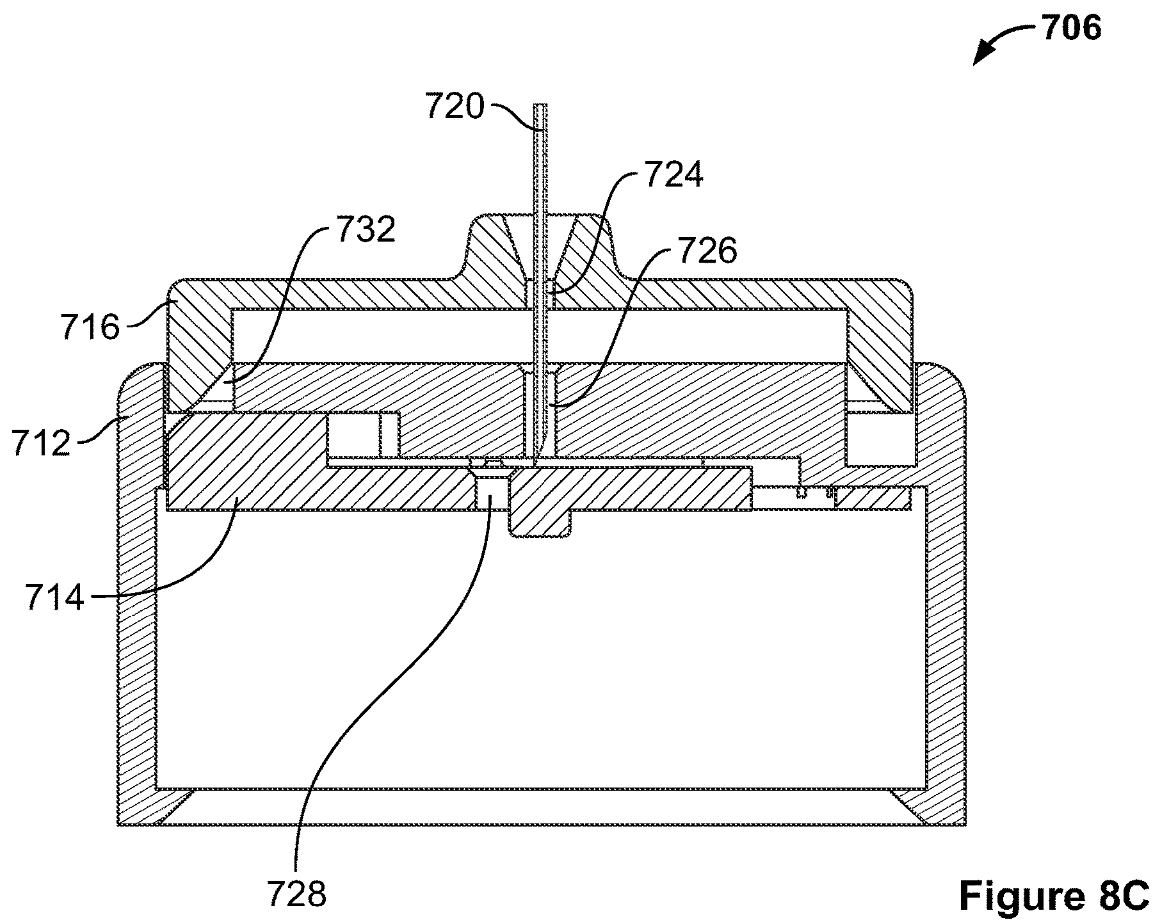
FIG. 8C is a cross-sectional view of the vial cap lock shown in FIGS. 8A-8B removed from the vial for explanation purposes, and further showing the slide guard blocking entry of a needle that is otherwise permitted to pass through the respective needle openings through the key and the locking cap, after the key is brought to the locking cap and is in a fully raised first position.
Figure 8D:
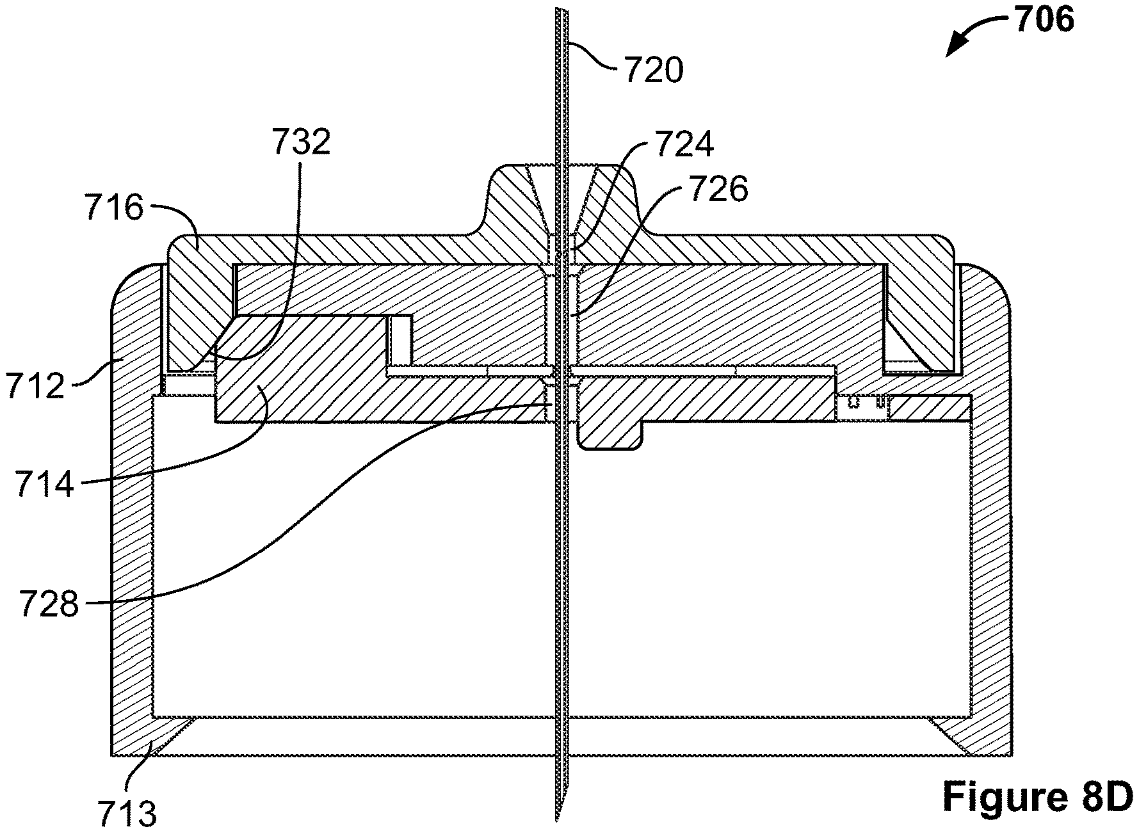
FIG. 8D is a cross-sectional view of the vial cap lock shown in FIG. 8C, having the key pushed or forced to a fully depressed second position, wherein the slide guard has been moved to align the needle opening therethrough with the respective needle openings through the key and the locking cap, and showing a needle passing through the respective needle openings.
Figure 8E:
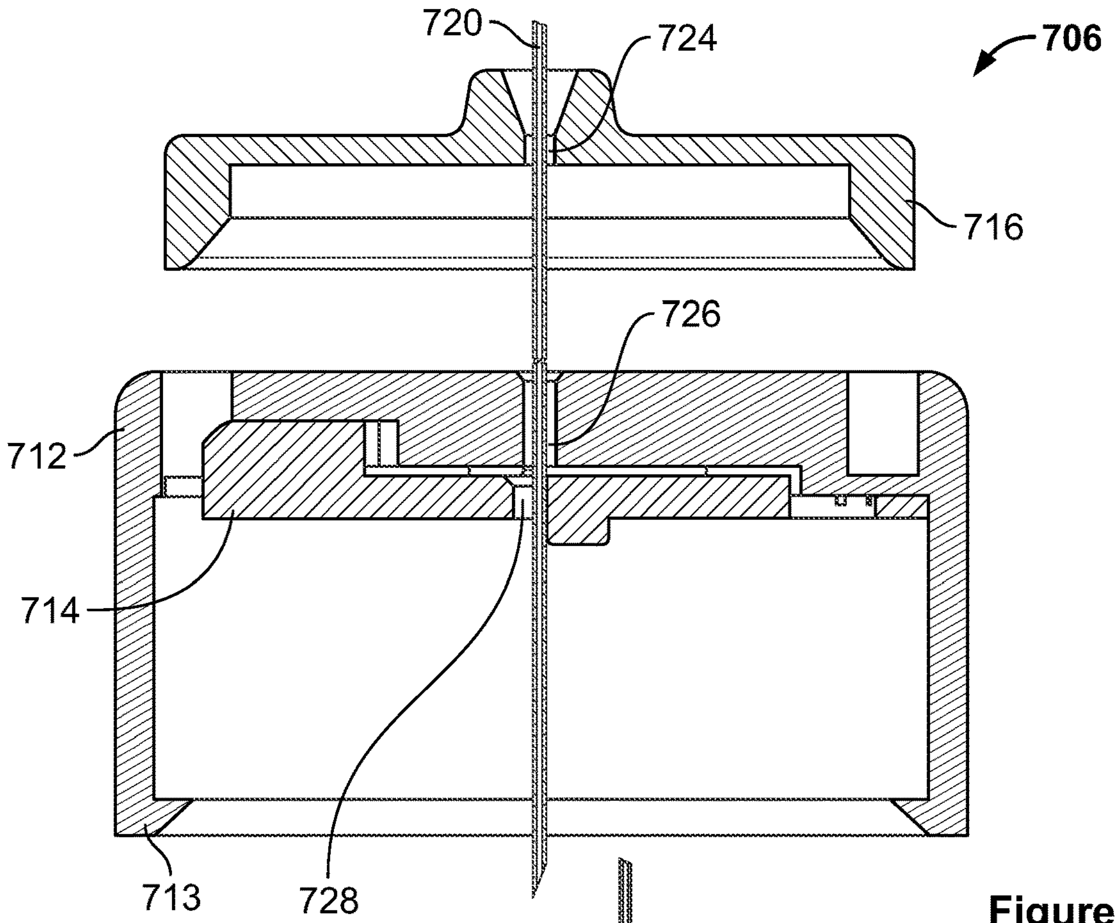
FIG. 8E is a cross-sectional view of the vial cap lock shown in FIGS. 80-8D, having the key released, wherein the slide guard has moved to a position biased against the needle passing through the aligned respective needle openings through the key, the locking cap and the slide guard.
Figure 8F:
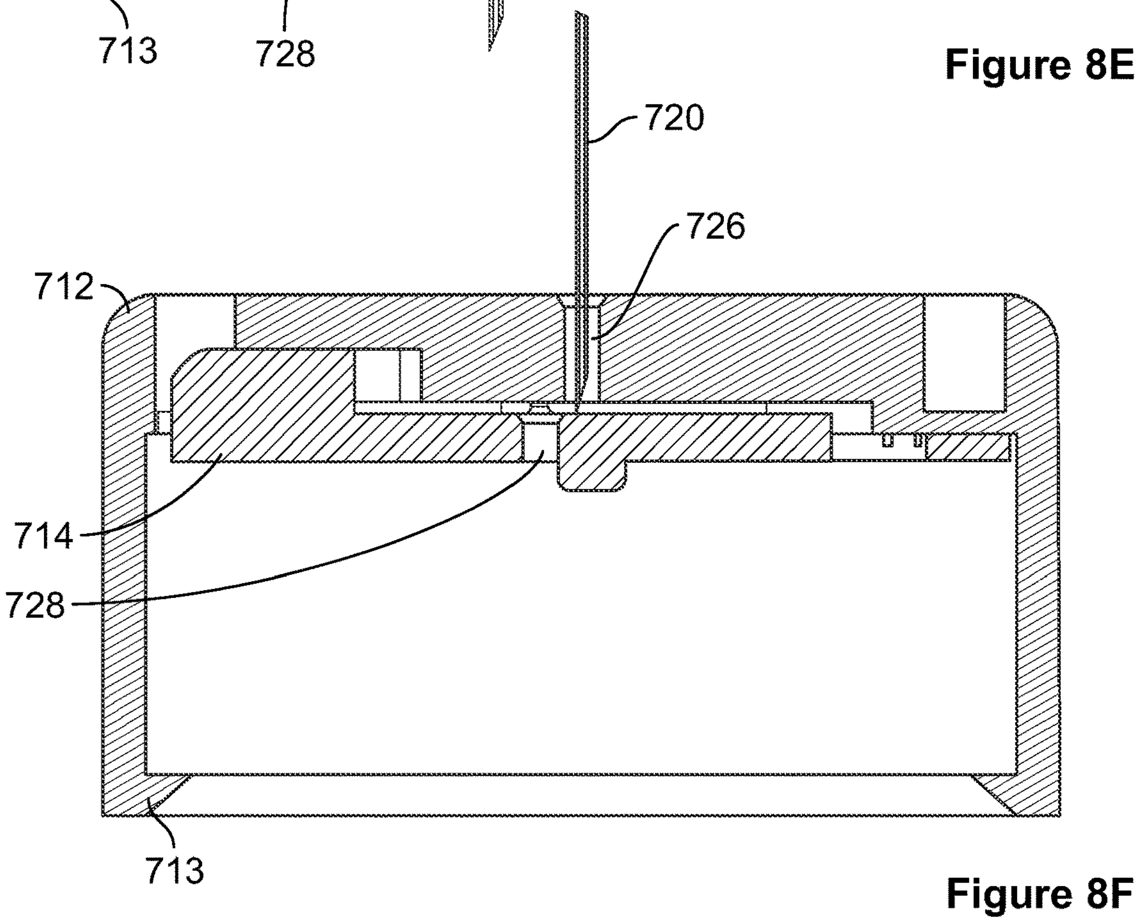
FIG. 8F is a cross-sectional view of the vial cap lock shown in FIGS. 8C-8E, after having released and removed the key and removed the needle to the extent that the needle no longer passes through the needle opening through the slide guard, wherein the slide guard has moved to block the needle from passing through the slide guard, such as to enter a vial.
Figure 8G:
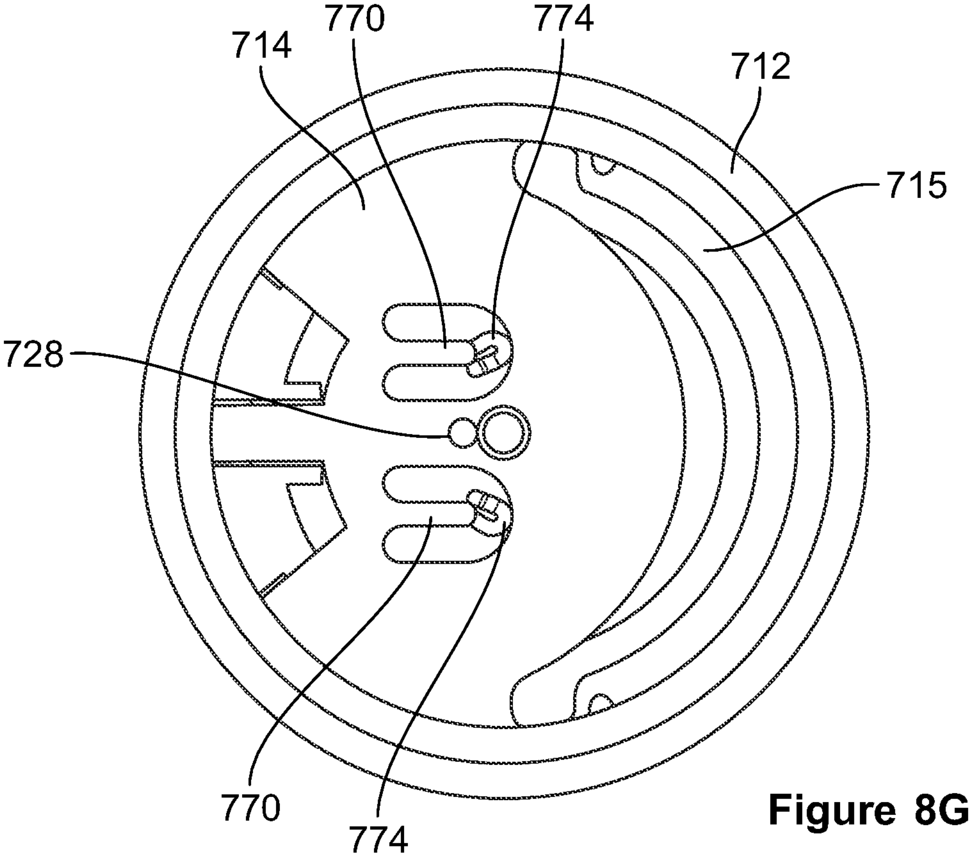
FIG. 8G is a bottom view of the underside of the vial cap lock corresponding to the key having been brought to the locking cap and being in a fully raised first position as shown in FIG. 8C, wherein the needle opening through the slide guard is not aligned with the respective needle openings through the key and locking cap, and pins on slider arms of the slide guard are in a neutral first position in first ends of slots within the underside of the locking cap.

FIGS. 8C and 8G show the slide guard 714 biased to a first position by a biasing portion 715 so as to be blocking entry of a needle 720 that is otherwise permitted to pass through the respective needle openings 724, 726 through the key 716 and the locking cap 712, after the key 716 is brought to the locking cap 712 and is in a fully raised first position. The key 716 is removable and reusable, so it does not have features that cause it to become permanently attached to the locking cap 712. With the key 716 in a fully raised first position, the needle opening 728 through the slide guard 714 is not aligned with the respective needle openings 724, 726 through the key 716 and locking cap 712, and pins 772 on slider arms 770 of the slide guard 714 are in a neutral first position in slots 774 within the underside of the locking cap 712.

Figure 8H:
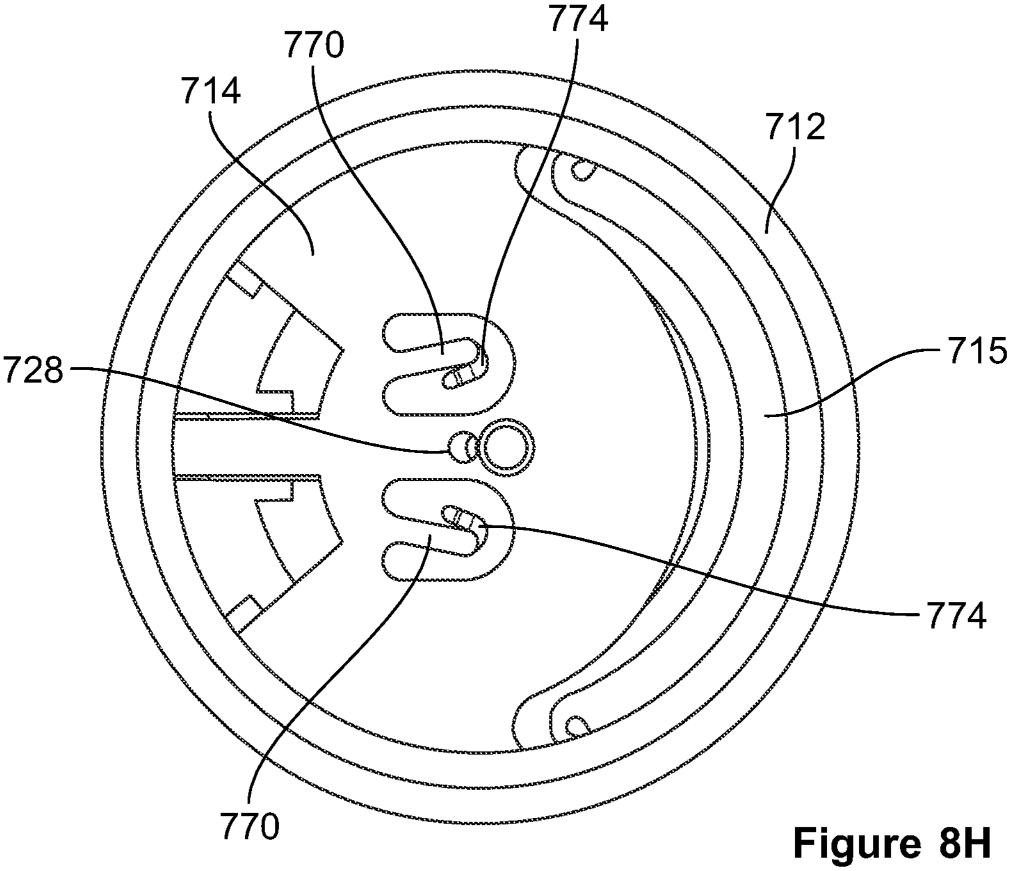
FIG. 8H is a bottom view of the underside of the vial cap lock corresponding to a partially depressed position of the key, wherein the respective needle openings through the key, the locking cap and the slide guard are partially aligned, and the slider arms on the slide guard flex outward as the pins on the slider arms follow the slots in the underside of the locking cap.

FIG. 8H shows the slide guard 714 moved while the key 716 is partially depressed, wherein the respective needle openings 724, 726, 728 through the key 716, the locking cap 712 and the slide guard 714 are partially aligned, and slider arms 770 on the slide guard 714 flex outward as pins 772 on the slider arms 770 follow slots 774 in the underside of the locking cap 712.

Figure 8I:
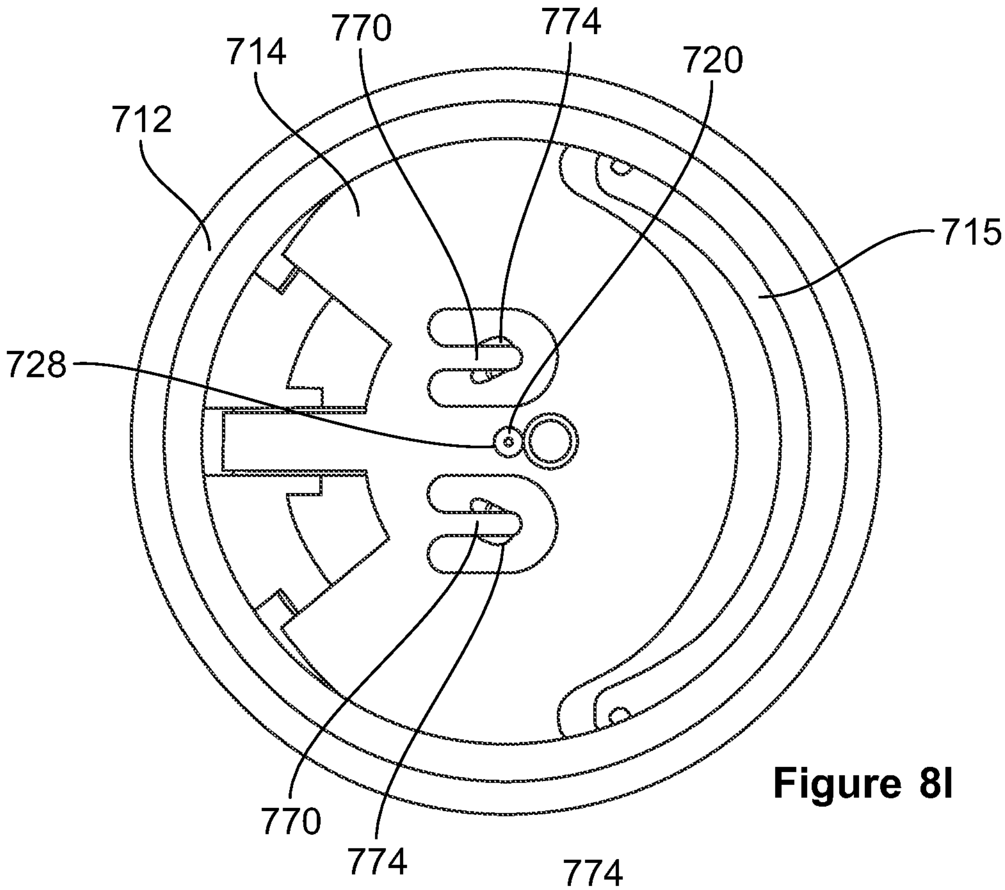
FIG. 8I is a bottom view of the underside of the vial cap lock corresponding to a fully depressed second position of the key, wherein the respective needle openings through the key, the locking cap and the slide guard are aligned and a needled is passing through the respective needle openings as shown in FIG. 8D, and the slider arms on the slide guard have flexed to a neutral second position further as the pins on the slider arms followed the slots in the underside of the locking cap.

FIGS. 8D and 8I show the key 716 pushed or forced to a fully depressed second position, wherein the slide guard 714 has been moved from the first position wherein it was biased by a biasing portion 715 to a position blocking passage of the needle 720 to a second position to align the needle opening 728 therethrough with the respective needle openings 724, 726 through the key 716 and the locking cap 712, and showing a needle 720 passing through the respective needle openings 724, 726, 728. The slide guard 714 is moved from a first position to a second position when pushing downward on the key 716 due to an inward facing cam surface 732 on the key 716 that engages the slide guard 714. The slider arms 770 on the slide guard 714 have flexed further as the pins 772 on the slider arms 770 followed the slots 774 in the underside of the locking cap 712.

Figure 8J:
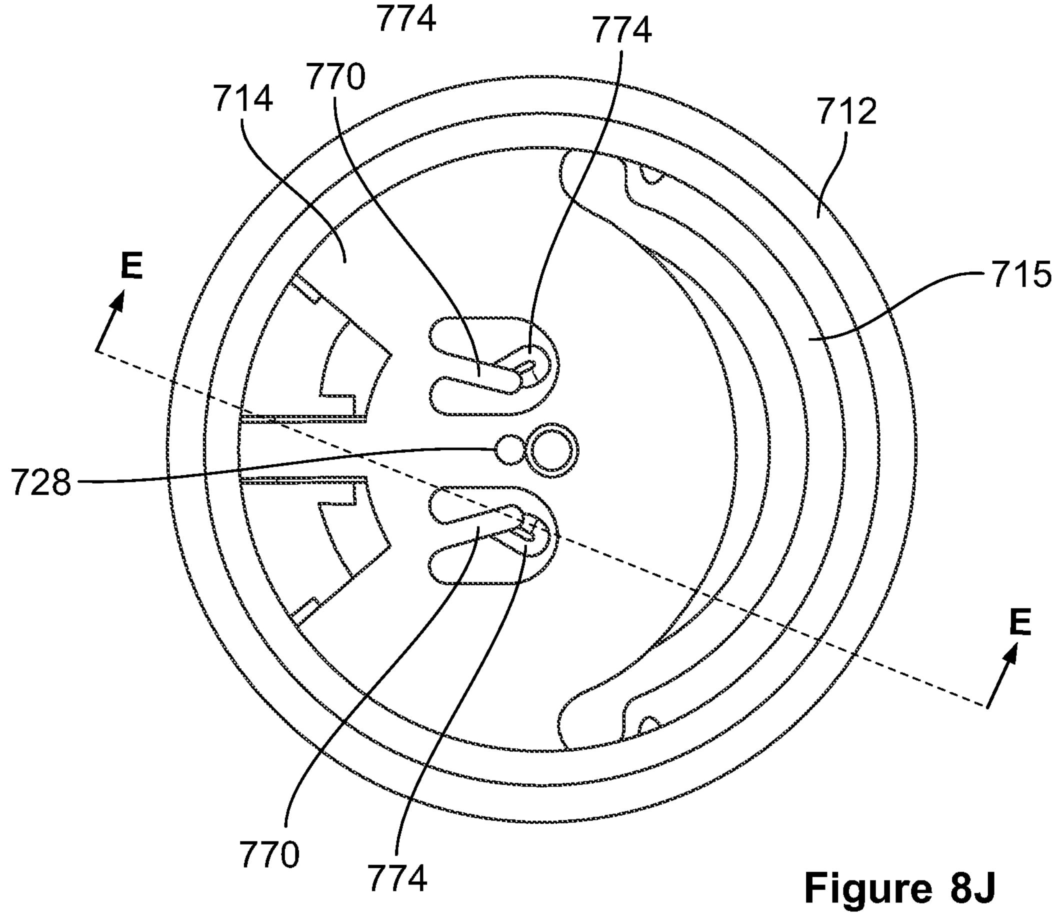
FIG. 8J is a bottom view of the underside of the vial cap lock corresponding to having released the key and removed the needled as shown in FIG. 8F, wherein the slid guard has moved to a locked position blocking the needle from passing through the slide guard, such as to enter a vial, and the slider arms on the slide guard are flexed inward as the pins on the slider arms followed the slots in the underside of the locking cap until the pins passed over and fell behind ramps in the slots becoming trapped, so as to prevent further movement of the slide guard.
Figure 8K:
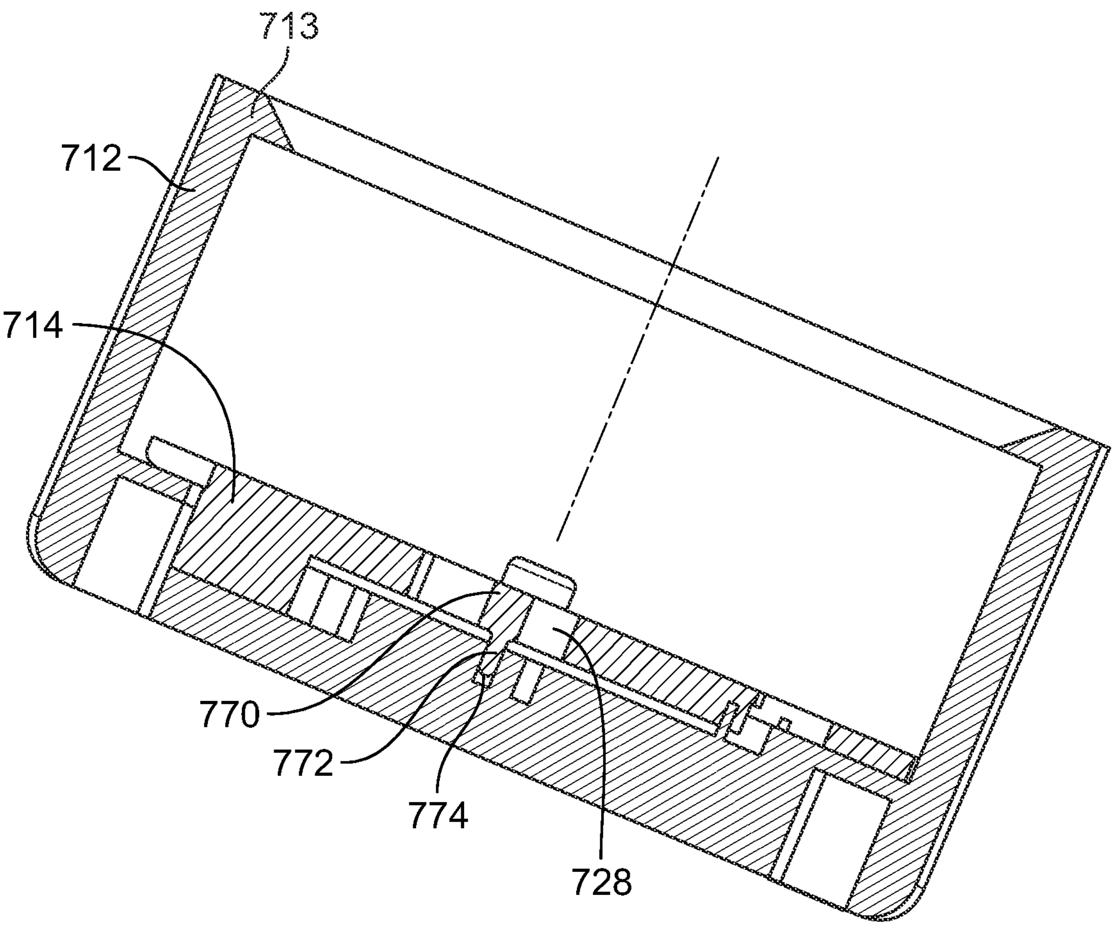
FIG. 8K is a cross-sectional side view of the vial cap lock shown in FIG. 8J removed from the vial for explanation purposes, and further showing the slide guard blocking entry of a needle, with the pins on the slider arms trapped behind the ramps in the slots in the underside of the locking cap.

In FIGS. 7E, the key has been released, and slide guard 714 has moved to a position biased against the needle 720 passing through the aligned respective needle openings 724, 726, 728 through the key 716, the locking cap 712 and the slide guard 714. In FIGS. 8F and 8J, after having released the key 716 and removed the needle 720 to the extent that the needle 720 no longer passes through the needle opening 728 through the slide guard 714, the slide guard 714 has moved to block the needle 720 from passing through the slide guard 720, such as to reenter the vial 708. The slide guard 714 has moved to a locked position blocking the needle 720 from passing through the slide guard 720, such as to reenter the vial 708, and the slider arms 770 on the slide guard 714 are flexed inward as the pins 772 on the slider arms 770 followed the slots 774 in the underside of the locking cap 712 until the pins 772 passed over and fell behind ramps 776 in the slots 774 becoming trapped, so as to prevent further movement of the slide guard 714. This can be seen in FIG. 8K where the pins 772 on the slider arms 770 are trapped behind the ramps 776 in the slots 774 in the underside of the locking cap 774.

Although the present subject matter is described herein with reference to specific structures, methods and examples, this is for purposes of illustration only, and it is understood that the present subject matter is applicable to a large range of devices and systems that may differ in particular configuration and appearance while still employing this subject matter.

What is claimed is:

1. A protective locking system for a vial comprising:

a) a vial cap lock configured to be fitted to cover a septum on a vial containing a medical fluid;

b) the vial cap lock further comprising a key, a locking cap and a slide guard;

c) the key having a needle opening sized to receive a needle therethrough, the locking cap having a needle opening sized to receive a needle therethrough, and the slide guard having a needle opening sized to receive a needle therethrough; and d) the key being configured to be received by and movable relative to the locking cap from a first position, wherein the needle opening through the slide guard is not aligned with the respective needle openings through the key and locking cap, to a second position, wherein the key has moved the slide guard relative to the locking cap and the respective needle openings through the slide guard, the key and the locking cap are aligned to receive a needle therethrough.

2. The protective locking system for a vial of claim 1 further comprising wherein the slide guard includes a biasing portion that tends to bias the slide guard toward a position wherein the needle opening through the slide guard is not aligned with the respective needle openings through the key and the locking cap.

3. The protective locking system for a vial of claim 1 further comprising wherein the key is configured as a vial elevator that slidably engages a vial elevator shaft of a vial holder portion of a transfer device.

4. The protective locking system for a vial of claim 3 further comprising wherein the key is in the first position when the key is received by the locking cap and in a fully raised position relative to the vial elevator shaft, and wherein the key is in the second position when the key is received by the locking cap and in a fully retracted position relative to the vial elevator shaft.

5. The protective locking system for a vial of claim 3 further comprising wherein the key is configured as a vial elevator that is received by and removably connected to the locking cap.

6. The protective locking system for a vial of claim 4 further comprising wherein when the key further includes at least one rib that engages and moves the slide guard from the first position to the second position when the key is received by the locking cap.

7. The protective locking system for a vial of claim 4 further comprising wherein when the key is moved to the fully retracted position, a needle passes through the aligned respective needle openings through the key, the locking cap and the slide guard.

8. The protective locking system for a vial of claim 1 further comprising wherein the key includes at least one rib that engages and moves the slide guard from the first position to the second position when the key is received by the locking cap, wherein the respective needle openings through the key, the locking cap and the slide guard are aligned.

9. The protective locking system for a vial of claim 1 further comprising wherein the key is non-removable from the locking cap and has a fully raised first position wherein the needle opening through the slide guard is not aligned with the respective needle openings through the key and the locking cap.

10. The protective locking system for a vial of claim 9 further comprising wherein the key has a fully depressed second position wherein the needle opening through the slide guard is aligned with the respective needle openings through the key and the locking cap.

11. The protective locking system for a vial of claim 1 further comprising a spring lock located between the locking cap and the slide guard.

12. The protective locking system for a vial of claim 11 further comprising wherein the spring lock is movable from an initial set position when the key is in a fully raised first position to an active position biased toward blocking the needle opening through the slide guard when the key is depressed toward the locking cap.

13. The protective locking system for a vial of claim 12 further comprising wherein the key includes projections that extend toward the slide guard and are received within actuation openings through the locking cap.

14. The protective locking system for a vial of claim 13 further comprising wherein the projections that extend from the key force the spring lock from the initial set position to the active position when the key is moved toward the locking cap.

15. The protective locking system for a vial of claim 1 further comprising wherein the key includes at least one outward extension that engages and results in the key being non-removable from the locking cap.

16. The protective locking system for a vial of claim 1 further comprising wherein the key becomes locked to and non-removable from the locking cap when the key has been received by the locking cap.

17. The protective locking system for a vial of claim 1 further comprising wherein the key is removable from the locking cap.

18. The protective locking system for a vial of claim 1 further comprising wherein the key is generic with respect to being usable to gain access for a needle to enter a vial to which the protective locking system has been attached.

19. The protective locking system for a vial of claim 1 further comprising wherein the key is custom with respect to a drug and authority to use the drug.

20. The protective locking system for a vial of claim 1 further comprising wherein the first position of the key is a first rotational position and the second position of the key is a second rotational position.

21. The protective locking system for a vial of claim 20 further comprising wherein when the key is in the first rotational position the needle opening through the slide guard is not aligned with the respective needle openings through the key and the locking cap, and wherein when the key is in the second rotational position the needle opening through the slide guard is aligned with the respective needle openings through the key and the locking cap.

22. The protective locking system for a vial of claim 1 further comprising wherein the key engages the slide guard and moves the slide guard rotationally when the key is moved from the first rotational position to the second rotational position.

23. The protective locking system for a vial of claim 1 further comprising wherein the key and locking cap include alignment features that must be aligned to move the key toward the locking cap and from the first position to the second position.

24. The protective locking system for a vial of claim 1 further comprising wherein the slide guard includes slider arms having pins that are located in and follow slots in the underside of the locking cap.

25. The protective locking system for a vial of claim 24 further comprising wherein the pins on the slider arms are located in and follow the slots in the underside of the locking cap and control locking the slide guard in a position after a needle has passed through and been withdrawn from the needle opening in the slide guard.

26. The protective locking system for a vial of claim 25 further comprising wherein the pins on the slider arms are located in and follow the slots in the underside of the locking cap and become trapped behind ramps after the key has been fully depressed to the second position and a needle has been removed from the needle opening through the slide guard.

* * * * *